US011884037B2

(12) United States Patent
Goodrich

(10) Patent No.: US 11,884,037 B2
(45) Date of Patent: Jan. 30, 2024

(54) SYSTEMS AND METHODS FOR MAKING ENVELOPES AND/OR OTHER PROTECTIVE PRODUCTS WITH EXPANDED PAPER CUSHIONING

(71) Applicant: David Paul Goodrich, Sedona, AZ (US)

(72) Inventor: David Paul Goodrich, Sedona, AZ (US)

(73) Assignee: HexcelPack, LLC, Sedona, AZ (US)

( * ) Notice: Subject to any disclaimer, the term of this patent is extended or adjusted under 35 U.S.C. 154(b) by 0 days.

(21) Appl. No.: 17/187,768

(22) Filed: Feb. 27, 2021

(65) Prior Publication Data

US 2021/0252821 A1 Aug. 19, 2021

Related U.S. Application Data

(63) Continuation-in-part of application No. 16/870,195, filed on May 8, 2020, now Pat. No. 11,440,305, (Continued)

(51) Int. Cl.
*B31B 70/10* (2017.01)
*B31B 70/16* (2017.01)
(Continued)

(52) U.S. Cl.
CPC .............. *B31B 70/10* (2017.08); *B31B 70/16* (2017.08); *B31B 70/62* (2017.08); *B31B 70/88* (2017.08);
(Continued)

(58) Field of Classification Search
CPC ... B32B 3/28; B32B 38/06; B31F 2201/0738; B31F 2201/0733; B31F 1/07;
(Continued)

(56) References Cited

U.S. PATENT DOCUMENTS 1,946,838 A * 2/1934 Cofrin ........................ B31F 1/07 162/113
3,668,055 A * 6/1972 Gerard ...................... B31F 1/07 428/184

(Continued)

FOREIGN PATENT DOCUMENTS

EP 2 815 877 A1 12/2014
GB 893 060 A 4/1962

(Continued)

OTHER PUBLICATIONS

International Search Report dated May 19, 2021, issued in counterpart International application No. PCT/US21/20131. (24 pages).

(Continued)

*Primary Examiner* — Christopher R Demeree
(74) *Attorney, Agent, or Firm* — Studebaker & Brackett, PC

(57) ABSTRACT

According to some illustrative embodiments, a system and method is provided that includes, e.g., means for continuously conveying an assembly of layered sheets including a first paper sheet, at least one expanded sheet and a second paper sheet in a conveying flow between, e.g., a rotary mandrel or member at an upstream position in a direction of conveyance and a rotary die crushing and cutting tool, with said rotary mandrel or member and said rotary die crushing and cutting tool maintaining the at least one expanded sheet in an expanded state, said rotary tool having a crushing component that crushes a portion of the at least one expanded sheet such as to form a flap forming region of an envelope and a cutting component that cuts the assembly of layered sheets such as to separate individual envelope units.

52 Claims, 33 Drawing Sheets

Related U.S. Application Data which is a continuation-in-part of application No. 16/531,017, filed on Aug. 3, 2019, now Pat. No. 10,981,712, said application No. 16/870,195 is a continuation-in-part of application No. 16/018,702, filed on Jun. 26, 2018, now Pat. No. 10,669,086.

(60) Provisional application No. 62/982,662, filed on Feb. 27, 2020, provisional application No. 62/806,849, filed on Feb. 17, 2019, provisional application No. 62/798,065, filed on Jan. 29, 2019, provisional application No. 62/714,739, filed on Aug. 5, 2018, provisional application No. 62/524,905, filed on Jun. 26, 2017.

(51) Int. Cl.

| | |
|---|---|
| ***B31B 70/62*** | (2017.01) |
| ***B31B 70/88*** | (2017.01) |
| ***B31B 160/10*** | (2017.01) |
| ***B31B 155/00*** | (2017.01) |
| ***B31B 170/20*** | (2017.01) |

(52) U.S. Cl.
CPC ... *B31B 2155/002* (2017.08); *B31B 2160/106* (2017.08); *B31B 2170/20* (2017.08)

(58) Field of Classification Search
CPC ....... D21F 11/006; D21H 27/02; B31D 3/005; B31D 2205/0023; B31D 5/006; B65B 11/00; B65B 55/20; B65D 81/022; B65D 27/00; B65D 81/03; B31B 70/10; B31B 70/16; B31B 70/62; B31B 70/88; B31B 2155/002; B31B 2160/106; B31B 2170/20; B31B 2205/0047; B31B 70/00
USPC .................. 229/92.8, 68.1, 87.02, 403, 928; 206/521, 594, 812; 383/109, 110; 428/135, 172, 34.2, 137; 156/264; 162/280, 362; 493/966, 58; 53/472
See application file for complete search history.

(56) References Cited

U.S. PATENT DOCUMENTS

| | | | | |
|---|---|---|---|---|
| 5,503,611 | A | 4/1996 | Richter et al. | |
| 5,688,578 | A | 11/1997 | Goodrich | |
| 10,981,712 | B2 * | 4/2021 | Goodrich | B32B 7/06 |
| 11,059,256 | B2 * | 7/2021 | Cheich | B31D 5/0069 |
| 2010/0093507 | A1 | 4/2010 | Hoeben | |
| 2018/0072011 | A1 | 3/2018 | Huang | |
| 2019/0255798 | A1 | 8/2019 | Sperry | |
| 2020/0039720 | A1 | 2/2020 | Goodrich | |
| 2020/0377278 | A1 * | 12/2020 | Orsini | B65B 55/20 |
| 2020/0407143 | A1 * | 12/2020 | Berniard | B65D 81/03 |
| 2021/0024266 | A1 | 1/2021 | Goodrich | |

FOREIGN PATENT DOCUMENTS

| | | | |
|---|---|---|---|
| JP | H9-272162 | A | 10/1997 |
| JP | 2003-165169 | A | 6/2003 |
| JP | 2006-290356 | A | 10/2006 |
| JP | 2012-86474 | A | 5/2012 |
| WO | 9601731 | A1 | 1/1996 |
| WO | 9624540 | A1 | 8/1996 |

OTHER PUBLICATIONS

The extended European Search Report issued by the European Patent Office dated Jun. 6, 2023, which corresponds to Application 20802828.2 and is related to U.S. Appl. No. 17/187,768.

Japanese Office Action, dated Jan. 31, 2023, cited in Japan Application No. 2021-503112 (with machine translation).

* cited by examiner

SYSTEMS AND METHODS FOR MAKING ENVELOPES AND/OR OTHER PROTECTIVE PRODUCTS WITH EXPANDED PAPER CUSHIONING

CROSS REFERENCE TO RELATED APPLICATIONS

This application claims priority to U.S. provisional application 62/982,662 filed Feb. 27, 2020, entitled "EXPANDED SLIT SHEET ENVELOPE CRUSH PULL SYSTEM," the entire disclosure of which provisional application is incorporated herein by reference in full as part of the description of the present invention.

In addition, this application is a continuation-in-part of U.S. non-provisional patent application Ser. No. 16/870,195, filed May 8, 2020, which is a non-provisional of U.S. provisional applications 62/845,293, filed May 8, 2019 and 62/982,662, filed Feb. 27, 2020, and which is a continuation-in-part of U.S. non-provisional patent application Ser. No. 16/531,017, filed Aug. 3, 2019, which claims the benefit of U.S. provisional applications 62/806,849, filed Feb. 17, 2019, 62/798,065, filed Jan. 29, 2019 and 62/714,739, filed Aug. 5, 2018, and which is a continuation-in-part of U.S. non-provisional application Ser. No. 16/018,702, filed Jun. 26, 2018, which claims the benefit of U.S. provisional application 62/524,905, filed Jun. 26, 2017, the entire disclosures of all of which applications are all incorporated herein by reference in full as part of the description of the present invention.

In addition, this application is a continuation-in-part of U.S. non-provisional patent application Ser. No. 16/749,875, filed Jan. 22, 2020, which claims the benefit of U.S. provisional application 62/795,310, filed Jan. 22, 2019, the entire disclosures of all of which applications are all incorporated herein by reference in full as part of the description of the present invention.

In addition, this application is also a continuation-in-part of U.S. non-provisional patent application Ser. No. 16/531,017, filed Aug. 3, 2019, which claims the benefit of U.S. provisional applications 62/806,849, filed Feb. 17, 2019, 62/798,065, filed Jan. 29, 2019 and 62/714,739, filed Aug. 5, 2018, the entire disclosures of all of which applications are all incorporated herein by reference in full as part of the description of the present invention.

In addition, this application is also a continuation-in-part of U.S. non-provisional patent application Ser. No. 16/872,814, which is a continuation of U.S. non-provisional application Ser. No. 16/018,702, filed Jun. 26, 2018, now issued as U.S. Pat. No. 10,669,086, which claims the benefit of U.S. provisional application 62/524,905, filed Jun. 26, 2017, the entire disclosures of all of which applications are all incorporated herein by reference in full as part of the description of the present invention.

BACKGROUND

Field

The preferred embodiments of the present invention relate to systems and methods for the manufacture of shipping envelopes, protective products and/or pouches employing expanded paper, such as, e.g., expanded slit sheet paper, for cushioning.

Discussion

The background art for the manufacturing of a shipping envelope has been manufactured with plastic bubble, plastic bubble-paper combination, shredded newsprint, Kraft paper, and the like. The plastic materials are quite flexible and, in some cases, provide adequate initial cushioning whereas the Kraft paper is somewhat less flexible. Background art paper alternatives have been costlier to manufacture and also more costly for the end user to ship due to their increased weight as compared to plastics.

The background art has been manufactured utilizing guillotine type start-stop non-rotary type manufacturing processes to manufacture padded envelopes. However, the present inventor has now determined that this and other background designs are not suitable for the manufacture of envelopes of the type of the present invention that employ, e.g., expanded slit sheet material cushioning.

SUMMARY

The preferred embodiments overcome shortcomings in the above and/or other background art.

According to some preferred embodiments, shortcomings of the prior art are overcome by provision of novel and advantageous methods of making envelopes and/or protective products that does not contain shortcomings of the background art. In accordance with some embodiments of the invention, improved mechanisms are provided for expanding expandable paper and creating envelopes and/or protective products therefrom. According to some preferred embodiments, a novel system and method is provided that employs a novel rotary die cutting-crush system that provides a superior method of stretching slit sheet material for the purposes of providing a resilient padded envelope.

The use of hexagonal cells for padded envelopes has been taught by the present inventor with nonprovisional application Ser. No. 16/531,019. To maximize the effect of the expanded slit sheet material, the ability to optimally stretch and maintain the stretch through the manufacturing process has now been found to be most advantageous and desirable.

According to some illustrative embodiments of the invention, a method for making a padded envelope is provided that includes: conveying a first sheet of paper in a conveying direction; conveying an expanded sheet of paper in an expanded state in said conveying direction with one side of said expanded sheet of paper facing said first sheet of paper; conveying a second sheet of paper in said conveying direction with an opposite side of said expanded sheet of paper in said expanded state facing said second sheet of paper; while continuing conveying movement during said conveying of said first sheet of paper, said expanded sheet of paper in said expanded state and said second sheet of paper in said conveying direction, pressing together a region of said first sheet of paper, said expanded sheet of paper and said second sheet of paper which region extends along a direction transverse to the conveying direction and causing said expanded sheet of paper to collapse within said region and said first sheet of paper, said expanded sheet of paper and said second sheet of paper to adhere together within said region.

According to some embodiments, the expanded sheet of paper in an expanded state includes a sheet of paper in which the plane of the paper varies positionally in a direction of the thickness of the expanded sheet of paper.

According to some embodiments, the expanded sheet of paper includes at least one of an expanded slit sheet paper, a folded paper sheet, an embossed paper sheet, an undulating paper sheet.

According to some other embodiments, a method for making a padded envelope is provided that includes: conveying a first sheet of paper in a conveying direction; expanding an expandable sheet of slit sheet paper into an expanded state and conveying the expandable sheet of slit sheet paper in the expanded state in said conveying direction with one side of said expandable slit sheet paper facing said first sheet of paper; conveying a second sheet of paper in said conveying direction with an opposite side of said expandable slit sheet paper in the expanded state facing said second sheet of paper; while continuing conveying movement during said conveying of said first sheet of paper, said expandable sheet of slit sheet paper in said expanded state and said second sheet of paper in said conveying direction, pressing together a region of said first sheet of paper, said expandable sheet of slit sheet paper and said second sheet of paper which region extends along a direction transverse to the conveying direction and causing said expandable sheet of paper to collapse within said region and said first sheet of paper, said expandable sheet of slit sheet paper and said second sheet of paper to adhere together within said region.

According to some embodiments, said causing said first sheet of paper, said expandable sheet of paper and said second sheet of paper to adhere together includes applying an adhesive within said region that is pressed together during said pressing together.

According to some embodiments, the method further includes while continuing conveying movement during conveying of said first sheet of paper, said expandable sheet of slit sheet paper and said second sheet of paper in said conveying direction cutting along said region that is pressed together during said pressing together such as to sever said first sheet of paper, said expandable sheet of slit sheet paper and said second sheet.

According to some embodiments, the method further includes while continuing conveying movement during conveying of said expandable sheet of slit sheet paper continuously maintaining the expandable sheet of slit sheet paper in an expanded state by pulling on a distal end of the expandable sheet of slit sheet paper without applying a pulling force on lateral sides of the expandable sheet of slit sheet paper.

According to some embodiments, the method further includes performing said pressing together employing at least one rotated member that includes at least one pressing element around a periphery thereof that is caused to press against said region that is pressed together during said pressing together upon reaching a rotational pressing position.

According to some embodiments, the method further includes that said at least one rotated member includes a rotated roller than is rotated such as to effect said pressing along with an opposing moving member.

According to some embodiments, the method further includes that said opposing moving member is a second roller that opposes said rotated roller.

According to some embodiments, the method further includes that said opposing moving member is a conveyor member that opposes said rotated roller.

According to some embodiments, the method further includes that said expanding said expandable sheet of slit sheet paper into said expanded state includes: at least one expansion roller that is configured to engage slits of the expandable slit sheet paper to expand the expandable slit sheet paper.

According to some embodiments, the method further includes that said at least one expansion roller that is configured to engage slits of the expandable slit sheet paper includes at least one expansion roller having a plurality of hooks distributed around a periphery thereof which are configured to engage slits of the expandable slit sheet paper.

According to some embodiments, the method further includes that said at least one expansion roller that is configured to engage slits of the expandable slit sheet paper includes two adjacent expansion rollers that are separated from one another in the longitudinal feeding direction of the expandable slit sheet material by a distance greater than a thickness of said expandable slit sheet material in a fully expanded state, such that the said two adjacent expansion rollers do not concurrently press against opposite sides of the expanded slit sheet material at a same longitudinal position of the expanded slit sheet material so that said two adjacent expansion rollers avoid damaging the expanded slit sheet material.

According to some embodiments, the method further includes that said expandable sheet of slit sheet paper is the only layer of expandable slit sheet paper in between said first sheet of paper and said second sheet of paper.

According to some embodiments, the method further includes that said expandable sheet of slit sheet paper is the only layer of expandable slit sheet paper in between said first sheet of paper and said second sheet of paper and wherein said expandable sheet of slit sheet paper directly contacts a side of said first sheet of paper and directly contacts a side of said second sheet of paper.

According to some embodiments, the method further includes at least one additional expandable sheet of slit sheet paper in an expanded state that is conveyed along with said expandable sheet of slit sheet paper in between said first sheet of paper and said second sheet of paper.

According to some embodiments, a method for the manufacture of envelopes is provided that includes: continuously conveying an assembly of layered sheets including a first paper sheet, at least one expanded sheet and a second paper sheet in a conveying flow between a rotary mandrel or member at an upstream position in a direction of conveyance and a rotary die crushing and cutting tool, with said rotary mandrel or member and said rotary die crushing and cutting tool maintaining the at least one expanded sheet in an expanded state, said rotary tool having a crushing component that crushes a portion of the at least one expanded sheet such as to form a flap forming region of an envelope and a cutting component that cuts the assembly of layered sheets such as to separate individual envelope units.

According to some embodiments, the method further includes that said rotary die has an outer circumference that is proportional to a length of each individual envelope unit being made.

According to some embodiments, a system for making a padded envelope is provided that includes: means for conveying a first sheet of paper in a conveying direction; means for conveying an expanded sheet of paper in an expanded state in said conveying direction with one side of said expanded sheet of paper facing said first sheet of paper; means for conveying a second sheet of paper in said conveying direction with an opposite side of said expanded sheet of paper in said expanded state facing said second sheet of paper; means for while continuing conveying movement during said conveying of said first sheet of paper, said expanded sheet of paper in said expanded state and said second sheet of paper in said conveying direction, pressing together a region of said first sheet of paper, said expanded sheet of paper and said second sheet of paper which region extends along a direction transverse to the conveying direction and causing said expanded sheet of paper to collapse within said region and said first sheet of paper, said expanded sheet of paper and said second sheet of paper to adhere together within said region.

According to some embodiments, the system further includes that said expanded sheet of paper in an expanded state includes a sheet of paper in which the plane of the paper varies positionally in a direction of the thickness of the expanded sheet of paper.

According to some embodiments, the system further includes that said expanded sheet of paper includes at least one of an expanded slit sheet paper, a folded paper sheet, an embossed paper sheet, an undulating paper sheet.

According to some embodiments, a system for making a padded envelope is provided that includes: means for conveying a first sheet of paper in a conveying direction; means for expanding an expandable sheet of slit sheet paper into an expanded state and conveying the expandable sheet of slit sheet paper in the expanded state in said conveying direction with one side of said expandable slit sheet paper facing said first sheet of paper; means for conveying a second sheet of paper in said conveying direction with an opposite side of said expandable slit sheet paper in the expanded state facing said second sheet of paper; means for while continuing conveying movement during said conveying of said first sheet of paper, said expandable sheet of slit sheet paper in said expanded state and said second sheet of paper in said conveying direction, pressing together a region of said first sheet of paper, said expandable sheet of slit sheet paper and said second sheet of paper which region extends along a direction transverse to the conveying direction and causing said expandable sheet of paper to collapse within said region and said first sheet of paper, said expandable sheet of slit sheet paper and said second sheet of paper to adhere together within said region.

According to some embodiments, the system further includes that said causing said first sheet of paper, said expandable sheet of paper and said second sheet of paper to adhere together includes applying an adhesive within said region that is pressed together during said pressing together.

According to some embodiments, the system further includes that while continuing conveying movement during conveying of said first sheet of paper, said expandable sheet of slit sheet paper and said second sheet of paper in said conveying direction cutting along said region that is pressed together during said pressing together such as to sever said first sheet of paper, said expandable sheet of slit sheet paper and said second sheet.

According to some embodiments, the system further includes that while continuing conveying movement during conveying of said expandable sheet of slit sheet paper continuously maintaining the expandable sheet of slit sheet paper in an expanded state by pulling on a distal end of the expandable sheet of slit sheet paper without applying a pulling force on lateral sides of the expandable sheet of slit sheet paper.

According to some embodiments, the system further includes that performing said pressing together employing at least one rotated member that includes at least one pressing element around a periphery thereof that is caused to press against said region that is pressed together during said pressing together upon reaching a rotational pressing position.

According to some embodiments, the system further includes that said at least one rotated member includes a rotated roller than is rotated such as to effect said pressing along with an opposing moving member.

According to some embodiments, the system further includes that said opposing moving member is a second roller that opposes said rotated roller.

According to some embodiments, the system further includes that said opposing moving member is a conveyor member that opposes said rotated roller.

According to some embodiments, the system further includes that said expanding said expandable sheet of slit sheet paper into said expanded state includes: at least one expansion roller that is configured to engage slits of the expandable slit sheet paper to expand the expandable slit sheet paper.

According to some embodiments, the system further includes that said at least one expansion roller that is configured to engage slits of the expandable slit sheet paper includes at least one expansion roller having a plurality of hooks distributed around a periphery thereof which are configured to engage slits of the expandable slit sheet paper.

According to some embodiments, the system further includes that said at least one expansion roller that is configured to engage slits of the expandable slit sheet paper includes two adjacent expansion rollers that are separated from one another in the longitudinal feeding direction of the expandable slit sheet material by a distance greater than a thickness of said expandable slit sheet material in a fully expanded state, such that the said two adjacent expansion rollers do not concurrently press against opposite sides of the expanded slit sheet material at a same longitudinal position of the expanded slit sheet material so that said two adjacent expansion rollers avoid damaging the expanded slit sheet material.

According to some embodiments, the system further includes that said expandable sheet of slit sheet paper is the only layer of expandable slit sheet paper in between said first sheet of paper and said second sheet of paper.

According to some embodiments, the system further includes that said expandable sheet of slit sheet paper is the only layer of expandable slit sheet paper in between said first sheet of paper and said second sheet of paper and wherein said expandable sheet of slit sheet paper directly contacts a side of said first sheet of paper and directly contacts a side of said second sheet of paper.

According to some embodiments, the system further includes at least one additional expandable sheet of slit sheet paper in an expanded state that is conveyed along with said expandable sheet of slit sheet paper in between said first sheet of paper and said second sheet of paper.

According to some embodiments, a system for the manufacture of envelopes is provided that includes: means for continuously conveying an assembly of layered sheets including a first paper sheet, at least one expanded sheet and a second paper sheet in a conveying flow between a rotary mandrel or member at an upstream position in a direction of conveyance and a rotary die crushing and cutting tool, with said rotary mandrel or member and said rotary die crushing and cutting tool maintaining the at least one expanded sheet in an expanded state, said rotary tool having a crushing component that crushes a portion of the at least one expanded sheet such as to form a flap forming region of an envelope and a cutting component that cuts the assembly of layered sheets such as to separate individual envelope units.

According to some embodiments, the system further includes that said rotary die has an outer circumference that is proportional to a length of each individual envelope unit being made.

According to some embodiments, a method for making a padded envelope is performed that includes:

a) providing a plurality of elongated sheets including a first elongated sheet of paper;

at least one elongated expanded sheet of paper in an expanded state with one side of said at least one expanded sheet of paper facing said first sheet of paper;

a second elongated sheet of paper with an opposite side of said at least one expanded sheet of paper in said expanded state facing said second sheet of paper;

b) repeatedly cutting segments of said plurality of elongated sheets to create a plurality of separate envelope sections from said plurality of elongated sheets;

c) continuously maintaining the at least one elongated expanded sheet in an expanded state by applying a continuous pulling force pulling forward and rearward portions of said elongated expanded sheet, including having at least one rearward member that creates a rearward pulling force on the elongated expanded sheet and having the distal forward end of the elongated expanded sheet continuously fixed with respect to at least one of said first elongated sheet of paper and said second elongated sheet of paper, even during said repeatedly cutting segments of said plurality of elongated sheets.

According to some embodiments, a method for making a padded envelope is performed that includes:

a) providing a plurality of elongated sheets including a first elongated sheet of paper that is fed in a machine direction;

at least one elongated expanded sheet of paper in an expanded state that is also fed in the machine direction with one side of said at least one expanded sheet of paper facing said first sheet of paper;

a second elongated sheet of paper that is also fed in the machine direction with an opposite side of said at least one expanded sheet of paper in said expanded state facing said second sheet of paper;

b) repeatedly cutting segments of said plurality of elongated sheets to create a plurality of separate envelope sections from said plurality of elongated sheets;

c) continuously maintaining the at least one elongated expanded sheet in an expanded state by applying a continuous pulling force in the machine direction, including having at least one member upstream in the machine direction that creates a pulling force on the elongated expanded sheet upstream in the machine direction and having the distal front end of the elongated expanded sheet continuously fixed with respect to at least one of said first elongated sheet of paper and said second elongated sheet of paper, even during said repeatedly cutting segments of said plurality of elongated sheets.

According to some embodiments, the method further includes that said expanded sheet of paper in an expanded state includes a sheet of paper in which the plane of the paper varies positionally in a direction of the thickness of the expanded sheet of paper.

According to some embodiments, the method further includes that said expanded sheet of paper includes at least one of an expanded slit sheet paper, a folded paper sheet, an embossed paper sheet, an undulating paper sheet.

According to some embodiments, the method further includes that said expanded sheet of paper includes at least one of an expanded slit sheet paper.

According to some embodiments, the method further includes that while continuing conveying movement said first sheet of paper, said expandable sheet in said expanded state and said second sheet of paper, pressing together a region of said first sheet of paper, said expandable sheet of paper and said second sheet of paper which region extends along a direction transverse to a conveying direction of the expandable sheet and causing said expandable sheet collapse within said region and said first sheet of paper, said expandable sheet and said second sheet of paper to adhere together within said region.

According to some embodiments, the method further includes that said causing said first sheet of paper, said expandable sheet of paper and said second sheet of paper to adhere together includes applying an adhesive within said region that is pressed together during said pressing together.

According to some embodiments, the method further includes that while continuing conveying movement during conveying of said first sheet of paper, said expandable sheet of and said second sheet of paper cutting along said region that is pressed together during said pressing together such as to sever said first sheet of paper, said expandable sheet of paper and said second sheet.

According to some embodiments, the method further includes that while continuing conveying movement during conveying of said expandable sheet of paper continuously maintaining the expandable sheet of paper in an expanded state by pulling on a distal end of the expandable sheet of paper without applying a pulling force on lateral sides of the expandable sheet of paper.

According to some embodiments, the method further includes that while continuing conveying movement during conveying of said expandable sheet of paper continuously maintaining the expandable sheet of paper in an expanded state by pulling on a distal end of the expandable sheet of paper without having lateral sides of the expandable sheet of paper fixed to either of the first or second sheets.

According to some embodiments, the method further includes performing said pressing together employing at least one rotated member that includes at least one pressing element around a periphery thereof that is caused to press against said region that is pressed together during said pressing together upon reaching a rotational pressing position.

According to some embodiments, the method further includes that said at least one rotated member includes a rotated roller than is rotated such as to effect said pressing along with an opposing moving member.

According to some embodiments, the method further includes that said opposing moving member is a second roller that opposes said rotated roller.

According to some embodiments, the method further includes that said opposing moving member is a conveyor member that opposes said rotated roller.

According to some embodiments, the method further includes expanding an expandable sheet of slit sheet paper into said expanded state using:

at least one expansion roller that is configured to engage slits of an expandable slit sheet paper to expand the expandable slit sheet paper.

According to some embodiments, the method further includes that said at least one expansion roller that is configured to engage slits of the expandable slit sheet paper includes at least one expansion roller having a plurality of hooks distributed around a periphery thereof which are configured to engage slits of the expandable slit sheet paper.

According to some embodiments, the method further includes that said at least one expansion roller that is configured to engage slits of the expandable slit sheet paper includes two adjacent expansion rollers that are separated from one another in the longitudinal feeding direction of the expandable slit sheet material by a distance greater than a thickness of said expandable slit sheet material in a fully expanded state, such that the said two adjacent expansion rollers do not concurrently press against opposite sides of the expanded slit sheet material at a same longitudinal position of the expanded slit sheet material so that said two adjacent expansion rollers avoid damaging the expanded slit sheet material.

According to some embodiments, the method further includes that said expandable sheet of slit sheet paper is the only layer of expanded sheet of paper in between said first sheet of paper and said second sheet of paper.

According to some embodiments, the method further includes that said expandable sheet of slit sheet paper is the only layer of expanded slit sheet paper in between said first sheet of paper and said second sheet of paper and wherein said expandable sheet of slit sheet paper directly contacts a side of said first sheet of paper and directly contacts a side of said second sheet of paper.

According to some embodiments, the method further includes at least two expandable sheets of slit sheet paper in an expanded state that are conveyed in between said first sheet of paper and said second sheet of paper.

According to some embodiments, a system for making a padded envelope is provided that includes:

a) means for providing a plurality of elongated sheets including a first elongated sheet of paper;

at least one elongated expanded sheet of paper in an expanded state with one side of said at least one expanded sheet of paper facing said first sheet of paper;

a second elongated sheet of paper with an opposite side of said at least one expanded sheet of paper in said expanded state facing said second sheet of paper;

b) means for repeatedly cutting segments of said plurality of elongated sheets to create a plurality of separate envelope sections from said plurality of elongated sheets;

c) means for continuously maintaining the at least one elongated expanded sheet in an expanded state by applying a continuous pulling force pulling forward and rearward portions of said elongated expanded sheet, including having at least one rearward member that creates a rearward pulling force on the elongated expanded sheet and having the distal forward end of the elongated expanded sheet continuously fixed with respect to at least one of said first elongated sheet of paper and said second elongated sheet of paper, even during said repeatedly cutting segments of said plurality of elongated sheets.

According to some embodiments, a system for making a padded envelope is provided that includes:

a) means for providing a plurality of elongated sheets including a first elongated sheet of paper that is fed in a machine direction;

at least one elongated expanded sheet of paper in an expanded state that is also fed in the machine direction with one side of said at least one expanded sheet of paper facing said first sheet of paper;

a second elongated sheet of paper that is also fed in the machine direction with an opposite side of said at least one expanded sheet of paper in said expanded state facing said second sheet of paper;

b) means for repeatedly cutting segments of said plurality of elongated sheets to create a plurality of separate envelope sections from said plurality of elongated sheets;

c) means for continuously maintaining the at least one elongated expanded sheet in an expanded state by applying a continuous pulling force in the machine direction, including having at least one member upstream in the machine direction that creates a pulling force on the elongated expanded sheet upstream in the machine direction and having the distal front end of the elongated expanded sheet continuously fixed with respect to at least one of said first elongated sheet of paper and said second elongated sheet of paper, even during said repeatedly cutting segments of said plurality of elongated sheets.

According to some embodiments, the system further includes that said expanded sheet of paper in an expanded state includes a sheet of paper in which the plane of the paper varies positionally in a direction of the thickness of the expanded sheet of paper.

According to some embodiments, the system further includes that said expanded sheet of paper includes at least one of an expanded slit sheet paper, a folded paper sheet, an embossed paper sheet, an undulating paper sheet.

According to some embodiments, the system further includes that said expanded sheet of paper includes at least one of an expanded slit sheet paper.

According to some embodiments, the system further includes that while continuing conveying movement said first sheet of paper, said expandable sheet in said expanded state and said second sheet of paper, pressing together a region of said first sheet of paper, said expandable sheet of paper and said second sheet of paper which region extends along a direction transverse to a conveying direction of the expandable sheet and causing said expandable sheet collapse within said region and said first sheet of paper, said expandable sheet and said second sheet of paper to adhere together within said region.

According to some embodiments, the system further includes that said causing said first sheet of paper, said expandable sheet of paper and said second sheet of paper to adhere together includes applying an adhesive within said region that is pressed together during said pressing together.

According to some embodiments, the system further includes that while continuing conveying movement during conveying of said first sheet of paper, said expandable sheet of and said second sheet of paper cutting along said region that is pressed together during said pressing together such as to sever said first sheet of paper, said expandable sheet of paper and said second sheet.

According to some embodiments, the system further includes that while continuing conveying movement during conveying of said expandable sheet of paper continuously maintaining the expandable sheet of paper in an expanded state by pulling on a distal end of the expandable sheet of paper without applying a pulling force on lateral sides of the expandable sheet of paper.

According to some embodiments, the system further includes that while continuing conveying movement during conveying of said expandable sheet of paper continuously maintaining the expandable sheet of paper in an expanded state by pulling on a distal end of the expandable sheet of paper without having lateral sides of the expandable sheet of paper fixed to either of the first or second sheets.

According to some embodiments, the system further includes performing said pressing together employing at least one rotated member that includes at least one pressing element around a periphery thereof that is caused to press against said region that is pressed together during said pressing together upon reaching a rotational pressing position.

According to some embodiments, the system further includes that said at least one rotated member includes a rotated roller than is rotated such as to effect said pressing along with an opposing moving member.

According to some embodiments, the system further includes that said opposing moving member is a second roller that opposes said rotated roller.

According to some embodiments, the system further includes that said opposing moving member is a conveyor member that opposes said rotated roller.

According to some embodiments, the system further includes expanding an expandable sheet of slit sheet paper into said expanded state using:

at least one expansion roller that is configured to engage slits of an expandable slit sheet paper to expand the expandable slit sheet paper.

According to some embodiments, the system further includes that said at least one expansion roller that is configured to engage slits of the expandable slit sheet paper includes at least one expansion roller having a plurality of hooks distributed around a periphery thereof which are configured to engage slits of the expandable slit sheet paper.

According to some embodiments, the system further includes that said at least one expansion roller that is configured to engage slits of the expandable slit sheet paper includes two adjacent expansion rollers that are separated from one another in the longitudinal feeding direction of the expandable slit sheet material by a distance greater than a thickness of said expandable slit sheet material in a fully expanded state, such that the said two adjacent expansion rollers do not concurrently press against opposite sides of the expanded slit sheet material at a same longitudinal position of the expanded slit sheet material so that said two adjacent expansion rollers avoid damaging the expanded slit sheet material.

According to some embodiments, the system further includes that said expandable sheet of slit sheet paper is the only layer of expanded sheet of paper in between said first sheet of paper and said second sheet of paper.

According to some embodiments, the system further includes that said expandable sheet of slit sheet paper is the only layer of expanded slit sheet paper in between said first sheet of paper and said second sheet of paper and wherein said expandable sheet of slit sheet paper directly contacts a side of said first sheet of paper and directly contacts a side of said second sheet of paper.

According to some embodiments, the system further includes at least two expandable sheets of slit sheet paper in an expanded state that are conveyed in between said first sheet of paper and said second sheet of paper.

According to some embodiments, the method and/or system includes that the extendable paper is an extensible paper having an extensibility, as measured in a pre-slit configuration, of 3 to 20% in the cross direction.

According to some embodiments, the method and/or system includes that the extendable paper is an extensible paper having an extensibility, as measured in a pre-slit configuration, of 4 to 20% in the cross direction.

According to some embodiments, the method and/or system includes that the extendable paper is an extensible paper having an extensibility, as measured in a pre-slit configuration, of 5 to 20% in the cross direction.

According to some embodiments, the method and/or system includes that the extendable paper is an extensible paper having an extensibility, as measured in a pre-slit configuration, of 6 to 20% in the cross direction.

According to some embodiments, the method and/or system includes that the extendable paper is an extensible paper having an extensibility, as measured in a pre-slit configuration, of 7 to 20% in the cross direction.

According to some embodiments, the method and/or system includes that the extendable paper is an extensible paper having an extensibility, as measured in a pre-slit configuration, of 8 to 20% in the cross direction.

According to some embodiments, the method and/or system includes that the extendable paper is an extensible paper having an extensibility, as measured in a pre-slit configuration, of 3 to 20% in the machine direction.

According to some embodiments, the method and/or system includes that the extendable paper is an extensible paper having an extensibility, as measured in a pre-slit configuration, of 4 to 20% in the machine direction.

According to some embodiments, the method and/or system includes that the extendable paper is an extensible paper having an extensibility, as measured in a pre-slit configuration, of 5 to 20% in the machine direction.

According to some embodiments, the method and/or system includes that the extendable paper is an extensible paper having an extensibility, as measured in a pre-slit configuration, of 6 to 20% in the machine direction.

According to some embodiments, the method and/or system includes that the extendable paper is an extensible paper having an extensibility, as measured in a pre-slit configuration, of 7 to 20% in the machine direction.

According to some embodiments, the method and/or system includes that the extendable paper is an extensible paper having an extensibility, as measured in a pre-slit configuration, of 8 to 20% in the machine direction.

According to some illustrative embodiments of the invention, envelopes and/or other protective products can be created with systems and/or methods described herein that include some or all of the following aspects.

According to some preferred embodiments, a protective product manufactured can include: at least one expandable slit paper sheet, said at least on expandable slit paper being expanded between opposing ends of said slit paper; a first embossed paper sheet facing said expanded slit paper sheet and a second paper sheet facing an opposite side of said at least one expanded slit paper sheet, at least one of said first embossed paper sheet and said second paper sheet being fixed to said expanded slit paper sheet at the opposing ends of said expanded slit paper sheet and thereby maintaining said expanded paper in its expanded state, said first embossed paper sheet having a plurality of embossings that increase the rigidity of said embossed paper sheet, whereby inhibiting deformation of said embossed paper sheet that is fixed to said expanded slit sheet paper. In some embodiments, the plurality of embossings in said embossed paper sheet include an array of embossed shapes distributed on a face of said embossed paper sheet. In some embodiments, the array of embossed shapes includes an array of polygons that share a side with an adjacent polygon. In some embodiments, the array of embossed shapes includes an array of hexagons that share a side with an adjacent hexagon.

In some embodiments, an expandable slit sheet paper employed can have a weight in the range from about 30 to 50 pounds per 3,000 sq. ft. In some embodiments, one of the first paper sheet and the second paper sheet forming upper and lower sides of an envelope can include a non-embossed Kraft sheet having a weight of 40 #paper or more under the TAPPI standard paper weight specification for 3000 square feet and said second paper sheet is embossed. In some embodiments, one of said first paper sheet and said second paper sheet is a non-embossed Kraft sheet having a weight of 60 #paper or more under the TAPPI standard paper weight specification for 3000 square feet.

In some preferred embodiments, the envelope that is formed can include at least one expanded slit paper sheet that is at least one substantially rectangular sheet that is fixed to at least one of the first paper sheet and the second paper sheet only at two opposite end regions of said at least one expanded slit paper sheet. In some preferred embodiments, said two opposite end regions of said at least one expanded slit paper sheet are opposite ends of said at least one expanded slit paper sheet in an expansion direction of the at least one expanded slit paper sheet. In some embodiments, said at least one expanded slit paper sheet includes two expanded slit paper sheets that are alongside and directly contact each other.

In some embodiments, the envelope that is formed can include that said first paper sheet and said second paper sheet contact said at least one expanded slit paper sheet across a substantial portion of the area of said at least one expanded slit paper sheet but are free from connection to said at least one expanded slit paper sheet across said substantial portion of the area of said at least one expanded slit paper sheet.

In some embodiments, the envelope that is formed includes a pouch including a cushioning walls, with the second paper sheet being an interior layer forming an interior wall of the pouch, the first paper sheet being an exterior layer forming an exterior wall of the pouch, and the at least one expanded slit paper sheets being between the interior layer and the exterior layer.

In some embodiments, the envelope that is formed includes that said cushioning wall of said pouch is folded along a fold line such that the cushioning wall forms both front and back walls of said pouch and such that said first paper sheet is an exterior layer on both front and back faces of the front and back walls of said pouch and wherein adhesive is applied along said fold line to at least one of said first paper sheet and second paper sheet.

In some embodiments, the envelope that is formed includes that the back wall of said pouch is longer than the front wall of said pouch, and wherein a portion of said first paper sheet that extends beyond an end of the front wall has an adhesive strip fixed thereto with a removable release liner for adhesively closing said envelope by removing the release liner and adhering said adhesive strip to the front wall.

Illustrative Expansion System and Method Features for Making Envelopes and Protective Products in Some Embodiments According to some illustrative embodiments of the invention, envelopes and/or other protective products can be created by employing expansion system components and methods that include some or all of the following aspects described in this section.

In accordance with some illustrative embodiments, a novel expandable slit paper expansion device design is provided that, among other things, avoid complications of prior systems and eliminates the crushing effect of the rollers. Among other things, some preferred embodiments provide a unique structure that provides a novel "S" shape path of the expandable slit sheet paper, such that the expandable slit sheet paper is tortuously weaved between at least two expansion rollers without being compressed therebetween, in a manner that the expandable slit sheet paper follows along surfaces of the expansion rollers without pinching or compression that occurs in the background art.

Among other things, some embodiments of the present invention provide a novel and advantageous configuration that, e.g., improves handling of expandable slit sheet paper and avoids damage, such as, e.g., crushing or the like.

According to some preferred embodiments of the invention, a system having an expander for expanding and feeding an expandable slit sheet material with reduced damage to the expandable slit sheet material is provided that includes: a) at least one first roller for feeding the expandable slit sheet material, the at least one first roller being adapted to rotate to move the expandable slit sheet material downstream at a first reduced rate; b) at least two expansion rollers located downstream from the at least one first roller which receive the expandable slit sheet material from the at least one first roller, the at least two expansion rollers being adapted to rotate to move the expandable slit sheet material further downstream at a second rate that is faster than the first reduced rate, such as to cause the expandable slit sheet material to expand due to the second rate being faster than the first reduced rate; c) the at least two expansion rollers including two adjacent expansion rollers arranged to adjacent one another, at least one of the two adjacent expansion rollers including a plurality of hooks distributed around a periphery thereof which are configured to engage slits of the expandable slit sheet material; d) the two adjacent expansion rollers being separated from one another by a distance greater than a thickness of the expandable slit sheet material in an expanded state, such that the two adjacent expansion rollers do not concurrently press against opposite sides of the expanded slit sheet material at a same longitudinal position of the expanded slit sheet material so that the two adjacent expansion rollers avoid damaging the expanded slit sheet material.

According to some exemplary embodiments, the two adjacent expansion rollers are arranged such that a portion of the path of the expanded slit sheet material passing around the two adjacent expansion rollers is S-shape, with the path curving in a first direction around a periphery of one of the two adjacent expansion rollers and then in a second direction that is away from the first direction around a periphery of the other of the two adjacent rollers.

According to some exemplary embodiments, the system is an envelope manufacturing system.

According to some exemplary embodiments, the system is configured to manufacture an envelope having the expanded slit sheet material in a peripheral wall of the envelope for protection of an item within the envelope.

According to some other preferred embodiments, a method of using the system of according to the above preferred embodiment(s) is performed that includes: manufacturing a plurality of envelopes each having expanded slit sheet material in a peripheral wall of the envelope for protection of items within the envelope.

According to some exemplary embodiments, the system further includes a controller for controlling the rotation of the at least two expansion rollers.

According to some exemplary embodiments, the two adjacent expansion rollers are separated from one another by a distance greater than the thickness of the expandable slit sheet material and up to 140% of the thickness. According to some exemplary embodiments, the two adjacent expansion rollers are separated from one another by a distance greater than the thickness of the expandable slit sheet material and up to 160% of the thickness. According to some exemplary embodiments, the two adjacent expansion rollers are separated from one another by a distance greater than the thickness of the expandable slit sheet material and up to 180% of the thickness. According to some exemplary embodiments, the two adjacent expansion rollers are separated from one another by a distance greater than the thickness of the expandable slit sheet material and up to 200% of the thickness. According to some exemplary embodiments, the two adjacent expansion rollers are separated from one another by a distance greater than the thickness of the expandable slit sheet material and up to 240% of the thickness. According to some exemplary embodiments, the two adjacent expansion rollers are separated from one another by a distance greater than the thickness of the expandable slit sheet material and up to 260% of the thickness. According to some exemplary embodiments, the two adjacent expansion rollers are separated from one another by a distance greater than the thickness of the expandable slit sheet material and up to 300% of the thickness.

According to some exemplary embodiments, the two adjacent expansion rollers are arranged such that the path of the expanded slit sheet material passing around each of the two adjacent expansion rollers includes the expanded slit sheet material contacting each of the two adjacent expansion rollers around respective arcs of at least 40 degrees around each of the adjacent expansion rollers. According to some exemplary embodiments, the two adjacent expansion rollers are arranged such that the path of the expanded slit sheet material passing around each of the two adjacent expansion rollers includes the expanded slit sheet material contacting each of the two adjacent expansion rollers around respective arcs of at least 60 degrees around each of the adjacent expansion rollers. According to some exemplary embodiments, the two adjacent expansion rollers are arranged such that the path of the expanded slit sheet material passing around each of the two adjacent expansion rollers includes the expanded slit sheet material contacting each of the two adjacent expansion rollers around respective arcs of at least 90 degrees around each of the adjacent expansion rollers. According to some exemplary embodiments, the two adjacent expansion rollers are arranged such that the path of the expanded slit sheet material passing the one of the two adjacent expansion rollers includes the expanded slit sheet material contacting the one of the two adjacent expansion rollers around an arc of between 180 degrees and 270 degrees. According to some exemplary embodiments, the two adjacent expansion rollers are arranged such that the path of the expanded slit sheet material passing the other of the two adjacent expansion rollers includes the expanded slit sheet material contacting the other of the two adjacent expansion rollers around an arc of between 180 degrees and 270 degrees.

According to some preferred embodiments, a system having an expander for expanding and feeding an expandable slit sheet material with reduced damage to the expandable slit sheet material is provided that includes: a) a feeder that feeds or allows feeding of the expandable slit sheet material downstream; b) at least two expansion rollers located downstream from the feeder which receive the expandable slit sheet material from the feeder, the at least two expansion rollers being adapted to rotate to move the expandable slit sheet material further downstream at a faster rate than a rate of the expandable slit sheet material proximate the feeder, such as to cause the expandable slit sheet material to expand due to the increased faster rate; c) the at least two expansion rollers including two expansion rollers arranged such as to be separated in a longitudinal feeding direction of the expandable slit sheet material, at least one of the two adjacent expansion rollers including a plurality of hooks distributed around a periphery thereof which are configured to engage slits of the expandable slit sheet material; d) the two adjacent expansion rollers being separated from one another in the longitudinal feeding direction of the expandable slit sheet material by a distance greater than a thickness of the expandable slit sheet material in a fully expanded state, such that the two adjacent expansion rollers do not concurrently press against opposite sides of the expanded slit sheet material at a same longitudinal position of the expanded slit sheet material so that the two adjacent expansion rollers avoid damaging the expanded slit sheet material.

According to some exemplary embodiments, the feeder includes a first feeding roll that is adapted to rotate at a reduced rate (in some other embodiments, the feeder can include a non-rotated bar around which the extendable paper passes in feeding downstream and/or another feeding mechanism that actively or passively directs or allows the expandable sheet to be fed downstream).

According to some exemplary embodiments, the two adjacent expansion rollers are arranged such that a portion of the path of the expanded slit sheet material passing around the two adjacent expansion rollers is S-shape, with the path curving in a first direction around a periphery of one of the two adjacent expansion rollers and then in a second direction that is away from the first direction around a periphery of the other of the two adjacent rollers.

According to some exemplary embodiments, the distance is greater than ½ inch. According to some exemplary embodiments, the distance is greater than 4 inches. According to some exemplary embodiments, the distance is greater than 6 inches. According to some exemplary embodiments, the system is an envelope manufacturing system.

According to some exemplary embodiments, the system is configured to manufacture an envelope having the expanded slit sheet material in a peripheral wall of the envelope for protection of an item within the envelope.

According to some exemplary embodiments, the at least one of the two adjacent expansion rollers including a plurality of hooks distributed around a periphery thereof which are configured to engage slits of the expandable slit sheet material includes an upstream-most one of the two adjacent expansion rollers.

According to some exemplary embodiments, the two adjacent expansion rollers are arranged such that the path of the expanded slit sheet material passing around each of the two adjacent expansion rollers includes the expanded slit sheet material a most upstream one of the two adjacent expansion rollers around an arc of at least 40 degrees therearound.

According to some exemplary embodiments, the two adjacent expansion rollers are arranged such that the path of the expanded slit sheet material passing around each of the two adjacent expansion rollers includes the expanded slit sheet material contacting a most upstream one of the two adjacent expansion rollers around an arc of at least 60 degrees therearound.

According to some exemplary embodiments, the two adjacent expansion rollers are arranged such that the path of the expanded slit sheet material passing around each of the two adjacent expansion rollers includes the expanded slit sheet material a most upstream one of the two adjacent expansion rollers around an arc of at least 90 degrees therearound.

Illustrative Additional Systems and Methods for Making Envelopes and Protective Products The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF DRAWINGS

A number of preferred embodiments of the invention will be described with the accompanying drawings, in which.

PRELIMINARY ASPECTS RELATED TO SOME OF THE PREFERRED EMBODIMENTS

Figure 1:
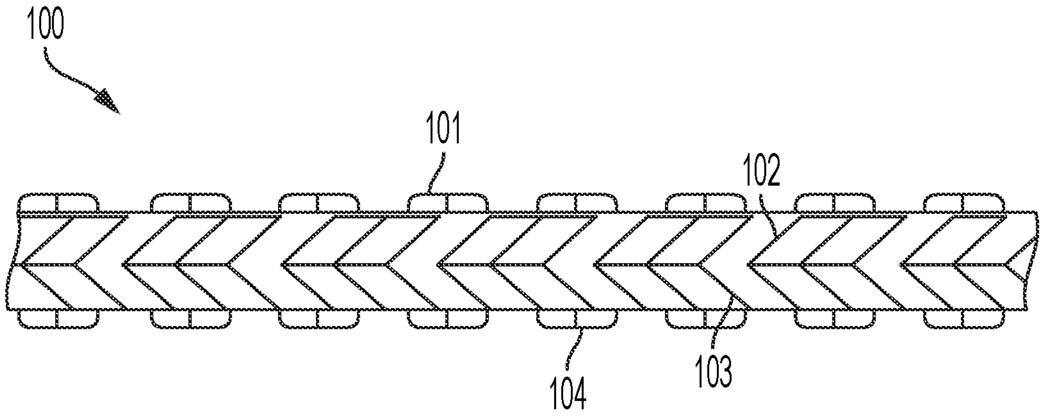
FIG. 1 is a side view of the composite material of expanded slit sheets enveloped in indented Kraft sheets.

This section sets forth some definitions that can be employed in relation to some of the preferred embodiments of the invention.

In some preferred embodiments, the term "envelope" is a package having an opening within which one or more item(s) can be inserted for storage and/or shipping. In some preferred embodiments, the opening of an "envelope" is closeable and sealable after the item or items is inserted for storage and/or shipping, such as, e.g., shipping via shipping services.

In some preferred embodiments, the term "pouch" refers to an area within an envelope in which one or more item(s) for storage and/or shipment is placed. In some preferred embodiments, the filled envelope can be placed within a shipping container.

In some preferred embodiments, the term "in-the-box shipping" of envelopes refers to a context in which an envelope is shipped within a box or container (such as, e.g., within a corrugated box). For example, such box or container can be employed to ship a plurality of envelopes contained therein and/or one or more envelope along with any other number of items. In the context of in-the box shipping of an envelope, the materials of the envelope can be modified, such as, e.g., to employ lighter paper and/or to not employ a durable and/or anti-rip outer layer which may otherwise be required which shipping the envelope without the protection of a surrounding box during in-the box shipping.

In some preferred embodiments, the terms "outer layer" and "exterior layer" means, in regard to an envelope, an outermost layer of the envelope.

In some preferred embodiments, the terms "inner layer" and "interior layer" mean, in regard to an envelope, a layer of the envelope that forms an interior surface of the envelope. For example, an item placed within an envelope would typically be in contact with an interior surface of the envelope.

In some preferred embodiments, the term "mailing envelope" refers to an envelope designed for shipping by USPS, UPS, FedEx and/or the like without being contained within a box or container as in the case of in-the box shipping. In the preferred embodiments, a mailing envelope preferably has a durable outer layer to compensate for shipping by itself without external protection of a box or container (e.g., to avoid ripping or tearing).

In some preferred embodiments, the terminology "uniformly opening slit" means slits as disclosed and/or claimed in PCT/US2014/054615.

In some preferred embodiments, the terminology "randomly opening slit" means slits as disclosed and/or claimed in U.S. patent application publication 2017/0203866, published Jul. 20, 2017. In some examples of this latter '866 publication, at least some adjacent layers have differing angles of inclination of land areas, resisting contraction and/or nesting.

In some preferred embodiments, the terminology "expandable" as applied to paper sheets, means a paper having a slit pattern that enables expansion of the paper, such as, e.g., as disclosed in U.S. Pat. Nos. (a) U.S. Pat. No. 5,538,778, (b) U.S. Pat. No. 5,667,871, (c) U.S. Pat. No. 5,688,578, and (d) U.S. Pat. No. 5,782,735 and in PCT Application No. PCT/US2014/054615, the entire disclosures of which patents and PCT application are all incorporated by reference herein as though recited in full. In the preferred embodiments, a slit pattern is configured to enable the paper to be expanded lengthwise, with a related decrease in width. In some embodiments, the slit pattern produces a paper that increases in length due to the slit pattern when processed in an expander, such as, e.g., an expander of the type described in any of the following U.S. and PCT applications (a) 2017/0203866, (b) 2018/022266, (c) 2018/0127197, and (d) PCT/US2014/054615, incorporated herein by reference in their entireties.

Figure 33:
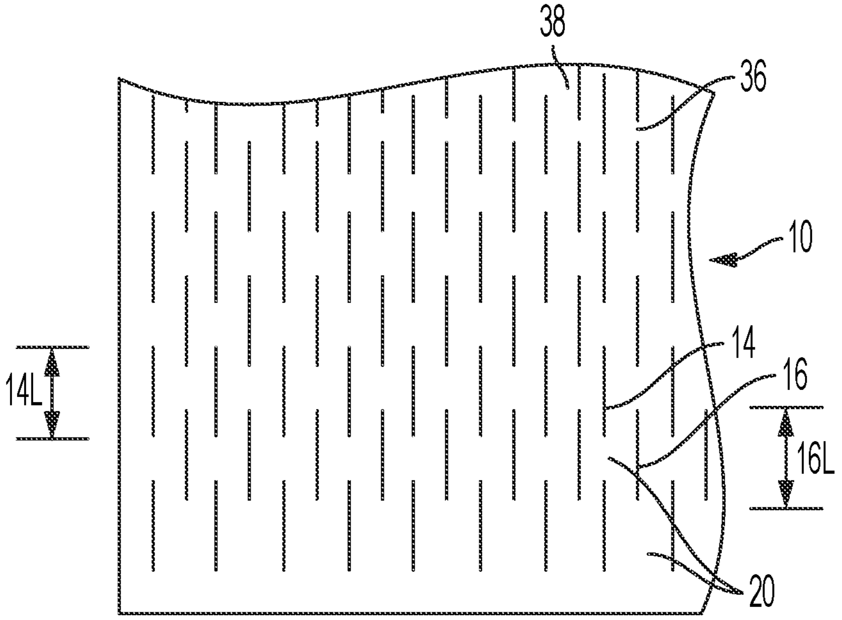
FIG. 33 is a plan view of an illustrative expandable slit sheet paper in an unexpanded state.
Figure 34:
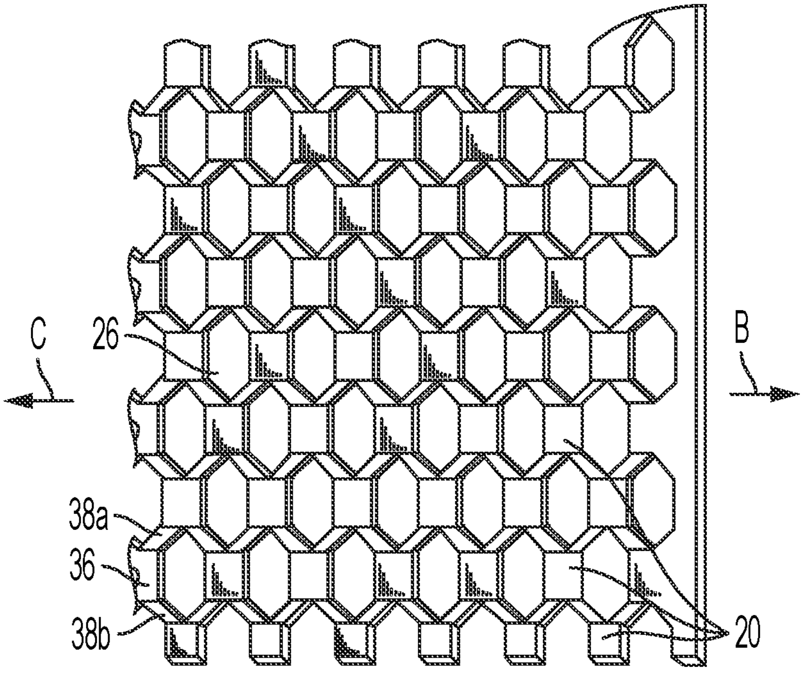
FIG. 34 is a plan view of the illustrative expandable slit sheet paper in an expanded state.

By way of example, FIGS. 33 and 34 depict an illustrative expandable slit sheet paper that can be expanded with systems and methods of the present invention in some illustrative embodiments of the invention. Towards that end, FIG. 33 is an illustration of an exemplary slit pattern in an illustrative expanded slit sheet. The expandable slit sheet paper shown in FIG. 33 operates as an expandable cell-forming paper that can be expanded to an expanded state as shown in FIG. 34. FIG. 33 shows an illustrative section of an expandable slit sheet 10 in an unexpanded (unopened) state, with staggered rows of slits 14 and 16 that extend entirely through the width of the sheet 10, and land portions 20 extending between adjacent slits within rows 14 and 16. As shown in FIG. 33, in some preferred embodiments, the slit lengths 14L and 16L are uniform across the face of the sheet 10; similarly, the distance and area of each row spacing 38 (i.e., between adjacent rows) and each slit spacing 36 (i.e., between adjacent slits) are also uniform. Although an expandable slit sheet can be formed with a variety of slit patterns, the illustrative example shown in FIGS. 33 and 34 depict an illustrative example to scale with illustrative lengths of slits, spacing between slits, proportional relationships of sizes of created hexagonal cells, land portions and leg portions, etc., according to some illustrative examples with such as drawings being to scale in some illustrative and non-limiting embodiments. In FIG. 34, the sheet 10 shown in FIG. 33 has been subjected to an expansion force in the direction of arrows B and C and opened to an open cell formation. In that regard, in this illustrated example, the open cell formation results in hexagonal shaped cells as shown in FIG. 134. In particular, as depicted, the slits 14 and 16 are in an opened state in which the sheet 10 is oriented to have an array of three-dimensional hexagonal cells 26, with substantially rectangular land portions 20 within the slit spacings 36 situated at an inclined angle (i.e., such as to be transverse to the original plane of the sheet 10), and the leg portions 38*a* and 38*b* connecting the land portions between the row spacings having been warped to, e.g., slightly less than a 90° angle to the original plane of the sheet. The leg portions 38*a* and 38*b* are basically mirror images of one another and connect the land portions 20 such as to form the three-dimensional hexagonal cells.

As explained herein, in the preferred embodiments, systems and methods of the preferred embodiments of the present invention can be employed for expanding an expandable slit sheet similar to that shown in FIGS. 33 and 34, in an optimal manner maintaining the quality and integrity of the expanded slit sheet, including avoiding crushing and/or otherwise damaging or compromising the expanded slit sheet and/or the manageability of the expanded slit sheet.

In some preferred embodiments, the term "slit sheet" means an expandable paper sheet having a slit pattern, such as, e.g., disclosed in U.S. application publications (a) 2017/0203866, (b) 2018/0222665, and (c) 2018/0127197 and in PCT application PCT/US2014/054615, incorporated herein by reference in their entireties.

In some preferred embodiments, the term "envelope pad" includes a pad that is incorporated in an envelope to protect one or more item contained within the envelope. In some preferred embodiments, an envelope refers to the intermediate manufacturing process where the envelope has been cut and crushed to enable the next step of folding and gluing into its final envelope form.

In some preferred embodiments, the term "padded envelope" refers to a final envelope product design that provides a cushioning flexible shipping package.

In some preferred embodiments, the term "mouth" refers to a portion of the envelope that allows one or more item(s) to be placed within the envelope. In some embodiments, the mouth is formed when an envelope pad is glued into the shape of a padded envelope to create a pouch.

In some preferred embodiments, the term "extensible" as applied to paper sheets, means a paper as set forth in co-pending U.S. patent application Ser. No. 16/018,702, entitled Extensible Paper and Its Use In the Production of Expanded Slit Packaging and Void Fill Products, the entire disclosure of which is incorporated herein by reference. In addition, the term "extensible" as applied to paper sheets also includes paper that is processed such that a paper sheet is able to stretched, including extensible papers as described in the following U.S. Patents, Patent publications, and pending applications: (a) U.S. Pat. No. 3,908,071, (b) U.S. patent application Ser. No. 14/901,977 (U.S. Pat. No. 9,945,077), (c) PCT Publication No. WO1984002936, (d) U.S.

Application Publication No. US2002/0060034, (e) U.S. Application Publication No. US2007/0240841 (U.S. Pat. No. 7,918,966), (f) U.S. Pat. No. 3,104,197, (g) U.S. Pat. No. 3,220,116, (h) U.S. Pat. No. 3,266,972, (i) U.S. Pat. No. 3,269,393, (j) U.S. Pat. No. 3,908,071, (k) U.S. Pat. No. 6,024,832, (l) U.S. Pat. No. 6,458,447, and (m) U.S. Pat. No. 6,712,930, the disclosures of which are all incorporated by reference herein, as though recited in their entireties.

In some illustrative preferred embodiments, an extensible paper employed has an extensible range, as measured in a pre-slit configuration, of 3 to 20% in the machine direction. In some illustrative preferred embodiments, an extensible paper employed has an extensible range, as measured in a pre-slit configuration, of 3 to 15% in the machine direction. In some illustrative preferred embodiments, an extensible paper employed has an extensible range, as measured in a pre-slit configuration, of not less than 5% in both the machine direction and the cross direction.

In some illustrative preferred embodiments, an extensible paper employed has an extensible range, as measured in a pre-slit configuration, of from 1-9% in a machine direction and 1-5% in a cross direction. In some illustrative preferred embodiments, an extensible paper employed has an extensible range, as measured in a pre-slit configuration, of from 3-9% in the machine direction and not less than 5% in the cross direction. In some illustrative preferred embodiments, an extensible paper employed has an extensible range, as measured in a pre-slit configuration, of 3-11.1% in the machine direction, or, in some embodiments of 3.3-10.6% in the machine direction.

In some of the more preferred embodiments, an extensible paper employed has an extensible range, as measured in a pre-slit configuration, of 4 to 20% in the machine direction, or, in some embodiments, greater than 20% in the machine direction.

In some of the more preferred embodiments, an extensible paper employed has an extensible range, as measured in a pre-slit configuration, of 5 to 20% in the machine direction, or, in some embodiments, greater than 20% in the machine direction.

In some of the more preferred embodiments, an extensible paper employed has an extensible range, as measured in a pre-slit configuration, of 6 to 20% in the machine direction, or, in some embodiments, greater than 20% in the machine direction.

In some of the more preferred embodiments, an extensible paper employed has an extensible range, as measured in a pre-slit configuration, of 7 to 20% in the machine direction, or, in some embodiments, greater than 20% in the machine direction.

In some of the more preferred embodiments, an extensible paper employed has an extensible range, as measured in a pre-slit configuration, of 8 to 20% in the machine direction, or, in some embodiments, greater than 20% in the machine direction.

In some of the more preferred embodiments, an extensible paper employed has an extensible range, as measured in a pre-slit configuration, of 3 to 20% in the cross direction (i.e., the direction parallel to the length of the slits which is transverse to the direction of expansion), or, in some embodiments, greater than 20% in the cross direction.

In some of the more preferred embodiments, an extensible paper employed has an extensible range, as measured in a pre-slit configuration, of 4 to 20% in the cross direction, or, in some embodiments, greater than 20% in the cross direction.

In some of the more preferred embodiments, an extensible paper employed has an extensible range, as measured in a pre-slit configuration, of 5 to 20% in the cross direction, or, in some embodiments, greater than 20% in the cross direction.

In some of the more preferred embodiments, an extensible paper employed has an extensible range, as measured in a pre-slit configuration, of 6 to 20% in the cross direction, or, in some embodiments, greater than 20% in the cross direction.

In some of the more preferred embodiments, an extensible paper employed has an extensible range, as measured in a pre-slit configuration, of 7 to 20% in the cross direction, or, in some embodiments, greater than 20% in the cross direction.

In some of the more preferred embodiments, an extensible paper employed has an extensible range, as measured in a pre-slit configuration, of 8 to 20% in the cross direction, or, in some embodiments, greater than 20% in the cross direction.

In some preferred embodiments, the extensible paper is a non-woven fibrous material with fibre-to-fibre bonding that resists tearing upon 3-15% expansion in the machine direction as measured in a non-slit configuration.

In some preferred embodiments, the extensible paper is formed by being pre-compressed between two different members contacting opposite sides of the paper web. For example, in some embodiments, the extensible paper is formed by the paper web being pre-compressed between two different rollers having different roller surfaces and/or rotations, or the extensible paper is formed by the paper web being inserted between a roll and an endless pre-stretched blanket to compress the paper web with a nip bar and the blanket. In some preferred embodiments, the extensible paper is formed by being pre-compressed such as to create an extensible paper of a non-woven fibrous material with increased fibre-to-fibre bonding.

In some preferred embodiments, the term "stretching direction" refers to the direction in which a slit paper sheet is subjected to a pulling or stretching force. In the preferred embodiments, the stretching direction is transverse to the direction of the slits of the slit sheet material. In some preferred embodiments, the stretching direction is the machine direction.

In some preferred embodiments, an extensible paper can be formed using methods as described in U.S. Pat. No. 3,908,071, incorporated herein by reference in its entirety. For reference, the following is a direct quote of the paragraph on column 1, lines 4-19, of U.S. Pat. No. 3,908,071: "Extensible (compacted) paper produced, for example, in accordance with the apparatus and process disclosed in U.S. Pat. No. 2,624,245 has certain well recognized advantages and commercial uses. Such paper is subjected, while in a partially moistened condition, to compressive compaction in the direction of web movement (machine direction or MD) between a pressure nip, thus compacting and forcing the fibers together to produce an inherent stretchability without creping. Compacted paper has improved tensile energy absorption (TEA) burst and tear characteristics which are highly desirable for such end uses as the manufacture of paper sacks."

In some preferred embodiments, an extensible paper can be formed using methods as described in U.S. Pat. No. 6,024,832, incorporated herein by reference in its entirety. For reference, the following is a direct quote of the Abstract of U.S. Pat. No. 6,024,832: "A method for producing extensible paper, comprising the following stages: feeding a mix of vegetable fibres to a kneader member, mixing the mix with water in the kneader, beating the fibres to obtain a pulp, transferring the beaten pulp into a flow chest, feeding the beaten pulp from the flow chest onto a paper web formation cloth with consequent reduction of the water percentage by gravity and vacuum, pressing the web, with consequent further reduction of its water content, initial drying of the paper web to a substantially constant moisture content of between 15% and 65%, compacting, final drying to a moisture content of between 15% and 4%, preferably 10%-8%, glazing, wherein: the beating stage is carried out by rubbing the fibres in a multistage unit to obtain a pulp having a degree of beating of at least 30.degree. SR, the compacting stage is carried out between at least a pair of rollers of which one is of hard material comprising circumferential surface ribs and driven at greater speed, and the other is of soft material with a smooth surface and driven at lesser speed."

In some preferred embodiments, an extensible paper can be formed using methods as described in U.S. Pat. No. 9,945,077, incorporated herein by reference in its entirety. For reference, the following is a direct quote of the 2nd paragraph of the Background section of U.S. Pat. No. 9,945,077: "On the other hand, Clupak refers to equipment that inserts a paper web between a roll and an endless rubber blanket to compress the paper web with a nip bar and the rubber blanket, while at the same time the pre-stretched blanket shrinks to cause the paper web to also shrink and thereby increase its breaking elongation, and this equipment is used to provide increased breaking elongation to kraft paper used in heavy packaging applications as mentioned above." For further reference, the following is a direct quote of U.S. Pat. No. 9,945,077, column 6, first paragraph: "The manufacturing method using this Clupak system is such that a paper web is inserted between a roll and an endless rubber blanket to compress the paper web with a nip bar and the rubber blanket, while at the same time the pre-stretched blanket shrinks to cause the paper web to also shrink and thereby increase its breaking elongation. The Clupak system allows for adjustment of the breaking elongation of kraft paper in the longitudinal direction according to the ratio of the manufacturing speed on the inlet side of the Clupak system and manufacturing speed on the outlet side of the Clupak system, and also according to the pressurization force applied by the nip bar."

In some preferred embodiments, an extensible paper can be formed using methods as described in U.S. Pat. No. 3,104,197, incorporated herein by reference in its entirety. For reference, the following is a direct quote of the paragraph on column 2, lines 41-56 of U.S. Pat. No. 3,104,197: "The use of rubber or rubberous material in conjunction with a hard surface in the manner described is known in the treatment of paper as well as fabrics but only in a general way and the present invention includes the use of rubber considerably softer and more elastic than previously used. Also of great importance in the production of an extensible paper by creping it in this manner is the differential in speeds at which the rolls are driven. If the proper combination of hard and soft surfaces is provided, a semi-dry paper web passing through the nip of the rolls will be carried by the contracting rubber against the direction of web travel toward the nip and over the surface of the hard roll. This creates a uniformly compressed crepe in the paper web giving toughness, pliability, and extensibility."

In some preferred embodiments, the term "extensible slit sheet paper" means a paper that is both extensible and expandable as disclosed in U.S. patent application Ser. No. 16/018,702 (U.S. Application Publication No. U.S. 2018/0370702, published Dec. 27, 2018), the entire disclosure of which is incorporated herein by reference.

Figure 3:
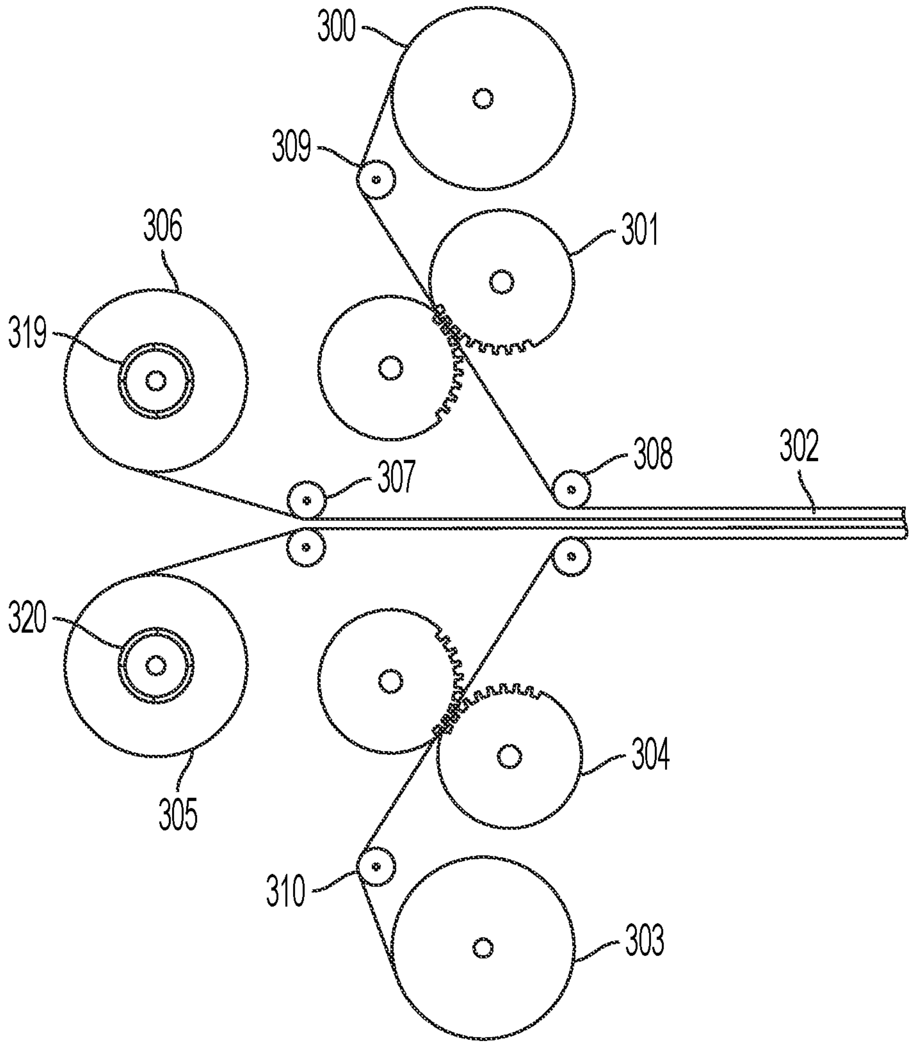
FIG. 3 is a schematic side view of the manufacturing process.

In some preferred embodiments, the term "embossed" means to raise and/or to lower a region of a sheet of paper. Most preferably, embossments involve raised and/or lowered regions of a sheet of paper which are raised and/or lowered by the application of a force such as to press the paper to assume an embossed shape in which the pressure causes deformation in the sheet of paper such as to have a shape including such raised and/or lowered regions. In some preferred embodiments, the sheet of paper is initially substantially planar and without the raised and/or lowered regions of the embossments in an initial state, and, then, the sheet of paper is pressed to cause deformation in the sheet of paper including raised and/or lowered regions. These raised and/or lowered regions from the original plane of the original planar sheet of paper are referred to, in the most preferred embodiments, as "embossed" regions or "embossments." By way of example, in the most preferred embodiments, embossments are created by pressing an initial sheet (e.g., a planar or substantially planar sheet) between opposing pressing surfaces, such as, e.g., (1) between die plates that are reciprocated relative to one another to press the surface of the planar sheet, wherein the die plates have a pattern of raised and lowered regions (e.g., male and female regions) that create a cross pressure on the face of the planar sheet to cause the sheet to deform and form embossments and/or (2) between two rollers (such as, for example, as shown in the embodiment of FIG. 3) wherein the rollers have a pattern of raised and lowered regions (e.g., male and female regions) that create a cross pressure on the face of the planar sheet to cause the sheet to deform and form embossments. In some embodiments, embossments can involve pressure applied by a single reciprocated die plate that has a raised/lowered embossment pattern that presses against a first surface of the paper, while an opposite side of the paper is pressed or supported by a resilient (e.g., rubber) member that flexibly receives the raised and/or lowered portions to cooperative cause embossments in the paper sheet. Similarly, in some embodiments, embossments can involve pressure applied by a single roll die that has a raised/lowered embossment pattern that presses against a first surface of the paper, while an opposite side of the paper is pressed or supported by a resilient (e.g., rubber) roll member, or other surface member, such as a conveyor or other member, that flexibly receives the raised and/or lowered portions to cooperative cause embossments in the paper sheet In some preferred embodiments, embossments are formed in a repeating pattern along a conveyed sheet of paper that is conveyed from an initial roll. In some preferred embodiments, the embossments define discrete shapes that are displaced from the original plane of the paper (e.g., raised and/or lowered) within separated regions along the face of the sheet of paper. In some preferred embodiments, these discrete regions can have an irregular shape, while in some embodiments, these discrete regions can have a circular shape, elliptical shape, oval shape, polygonal shape, triangular shape, square shape, pentagonal shape, hexagonal shape, octagonal shape and/or other shapes. In the most preferred embodiments, the embossments have a hexagonal shape. Here, the terminology "shape" of the embossments in the above paragraph refers to the shape of the embossments as viewed downwardly towards a face of the paper sheet. It should be understood that, as seen in a side view (such as, e.g., in side views similar to that shown in FIGS. 10 and 12-15, such embossments have a different shape).

In some preferred embodiments, the embossments can have a substantially flat or consistent peak height or displacement height from the original plane of the sheet of paper. For example, as shown in the above-noted FIGS. 10 and 12-15, the peak heights of the embossments are substantially consistent. In this regard, in the preferred embodiments, the peak heights of the embossments are preferably substantially consistent along and within each individual embossment. In addition, in the preferred embodiments, the peak heights of the embossments are preferably substantially consistent between a plurality of embossments, such that embossments extending in a certain direction (e.g., a raised direction or a lowered direction) have a substantially consistent peak height along the face of the sheet. In some embodiments, embossments can extend by raised and lowered and the peak heights can differ on each opposite side of the sheet, but are preferably substantially consistent on the respective sides of the sheet.

In addition, in some preferred embodiments, the peaks of the embossments are substantially planar or include a substantially planar central area which can taper or can be rounded at edges of the peaks of the embossments. Moreover, in some preferred embodiments the peripheries of the embossments preferably extend substantially transverse from the original plane of the paper sheet. This structure can be seen, e.g., in the above-noted FIGS. 10 and 12-15 by way of example. Moreover, in some embodiments the peripheries of the embossments that extend substantially transverse to the original plane of the paper sheet extend substantially perpendicular to the plane of the paper sheet. In some other embodiments, similar to that shown in FIGS. 13-15, the peripheries of the embossments that extend at an angle to the original plane of the paper sheet and be inclined towards the embossment region. In some embodiments, this angle of inclination can be as shown in various embossments in the figures. In some embodiments, this angle of inclination can be between about 45-90 degrees, or between 60-90 degrees, or between 70-90 degrees, or between 80-90 degrees. Some illustrative embodiments would have an angle that is between about 65-85 degrees.

In some embodiments, the embossments can be in a pattern (such as, e.g., an array) of embossments in which at least some of the embossments are discretely located in separate positions on the sheet of paper (e.g., such that discrete embossments are surrounded by portions having the original plane of the sheet of paper).

In some embodiments, the embossments can be in a pattern (such as, e.g., an array) of embossments in which at least some of the embossments are not entirely discretely located at separate positions on the sheet of paper. For example, in some embodiments, the embossments can be located adjacent one another, or can be connected together. For example, in some embodiments, thin or elongated or linear embossments (such as, e.g., raised rail-shape embossments or lowered groove-shape embossments can extend between embossed regions. However, in the most preferred embodiments, at least some, and preferably, most of the embossments would have peripheries that are largely surrounded by portions having the original plane of the sheet of paper. For example, in many cases, the peripheries of the embossments would mostly be surrounded by portions having the original plane of the sheet of paper.

In some preferred embodiments, embossments are applied to individual sheets of paper such as to create a pattern of embossment within the individual sheet of paper. In the preferred embodiments, embossments do not adhere multiple sheets of paper together. In the preferred embodiments, embossments create raised and/or lowered regions that, in fact, help to separate adjacent layers (e.g., adjacent layers of paper) by displacing the original plane of the embossed sheet from an adjacent sheet due to the added peak height of the embossments. In some embodiments where an embossed sheet is to be attached to an adjacent sheet, such attachment can be by gluing and/or otherwise attaching to the adjacent sheet. This is in contrast to use of techniques, such as, e.g., knurling, that can be used to attach adjacent sheets.

In some preferred embodiments, the term embossed includes raising and/or lowering a surface of a sheet of paper (e.g., Kraft paper) and encompasses recessed embossments, raised embossments, and an embossments that is both raised and recessed.

In some preferred embodiments, the term "recessed embossments" means to lower the surface (sunk-relief) of a sheet of paper (e.g., Kraft paper) relative to an adjacent layer.

In some preferred embodiments, the term "raised embossment" means to raise the surface of a sheet of paper (e.g., Kraft paper) relative to an adjacent layer.

In some preferred embodiments, an "embossed" region of a paper sheet includes a region of the paper sheet in which a plane of the embossed region of the paper sheet is displaced from a plane of a non-embossed region of the paper sheet adjacent to the embossed region of the paper sheet.

In some preferred embodiments, hooks of hook and loop fastening systems are employed. In the context of some of preferred embodiments of the present invention, the term "hook" encompasses (i.e., includes) a hook portion of a hook and loop combination that encompasses the hook and loop system. In that regard, a hook is the portion that can grab the expanded slit sheet and the expanded sheet acts as the loop.

Hook-and-loop fasteners and hook-and-pile fasteners have been used with clothes and a wide variety of other items and applications. In some existing hook and loop fasteners, the fasteners include two thin plastic strips or sheets, one covered with tiny loops and the other with tiny flexible hooks. In use, when the two strips or sheets are pressed together, the flexible hooks engage with the tiny loops, adhering the two strips or sheets together. Then, the two strips or sheets can be separated by pulling apart the strips or sheets such as to disengage the hooks from the loops. Thus, hook-and-loop fasteners and hook-and-pile fasteners generally contain two components: typically, two lineal fabric strips which are attach together by hooking one strip to the opposing surfaces of the other strip. The first component featuring a multitude of tiny hooks distributed on a surface of, the second features smaller loops.

In some illustrative embodiments, hooks employed in some embodiments of the present invention can include features as described in any of the following patents and publications, the entire disclosures of which are all incorporated herein by reference:

1. U.S. Pat. No. 5,339,499 (detailing, e.g., hook design for a hook and loop fastener, and background hook structures that can also be employed in some embodiments);
2. U.S. Pat. No. 9,259,060 (detailing, e.g., mushroom-type hook strap for mechanical fasteners);
3. U.S. Pat. No. 10,064,453 (detailing, e.g., molded surface fastener);
4. U.S. Patent Publication No. 2003/0106188 (detailing, e.g., fasteners engageable with loops of non-woven fabrics and with other open structures, and method and machines for making fasteners);

5. U.S. Patent Publication No. 2017/0203866 (detailing, e.g., illustrative hook structure that engage slits in two layers of opposing slit sheet material that passes between a pair of opposing hook rollers); and
6. EP 1,395,136 (detailing, e.g., methods of forming fasteners).

In some embodiments, the term "S" shape means a double curve in the path of the expandable paper that forms a shape generally similar to the letter "S" or generally similar to a backwards letter "S" (e.g., Ƨ). However, the terminology S shape does not suggest any particular degree of curvature or any particular similarity to a letter S. Notably, as long as at least a portion of the path of the expandable paper curves first in one direction and then in an opposite direction, it is within the scope of this terminology S shaped. The terms "S shape" and "S curve" and "S pattern" are employed herein as synonyms. In an S curve paper path, a line between the axis of a first hook roller to the axis of the second hook roller intersects with the path of the expandable paper in a region of the expandable paper between the first and second hook rollers at an acute angle. In some embodiments, the region of the expandable paper between the first and second hook rollers is a region that extends from a first point where the expandable slit paper tangentially leaves the first hook roller to a second point where the expandable slit paper tangentially contacts the second hook roller. Furthermore, the terminology S shape or S curve, while including a double curve as discussed above, is not limited to and does not require just two curves; systems can include additional curves, as long as the double curve is included. For example, some embodiments can have three or more curves.

In some embodiments, the term "hook" encompasses any member that is capable of hooking, catching or grabbling slits within an expandable slit paper, and a "hook" encompasses, for example, a tine, prong and/or spike, that is arranged to extend from the hook roller and shaped to spear, hook, catch, and/or grab an edge of a slit. In the preferred embodiments, such tine, prong and/or spike, would include a narrow elongated base portion (e.g., a shaft portion) and a laterally extending distal portion (e.g., a curved tip, a bent tip, a barb, an enlarged head portion, etc.). In some preferred embodiments, the hooks of the hook rollers are configured to engage the slits of the expandable paper, and, in such an engaged state, to move the expanded or expanding slit paper by pulling the slit sheet paper as the hook roller rotates. In some preferred embodiments, such hooks, tines, prongs and/or spikes, having, e.g., barbed tips for engaging edges of expanding and expanded the expandable slit paper sheet to form, e.g., hexagonal cells that are formed in slit paper include flexible hooks, tines, prongs and/or spikes which are capable of flexibly engaging within the slits and flexibly disengaging with the slits in a similar manner to how common hook and loop fasteners have flexible hooks that are engageable and disengageable with corresponding loops.

DETAILED DESCRIPTION OF THE PREFERRED EMBODIMENTS OF THE INVENTION

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

I. Illustrative Envelopes and the Like Made in Some Preferred Embodiments of the Invention In some preferred embodiments, systems and methods described herein can be employed to create envelopes as described in this section. It should be appreciated that in various other embodiments, systems and methods described herein can be employed to create various other envelopes.

In some of the most preferred embodiments of the present invention, the invention employs "expanded slit sheet" material in combination with an exterior layer of "embossed" paper to produce a padded envelope with cushioning properties. In addition to the additional patent and other publications incorporated herein by reference in this application, the entire disclosures of U.S. Pat. No. 2,856,323, describing the manufacture of "embossed" paper, and of U.S. Pat. No. 10,226,907, U.S. Application Publication No. 2018/0222665, U.S. Application Publication No. 2018/0127197, and U.S. Application Publication No. 2018/0370702, describing "expanded slit sheet" manufacturing and designs, are all incorporated by reference herein as if recited in full.

Figure 4:
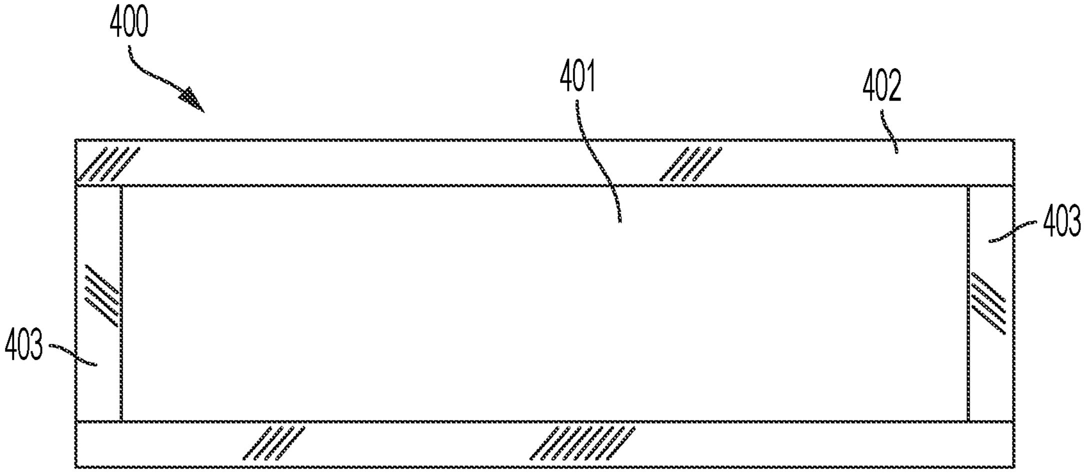
FIG. 4 is a top view of the composite material.

As shown in FIG. 1, the illustrated embodiment uses a four-layer composite starting with the first layer of embossed paper 104, laminated, on all edges (as shown in FIG. 4, reference numbers 402 and 403) to the two layers of expanded slit paper layers which can be, for example, as disclosed in U.S. Pat. No. 10,226,907, with a fourth top-layer of embossed paper. This produces a paper pad that is completely recyclable and that can be made mostly of recycled paper.

Figure 7:
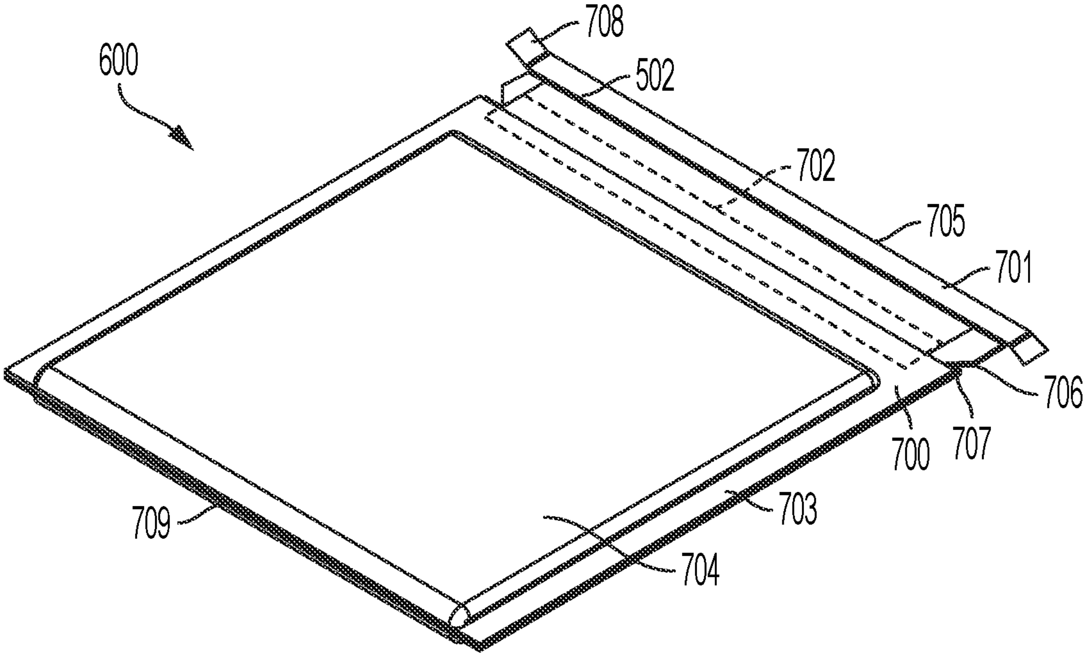
FIG. 7 is a perspective view of the composite unclosed envelope with release liner, where a pouch area is created by side gluing side crushing areas folding at a crush/fold area.

Following construction of the paper pad, in some preferred embodiments, two further steps are employed to make the envelope. The first is to fold the pad as shown in FIG. 7 so that a pouch area 704 is formed upon gluing together the laminated sides 703. Optionally, sides 703 can be crushed to provide rigidity and to flatten the side regions.

Figure 6:
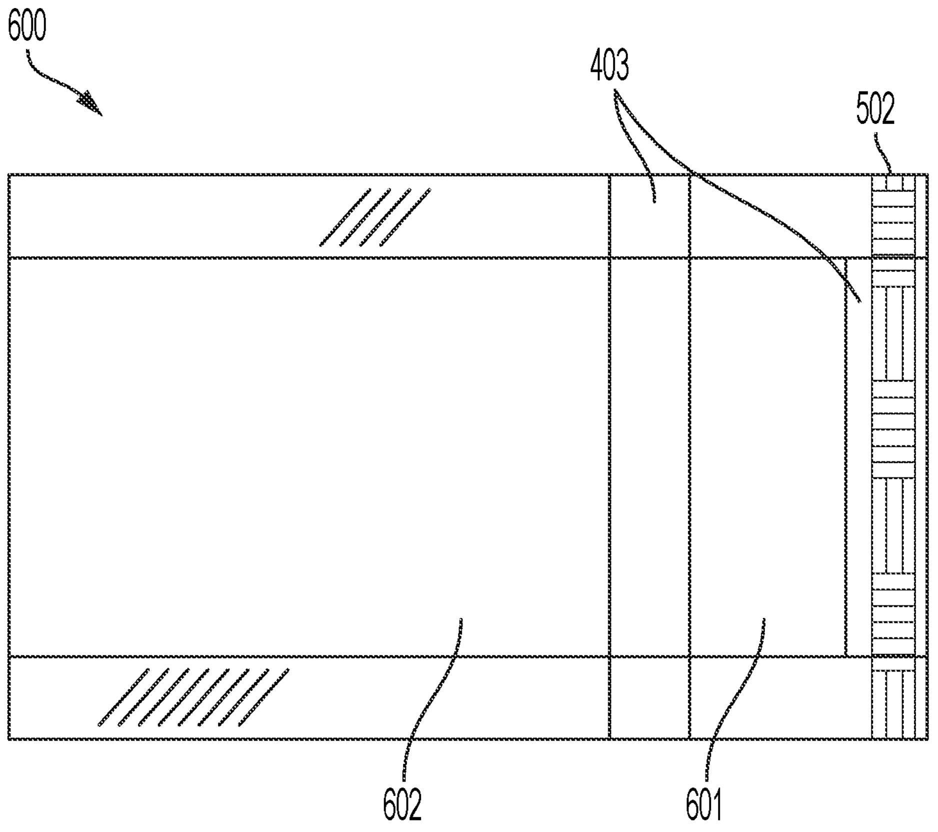
FIG. 6 is a top view of the composite material folded into the unclosed envelope shape.

In some of the preferred embodiments, a double-sided adhesive strip 502 (as shown in FIG. 6) is provided with a release liner 701 (as shown in FIG. 7), which release liner 701 covers the adhesive strip 502 and is removable to expose the adhesive strip 502 for closing of the envelope.

With reference to the top view of FIG. 4, the middle area 401 is where the expanded slit sheet will be placed and will further be placed on the areas 403 and the areas of 403 will be laminated with a layer of paper which can be embossed, as taught hereinafter.

Figure 2:
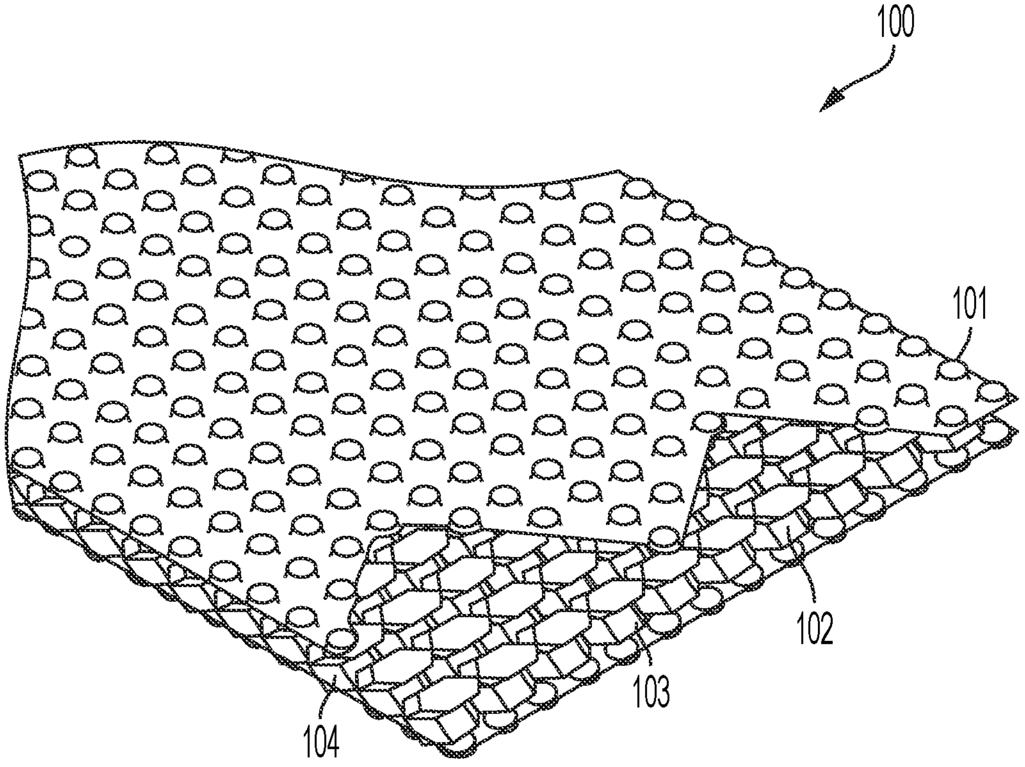
FIG. 2 is a perspective view of the composite material of expanded slit sheets enveloped in indented Kraft sheets.

With reference to FIG. 2, in some of the preferred embodiment, the expanded slit sheets 102 and 103, as shown, are the full length but not the full width of the embossed paper 101 and 104. It is not necessary for the expanded layers to fully extend in width. However, the expanded layers fully extend the length in the preferred embodiment. Referring to FIG. 4, the adhesion areas 403 trap the expanded slit sheet paper in between the embossed outer layer and the inner layer to keep and maintain the expanded slit sheet expanded such as to provide the cushioning and total thickness that the expanded slit sheet has to offer. The inner layer can be flat or embossed as disclosed hereinafter.

Although two layers of expanded slit sheet material are shown in FIG. 1, other embodiments can employ different numbers of layers of expanded slit sheet material. The envelope of the preferred embodiments of the present invention can be made with a single layer, two layers (as shown), or even three or more layers of expanded slit sheet material. Additionally, in some embodiments, one or more or all of the layers of expanded slit sheet material can employ expanded slit sheet material of chaotic cell structure as disclosed in U.S. Application Publication No. 2018/0127197, the entire disclosure of which is incorporated herein by reference.

In the preferred embodiments, the pouch, within the constructed envelope, is used by placing an item or article for shipping within the pouch area 704 (as shown in FIG. 7). Then, after the item or article is contained within the pouch area, the envelope is closed by exposing the adhesive of the adhesive strip by removing the release liner 701 (such as, e.g., by manually grasping the extension tab 708 and laterally pulling the release liner across the width of the envelope) and then folding the top portion of the pad at a fold position 707 (e.g., a fold line) to place the top portion of the pad onto the pouch area and enable the adhesive strip 502 to seal the envelope 600 by adhering to an outer surface of the pouch area 704.

In some preferred embodiments, an embossed paper can be an embossed paper as found within the art (such as, e.g., embossed paper as described in all patents and publications discussed in this application, which are all incorporated herein by reference in their entireties), and in the preferred embodiments the embossed paper is made with a Kraft paper having a weight in the range from about 40 to about 60 pounds, as per the TAPPI standard paper weight specification of 3,000 square feet. Advantageously, a paper weight equaling the basis weight of 50 pounds plus/minus 10% enables the envelope to perform in ways that were previously unexpected.

In the illustrative embodiment shown in FIGS. 1 and 2, the embossed paper 101 is formed with embossments that are made by using matching male-female dies that are pressed together such as to press or punch embossments into the paper, such as, e.g., as described in U.S. Pat. No. 2,856,323 (the entire disclosure of which is incorporated herein by reference), which shows circular embossments. The embossments are preferably distributed such as to create a unique stiffening property, while still enabling the flexibility that is required for placing items within the pouch. In the most preferred embodiments, a plurality of hexagonal embossments are provided. In the embodiment shown in FIGS. 1 and 2, the embossments are formed within the outer layer 101 of the envelope. Additionally, in the embodiment shown in FIGS. 1 and 2, embossments are also formed in the inner layer 104 of the envelope. As described herein, in some preferred embodiments, embossments are only provided in the outer layer 101 of the envelope and not within the inner layer 104 of the envelope. Moreover, although preferred embodiments include embossments in the outer layer 101, some embodiments can omit embossments in the outer layer 101, while including embossments in the inner layer 104, while yet other embodiments can omit embossments in both the outer layer 101 and the inner layer 104.

Figure 11:
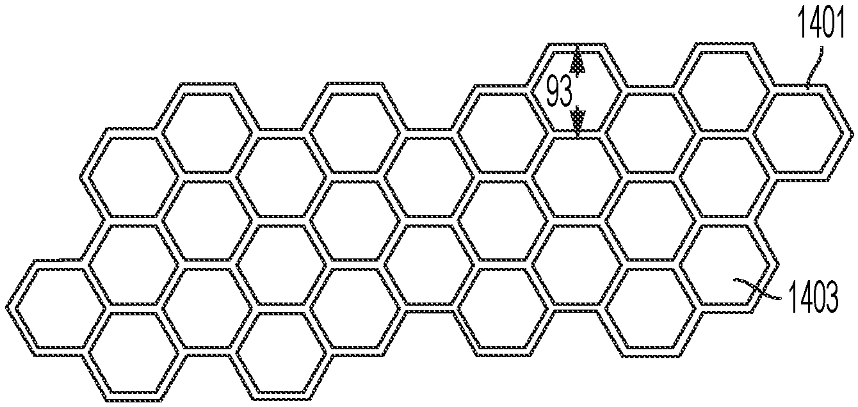
FIGS. 11, 11A, 11B, 11C, and 11D are schematic representation of various patterns and sizes of hexagonal shaped embossments.

With reference to FIG. 11, this figure shows an illustrative embossment patterns that can be employed in some illustrative embodiments. In some implementations, an embossment pattern similar to that shown in FIG. 11 can be formed in a layer (such as, e.g., outer layer 101 and/or inner layer 104) by pressing a die configured to create an array of hexagonally shaped embossments. With reference to FIG. 11C, in some embodiments, each hexagonally shaped region 1403 (e.g., five such regions 1403 being shown for illustrative purposes in FIG. 11C) can be formed by a hexagonally shaped pressing member configured to be pressed into a paper sheet to create a hexagonally shaped embossment having a substantially or generally flat surface. Towards that end, the shaded regions in FIG. 11C (i.e., which shaded regions are within the hexagonally shaped regions 1403 in this example) represent embossments that are pressed such as to be displaced from the original plane of the paper sheet. In FIG. 11C, the white spaces between the hexagonally shaped embossments can be, e.g., at the original plane of the paper sheet.

In some embodiments, each of the hexagonally shaped regions 1403 are displaced from the original plane of the paper sheet in the same direction. For example, in some embodiments, all of the regions 1403 are displaced downwardly. In some other embodiments, all of the regions 1403 are displaced upwardly. In yet some other, and more preferred embodiments, some of the regions 1403 are displaced upwardly, and some of the regions 1403 are displaced downwardly. For example, in FIG. 11C, the regions 1403 shaded with an array of dashes are displaced downwardly as represented by the label D. On the other hand, in FIG. 11C, the regions 1403 shaded with diagonal lines are displaced upwardly as represented by the label U. In some embodiments, the variations in upward U and downward D displacements of the regions 1403 can be randomized. In some embodiments, the variations in upward U and downward D displacements of the regions 1403 can be in an alternating manner. In some embodiments, the variations in upward U and downward D displacements of the regions 1403 can be in a pre-set pattern.

Among other things, employing regions 1403 with both upward U and downward D displacements can substantially increase the strength and rigidity of the embossed layer. Additionally, by varying the directions of the embossments, less embossments can be formed to extend to a particular upward and/or downward side of the layer. Firstly, by extending some embossments in opposite directions, the number of embossments is necessarily less than if all embossments extended in a same direction. Secondly, by extending some embossments in opposite directions, a greater number of embossments can be set to extend in one direction than in the other direction. For example, in some embodiments, one side of the layer can have a lesser number of embossments so as to reduce a contact surface area in the event that an article or item is slid across the surface against the embossments. By way of example, this embodiment can be advantageous for reducing friction upon placing items within a pouch of the envelop by forming the inner layer 104 so as to have a reduced number of outwardly extending embossments, whereby a reduced contact surface area can be created to facilitate insertion and/or removal of items from within the pouch. For example, in the context of the insertion of flat articles or items (such as, e.g., paper or the like), a substantial decrease in contact friction can be achieved).

Figure 11A:
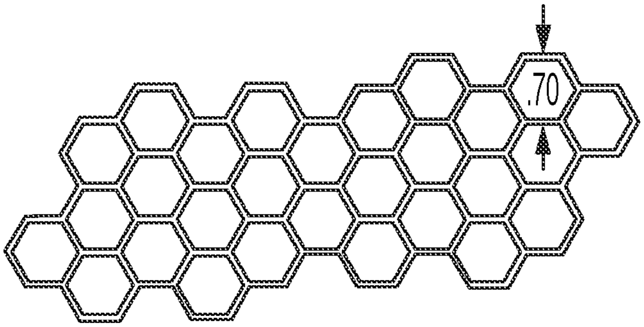
Figure 11B:
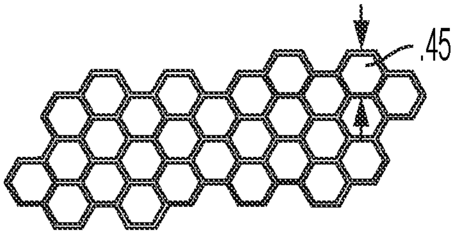
Figure 11C:
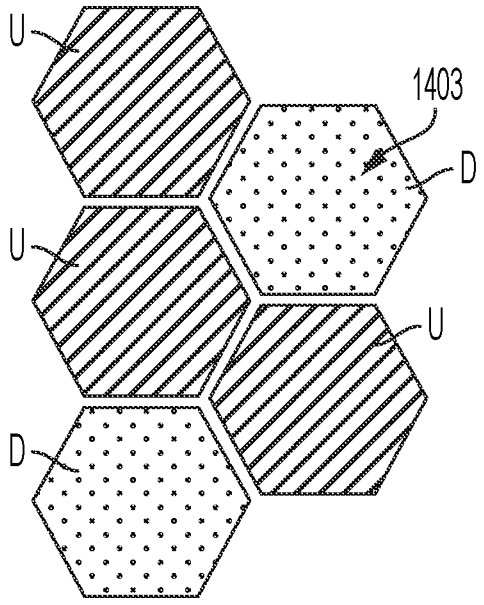
Figure 11D:
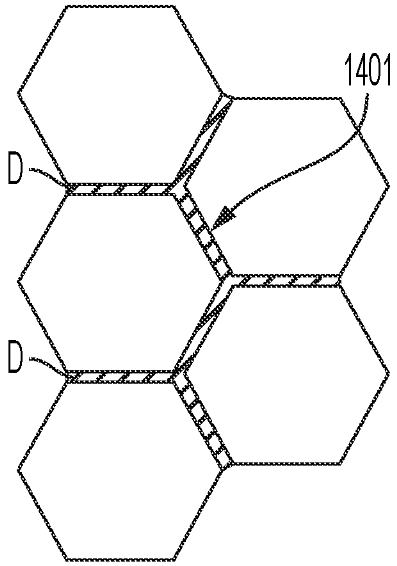

With reference to FIG. 11D, in some embodiments, rather than embossing across the entire areas of the regions 1403, embossment can be effected around the peripheries of such areas 1403. In particular, as shown in FIG. 11D, in some embodiments, the peripheral borderlines 1401 surrounding the hexagonal regions can be embossed. Towards that end, the peripheral borderlines 1401 that are shaded in FIG. 11D represent embossments that are pressed such as to be displaced from the original plane of the paper sheet. In FIG. 11D, the white spaces within the interiors of the hexagonal regions can be, e.g., at the original plane of the paper sheet.

Although the embodiment shown in FIG. 11D may have less structural rigidity that the embodiment shown in FIG. 11C, the embodiment shown in FIG. 11D can have some substantial advantages for some purposes. For example, as the “white regions” shown in FIG. 11D, which represent an original plane of the paper sheet encompasses a substantial majority of the surface and that substantial majority of the surface is at a substantially consistent height or substantially level, this embodiment can have substantial usefulness and advantage when such a substantially consistent or level surface is desired. For example, in some preferred embodiments, the outer layer 101 is embossed with an embossment patterns as shown in FIG. 11D. Among other things, having this embodiment pattern on an outer layer 101, an outer peripheral surface of the envelope (created by the outer layer 101) can be advantageously adapted to be able to receive a label (such as, e.g., an adhesive label), such as, e.g., a shipping label for using in shipping of the envelop. For example, such a label can include shipping information, such as, e.g., name and address of the intended recipient of the envelope, contents information related to the items contained within the envelop and/or other information related to the shipment or delivery of the envelope.

In some embodiments, such as, e.g., for use as an outer layer 101, the embossed peripheral borderlines 1401 of FIG. 11D preferably extend downwardly D (as shown in FIG. 11D). In this manner, the embossed region would not extend upwardly from the surface of the layer 101. Accordingly, the embossments would even more substantially avoid interference with the use of the outer surface of the outer layer 101.

In some implementations, an embossment pattern similar to that shown in FIG. 11 can be formed in a layer (such as, e.g., outer layer 101 and/or inner layer 104) by pressing a die having an array of protruding hexagonal shaped die press members that are each configured with a shape corresponding to the hexagon 1403 shown in FIG. 11. In some embodiments, the array of hexagons 1403 can, thus, be created by pressing the die against the layer for embossment (i.e., by sandwiching the layer between the die and a complementary shaped receiving die member placed on an opposite side of the layer being embossed).

For example, in some illustrative embodiments, an outer layer 101 can include an embossment pattern as shown in FIG. 11 in which the peripheral borderlines 1401 of the hexagons 1401 are recessed embossments (similar to that shown in FIG. 11D) and have a small depth. For example, in some embodiments, the depth can be less than 0.01", and, most preferably, can be a depth of about 0.005" (0.127 mm). In some illustrative embodiments, this depth value can be varied within a range about +/−50%, or, more preferably, within a range about +/−25%, or, mostly preferably within a range about +/−15%. Surprisingly, this small embossment pattern still provides a substantial resilience to the paper as well as a more luxurious and more protective feel and is highly advantageous as an outer layer 101. Moreover, in this latter embodiment, by having the embossment extend downwardly, the embossment substantially does not interfere with use of the paper for applying a label or other purposes.

As illustrated in the exemplary embossment patterns shown in FIG. 11, FIG. 11A and FIG. 11B, in various embodiments the sizes or dimensions of the hexagonal regions 1403 can be varied depending on circumstances. For example, in the example shown in FIG. 11, a diameter or distance between opposite walls of the hexagon is about 0.93' (i.e., 0.93 inches), while in the example shown in FIG. 11A, a diameter or distance between opposite walls of the hexagon is about 0.70' (i.e., 0.70 inches), while in the example shown in FIG. 11B, a diameter or distance between opposite walls of the hexagon is about 0.45' (i.e., 0.45 inches). While the diameters of such hexagonal regions 1403 can vary, in some embodiments, the diameter is preferably less than 2", and, more preferably, less than 1.5", and, more preferably, less than 1.0".

Moreover, in some embodiments in which embossments are employed on the outer layer 101 and the inner layer 104, the diameters of the embossments between these layers can be selected differently. For example, in some preferred embodiments, the diameter of the embossments of the outer layer 101 is substantially larger than the diameter of the embossments of the inner layer 104. Among other things, employing larger diameter embossments in the outer layer 101, of the type shown in FIG. 11D further reduces the interference by the embossments. On the other hand, employer smaller diameter embossments in the inner layer 104, of the type shown in FIG. 11C can further reduce the surface area of the embossments such as to reduce friction when placing items within a pouch of the envelope, facilitating sliding of items into and out of the envelope.

In some most preferred embodiments, the inner layer 104 includes embossments of the type shown in FIG. 11C and the diameter across each hexagon 1403 is about 0.25" wide. In addition, the embossments preferably alternate between upwardly and downwardly extending (i.e., male and female embossments).

In some most preferred embodiments, the outer layer 101 includes embossments of the type shown in FIG. 11D and the inside diameter of each hexagon between the inside of the peripheral borderlines at opposite sides of the hexagons is 0.75". In addition, in the preferred embodiments, the outside diameter of each hexagon between the outside of the peripheral borderlines 0.875" (i.e., such that the width of the peripheral borderlines (i.e., the width of the embossments) is thus 0.0625". In other embodiments, the width of the peripheral borderlines (i.e., the width of the embossments) can be within a range of about 0.002' to 0.25".

As indicated above, In the most preferred embodiments of the present invention, the invention employs "expanded slit sheet" material in combination with an exterior layer of "embossed" paper to produce a padded envelope with cushioning properties.

An additional benefit that the embossed paper provides, in combination with the expanded slit material, is that it provides the ability to hold the expanded slit sheet material in a stretched state (i.e., in which the expanded slit sheet paper has been expanded to open the cells and, thus, create a wider width with cushioning properties) and without creating wrinkles on the outer paper.

Notably, "expanded slit sheet" paper material not only requires a force to expand or stretch the paper, but such a paper also exerts a retraction force from a fully expanded state. In the context of this novel invention, in which an expanded slit sheet paper is preferably attached face-to-face with an outer layer of paper, the retraction force can have a tendency to cause the outer layer of paper to wrinkle due to insufficiency strength and rigidity to resist this retraction force of the fully expanded expandable slit sheet material. Additionally, as the retraction force of the expanded slit sheet paper is in a direction along the plane of the expanded slit sheet, when the expanded slit sheet is attached face-to-face with the outer layer, the retraction force will, thus, extend along the plane of the outer layer. As thin sheet material such as paper has limited rigidity along this direction, the retraction force can cause wrinkling and deformation of the outer layer.

Although heavier weight paper could be used in some embodiments to increase the rigidity sufficiently to avoid wrinkling and deformation of the outer layer (e.g., by using a heavy enough outer paper such that its rigidity imparts a greater force than the retraction force of the expanded slit sheet paper), this increased weight and stiffness of the outer layer has disadvantages. For example, the use of an outer layer with greater weight and stiffness adds to the postage costs (e.g., as postage costs are based on weight) and makes loading items within the pouch more difficult (e.g., as the flexibility of the envelope and, hence, the ability to "open" the pouch and insert items is hindered with increased rigidity of the paper, and also as heavier envelopes can be more difficult to manually manipulate in some contexts).

In some highly preferred embodiments, the expanded slit sheet paper can be formed in a novel manner to reduce the retraction force of the expanded slit sheet paper by employing a novel type of expanded slit sheet paper developed by the present inventor that involves the use of an "extensible" paper. As explained above, in the preferred embodiments, the term "extensible" as applied to paper sheets, includes a paper as set forth in the present inventor's co-pending U.S. patent application Ser. No. 16/018,702 (U.S. Application Publication No. 2018/0370702), entitled Extensible Paper and Its Use In the Production of Expanded Slit Packaging and Void Fill Products, the entire disclosure of which is incorporated herein by reference. The present inventor has discovered that an additional way of countering the wrinkling effect that the expanded slit material tends to create by the retraction forces of the expanded slit sheet material when the expanded slit tries to retract is to use extensible paper as found in the latter '702 application.

The present inventor has discovered that extensible expanded slit sheet paper requires approximately ⅓ of the total force required to stretch the expanded slit sheet material in comparison to a similar weight non-extensible paper with a similar slit pattern. For example, an extendable slit sheet material made with Kraft paper can require a force of about 6 lbs to expand a sheet that is approximately 15.5" wide, while a extensible expandable slit sheet paper of similar weight and slit pattern can require a force of only about 2 lbs to expand a sheet that is approximately 15.5" wide. In some preferred embodiments, an extensible paper is employed for the expandable slit sheet material that requires an expansion force in the range from about 0.15 to 0.22 pounds per inch to expand the sheet. Notably, the retraction force of the expanded slit sheet from the fully expanded state correlates to this force required to expand the expandable slit sheet paper.

In some embodiments, a light weight non-embossed Kraft outer paper layer can be utilized where wrinkling is not of concern and/or where the envelope is not used for individual shipping and durability is not of as much concern. In this latter case, the envelope can, for example, be used within and as part of a consolidated shipment that requires an outer box or container (such as, e.g., a corrugated box) or for in-the-box shipping, such as, e.g., wherein the envelope is contained within another box or container along with additional items to be shipped. This type of shipment does not require a durable anti-rip layer. In the context of use of the envelopes for in-the-box shipments or the like, a lighter weigh paper can be used, such as, e.g., a 40 #or less Kraft paper for such in-the-box shipments, or, in some embodiments, even a 30 #Kraft paper for such in-the-box shipments or even less In some embodiments, the outer layer can employ an anti-rip paper, such as an anti-rip flat Kraft paper comprising a thicker paper, such as 60 #or more Kraft paper that inhibits tearing.

An additional benefit of the embossed paper in combination with the expanded slit material is the increased packaging protection that it provides. Expanded slit paper, although extremely protective as a wrap, must be placed inside an enclosure or container to provide the cushioning. The embossed paper's bulk mimics a very light duty corrugated box with a slight undulating thickness that is, thus, thicker than non-embossed paper. For example, in some illustrative embodiments, the undulating thickness due to the embossments can be approximately three times the thickness of paper without such embossments. In other embodiments, the undulating thickness can be greater than 3 times the thickness of the paper, such as, e.g., 4 times the thickness, or 5 times the thickness or even more. In preferred embodiments, the undulating nature of the embossments can operate much like the sine wave of the inner layer found within a corrugated box. Among other things, this can also help provide an initial shock protection that even further inhibits tearing that can occur with smooth (non-embossed) papers.

An additional benefit of the use of an embossed outer layer for envelope is the increased ability to manually hold the envelope by hand securely or even by conveying equipment because the embossments can add to the friction between the envelope and a user's hands or between the envelope and conveying rolls or equipment for easy handling or processing as compared to smooth (non-embossed) papers and plastic.

The accompanying figures set forth details on relation to some preferred, and non-limiting, embodiments of envelopes and that like that can be created according to some of the preferred embodiments described herein.

FIG. 1 is a side view of the paper cushioning or padding material 100 according to some embodiments that employs double-cross layering of expanded slit sheet materials, as found in non-provisional patent application Ser. No. 14/480,319 (U.S. Pat. No. 10,226,907), the entire disclosure of which is incorporated herein by reference. In particular, as shown in FIG. 1, in this example, two layers of expanded slit sheet papers 102 and 103 are sandwiched between an outer layer 101 of paper and an inner layer of paper 104. As illustrated by the inclined lines within regions 102 and 103, in such double-cross layering embodiments the expanded sheets have cells with walls that incline in opposing direction, such as to, e.g., help limit nesting of the two layers 102 and 103. Specifically, as shown in FIG. 1, the expanded slit paper 102 is inclined rightwardly (i.e., faces forward) and the expanded slit paper 103 is inclined leftwardly (i.e., facing backward) and are sandwiched between embossed papers 101 and 104.

Although the embodiment shown in FIG. 1 includes two layers of expanded slit sheet paper, in some embodiments three or more layers of expanded slit sheet paper are employed. However, in some of the most preferred embodiments, only a single layer of expanded slit sheet paper is employed, which single layer preferably includes layers 101 and 104 along opposite faces of the single layer of expanded slit sheet paper. In some preferred embodiments, the expanded slit sheet paper adjacent the layer 101 contacts the layer 101, and the expanded slit sheet paper adjacent the layer 104 contacts the layer 104. Alternatively, in some embodiments, one or more intermediate layer could be inserted therebetween.

FIG. 2 is a perspective view of the paper cushioning or padding material 100 shown in FIG. 1, with portions removed to facilitate reference. As shown, the layers 101 and 104 are the embossed outer paper layers (also referred to as outer layer 101 and inner layer 104 in the context of formation of an envelope by folding of the padding material 100, and the expanded slit sheet layers 102 and 103 are located between these outer layers as described above.

Although the padding material can be made in a variety of ways, FIG. 3 is a schematic side view of an illustrative and preferred pad making process wherein Kraft paper rolls 300 and 303 are fed, respectively, to idler rollers 309 and 310 and then fed, respectively, through the embossment dies pairs 301 and 304 and around idler rolls 308 making the outer layers of the padding material shown in the combining area 302 of FIG. 3. As shown, unexpanded slit material rolls 305 and 306 are fed between a pair of Velcro rolls 307 and are together stretched using respective braking mechanisms 320 and 319 that slow the unwinder to allow for stretch and continues to the combining area 302.

As discussed above, FIG. 4 is a top view of the areas of the composite of embossed and expanded slit material 400 after opposite edges 402 and 403 have been connected to form a composite structure. In some preferred embodiments, the edges 402 and 403 are laminated together between laminating pressing wheels. In the preferred embodiments, the expanded slit paper (which is not seen in FIG. 4 because it is internal (e.g., obscured by the outer layer of embossed paper) is located within the area of 401.

Additionally, in the preferred embodiments, the expanded slit sheet paper is contained within the area 401 without being adhered or affixed to the composite material 400 along the edges 402 at the lateral sides of the expanded slit sheep paper material. In particular, the expanded slit sheet material is preferably only adhered to the composite material 400 at the opposite ends of the expanded slit sheet material, and, preferably, is only adhered at the edge regions 403. In this manner, the expanded slit sheet material preferably freely extends throughout the interior area 401 in a manner to be relatively movable with respect to the outer layers 101 and 104, except at the ends of the expandable slit sheet material which are fixed within the edge regions 403 by being crushed and glued and adhered to the outer layers 101 and 104 within the edge regions 403.

Figure 5:
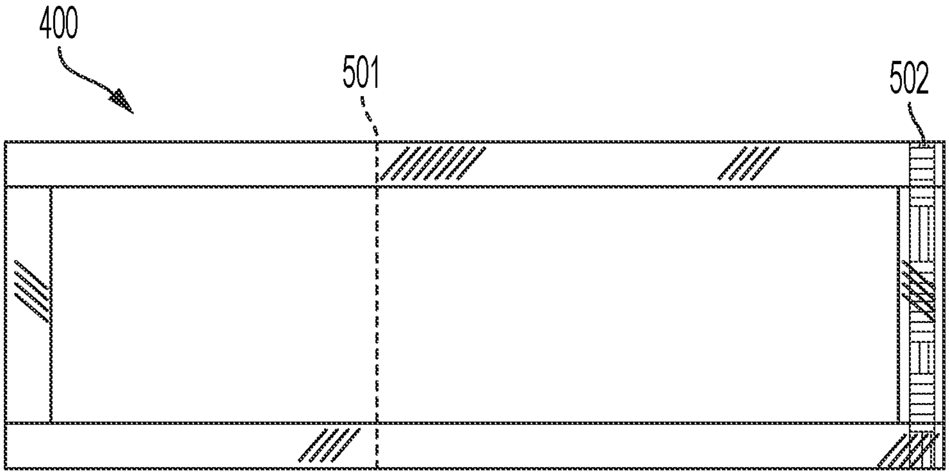
FIG. 5 is a top view of the composite material with fold lines and double-sided adhesive.

With reference to FIG. 5, FIG. 5 is a top view of the composite material 400 showing a dotted line 501 that represents a folding region for folding the material 400 to make the pouch. In the preferred embodiments, a double sided adhesive 502 is placed on the leading edge of the pad (which is to be covered by a release liner 701 as discussed below), which adhesive is later used to seal a pouch of the finally constructed envelope during use of the envelope.

With reference to FIG. 6, FIG. 6 is a top view of the padded envelope 600, after the composite material 400 shown in FIG. 5 has been folder over the folding line. As indicated above, the double sided adhesive 502 is located within the laminated edge 403 on the leading edge to provide adhesive for the envelope to close. As shown in FIG. 6, the extension portion or open area 601 is a fold-over flap portion that is folded over and adhered to the outer surface of the envelope via the adhesive 502 for closing of the envelope. In some preferred embodiments, the expanded slit sheet paper within the flap portion 601 is crushed so as to provide a thin and rigid flap to facilitate manipulation and use. However, in some embodiments, the flap portion 601 can include expanded slit sheet paper within this region in an expanded state for cushioning. For example, in some embodiments, the cushioning within the flap portion 601 can be sized so as to extend entirely over the crushed and laminated region 403 proximate the mouth of the pouch, such as to provide an extra length for cushioning the envelope over the crushed and laminated area 403 (i.e., as the region 403 is preferably crushed and laminated, the region 403 is flattened and does not have cushioning properties offered by the un-crushed expanded slit sheet paper.

Figure 8:
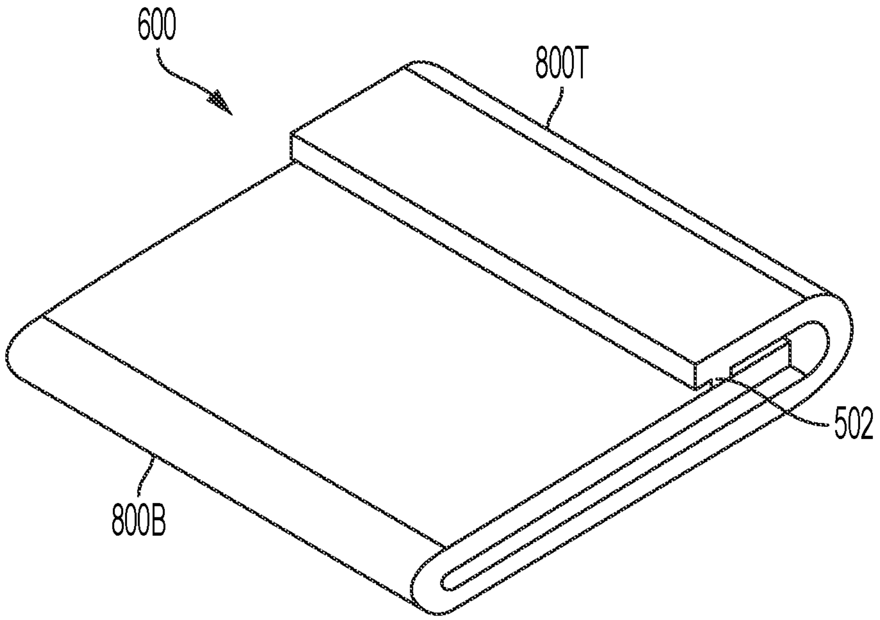
FIG. 8 is a perspective view of the composite closed envelope.

As discussed above, the double-sided tape 502 can be used to adhere the fold over flap portion to the outer surface of the envelope, and preferably the adhesive of the tape 502 adheres to the outer face of the envelope to the left side of the region 403 shown in FIG. 6 (i.e., at a side of the region opposite to the mouth of the pouch). For reference, FIG. 8 shows the envelope in a state in which the adhesive 502 is adhered to the front of the envelope just beyond the region or area 403 after the flap portion is folded over.

With reference to FIG. 7, FIG. 7 is a perspective view of the envelope 600 of FIG. 6 in the open position with double sided tape 502 is covered by a release liner 701. In FIG. 7, the edge regions 703 (i.e., which are along opposite sides of the envelope) correspond to the regions 402, which have been folded over and adhered to form the edge regions 703. For example, the regions 402 can be folded over and crush-glued or otherwise adhered together to form the edge regions 703.

With reference to FIG. 7, the region 705 corresponds to the edge region 403 formed at the end of the extending flap portion 601 shown in FIG. 6. In some embodiments, the adhesive or adhesive tape 502 can cover an entire area of the edge region 403 or, as shown in FIG. 6, the adhesive 502 can cover a portion of the edge region 403 formed at the end of the flap portion. In the embodiment shown in FIG. 7, the edge 705 corresponds to the edge region 403 at the end of the flap portion shown in FIG. 6. However, in FIG. 7, the adhesive 502 and the release liner 701 cover the entire edge 705.

In some embodiments, in order to form the pouch of the envelope, the composite member 400 shown in FIG. 5 is folded over the fold line 501 shown in FIG. 5. In some preferred embodiments, in order to facilitate folding of the composite material at the fold line 501 in order to form the pouch, a line of glue is extended across the width along the fold line in order to glue together the expandable slit sheet material with the outer layer 101 and the inner layer 104 along a narrow line along the fold line. For example, in some embodiments a narrow bead line of glue is applied to facilitate folding at the fold line 501. In some alternative embodiments, the expanded slit sheet paper is not glued along the fold line 501, such that the expanded slit sheet material can freely move relative to the outer layers 101 and 104 proximate to the folding line 501.

In some most preferred embodiments, the expandable slit sheet material within the flap portion 601 is crushed and not within an expanded state. Notably, in the more preferred embodiments, the entire flap portion 601 can be in a compressed state. However, in some embodiments, a least some or all of the expandable slit sheet material within the flap portion 601 can be in an expanded state. For example, in some embodiments, the expanded slit sheet material can be in an expanded state within the flap portion 601 up to the edge 403 shown in FIG. 6 or, similarly, up to the edge 705 shown in FIG. 7.

In the embodiment shown in FIG. 7, the envelope includes edge areas of crush-glue adhesion at the regions 703 and the edge 705, which surround a pouch area 704. Although the regions 703 and 705 can be formed in a variety of ways, the regions are preferably formed by pressing between opposite pressing members along with gluing to retain the regions in a compressed (e.g., thin) and adhered state. For example, such regions can be formed using pressure rollers, reciprocated pressing elements and/or other mechanisms. In the preferred embodiments, a glue that is employed in areas of the crush-glue adhesion (such as, e.g., in the regions 703 and 705) hardens to provide increased rigidity and/or stiffness. For example, this can help to create a more rigid or a stiffer flap portion 601.

In some embodiments, in addition to employing glue within the regions 703 and 705, other portions of the flap portion 601 can include be glued similar to the regions 703 and 705 (e.g., to create a more rigid or a stiffer flap). However, in the most preferred embodiments, at least a region 702 (shown representatively in dashed lines in FIG. 7) which is in the vicinity of the mouth of the pouch 704 (i.e., at folding-line position of the flap portion 601) is free from adhesives or gluing.

As shown in FIG. 7, the region 700 corresponds to the region 403 shown in FIG. 6 which is formed along the edge of and delineates the mouth of the pouch. In some preferred embodiments, as shown in FIG. 7, the non-glued region 702 overlaps the side-end of the region 700, such as to extend partly within the pouch and partly outside of the pouch within the flap portion 601. In particular, by ensuring that this region is free of glue, the flap portion 601 can be more certainly and effectively folded over around a fold line within the region 702 for improved operation and functioning of the envelop. In some embodiments, in order to facilitate folding over a fold line within the region 702 a crease can be formed across the width of the region 702 which can help facilitate folding.

The present inventor has discovered that providing a glue free area 702 in the region of the fold, optimizes the folding without adversely affecting the advantageous rigidity of the flap. The unglued area 702 within the fold over area, thus, can facilitate the folding over of the closure flap. In some preferred embodiments, the non-glued area 702 preferably extends across the entire width of the envelope and preferably extends a length of less than about ½ inch in the expansion direction of the expandable slit sheet paper (i.e., a direction along the length of the envelope perpendicular to the width of the envelope), and in some more preferred embodiments, the non-glued area 702 extends less than about ⅓" in the expansion direction, and in a preferred embodiment, the non-glued region 702 extends in the expansion direction about W plus or minus 15%, and, in a most preferred embodiment, preferably ¼" plus or minus 5%. In some preferred implementations, this equates approximately with the non-glued area 702 preferably being about 0.64 cm (plus or minus 15%) and, most preferably, about 0.64 cm (plus or minus 5%).

As discussed above, with reference to FIG. 7, reference number 703 indicates the glued envelope edges. Additionally, as discussed above, in some preferred embodiments, the slit sheet material is advantageously held in place only at the ends of the expandable slit sheet—and, in particular, at the top area 700 and at the region 705 which is beneath the release liner 701.

As also shown in FIG. 7, the release linear 701 which extends over and covers the adhesive 502 preferably includes at least one extension tab 708 that extends from an end of the adhesive 502 and which can be manually grasped by a user in order to pull the release liner from the adhesive 502. In the embodiment shown in FIG. 7, extension tabs 708 are shown at both ends of the release liner 701. However, in some embodiments, an extension tab 708 can be located at only one end. Additionally, in other embodiments, other mechanisms can be employed to facilitate manual removal of the release liner 701 and/or an extension tab or portion of the release liner can extend in different directions (e.g., extending towards or away from the mouth of the pouch, rather than laterally to the sides of the envelope as in the illustrated embodiment).

In some preferred embodiments, although the region 702 is free from glues or adhesives, the expanded slit sheet paper within the region 702 can be in a crushed state so as to have a smaller width so as to facilitate folding of the flap portion to close the mouth of the pouch. In some alternative embodiments, however, a portion of the flap portion 601 that extends between the distal end of the region 702 (i.e., the end of the region 702 closest to the distal end of the flap 601) and the edge region 705 includes expanded slit sheet paper in an expanded state, such that upon folding over the flap, the region 700 is covered by a cushioning created by this expanded slit sheet paper in an expanded state.

However, in some most preferred embodiments, the expandable slit sheet paper that is located within the entire flap portion 601 is in a crushed state, including the expandable slit sheet paper within the entire region 702 and within the entire region between the distal end of the region 702 and the edge region 705. In this manner, the entire flap portion 601 can, most advantageously, be more easily manipulated during use and closure of the envelope. Moreover, although the region 702 preferably is non-glued to facilitate folding of the flap portion, other portions of the flap portion can include glue such that the flap portion 601 can be advantageously more rigid and more easily manipulated during use.

As discussed above, FIG. 8 is a perspective view of a closed envelope 600 showing, e.g., double sided tape 502 affixing the envelope in a closed configuration (i.e., after removal of the release liner and closing of the pouch). In FIG. 8, the crushed sides (e.g., 703) shown in FIG. 7 are not depicted in FIG. 8 in order to help demonstrate the thickness of the pouch and the protection that the envelope provides and also to help demonstrate the bottom fold-over end 800B and the top fold over end 800T that both provide a generous internal pouch area (e.g., to help enable larger sized items to be placed within the envelope). Notably, although the lateral sides of the pouch are flanked by the crushed sides 703, as shown in FIG. 8, the bottom end 800B is preferably free from a crushed edge that would otherwise take-up or limit internal space within the pouch. Similarly, the top end 800T is preferably free from a crushed edge that would otherwise take-up or limit internal space within the pouch.

Figure 9:
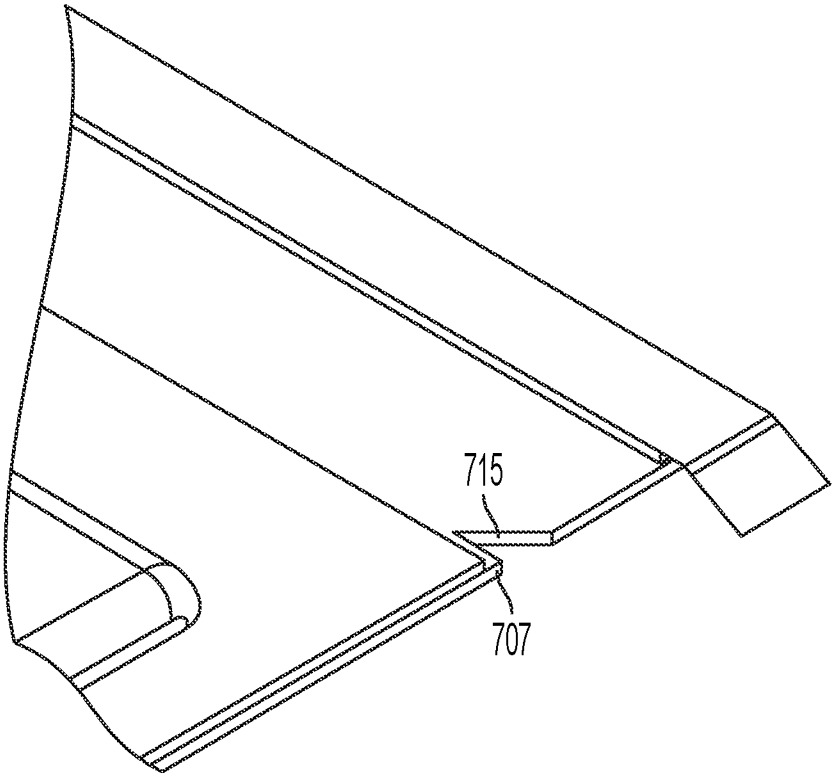
FIG. 9 is a perspective view showing a notched region for tear opening of a sealed envelope.

As shown in both FIGS. 7 and 9, in the preferred embodiments, in order to facilitate opening of a sealed envelope, the top end 800T of the envelope preferably includes a tear-open mechanism. Although a variety of tear open mechanisms can be employed in various embodiments, such as, e.g., a tear-string that is pulled laterally across the top end 800T and/or another tear-open mechanism, in some preferred embodiments, the tear open mechanism includes at least one lateral side notch 706 that is configured to facilitate manual opening or tearing of the top end 800T. As shown in FIG. 7, in the preferred embodiment, two lateral side notches 706 are provided, with a notch located at each lateral side of the envelope 600.

As shown in FIG. 9, each notch 706 is preferably located on the flap portion 601 at a base end the flap portion 601 that is aligned directly at or closely adjacent the outer end of the region 700 at the mount of the pouch. In the preferred embodiments, each notice 700 is a substantially V-shaped cut-out from a lateral side edge of the flap. IN some preferred embodiments, a base-side-edge 707 of the notch is formed so as to extend substantially parallel to the outer end of the region 700 such as to extend parallel to the mouth of the pouch in a widthwise direction across the envelope, and a front-side-edge 715 that extends forwardly at an acute angle to the base-side edge Notch 700 and back to the lateral side edge of the flap 601. In some preferred embodiments, the acute angle can be between about 20 to 50 degrees, and, in some more preferred embodiments, the acute angle is between about 25 to 45 degrees, and, in some more preferred embodiments, the acute angle is between about 30 and 40 degrees, and in some most preferred embodiments, the acute angle is about 35 degrees.

In some illustrative embodiments, the base-side-edge 707 of the notch has a length of between about ⅛ inch to about ½ inch, and, in some more preferred embodiments, a length of less than about ⅓ inch, and, in some more preferred embodiments, has a length of about ¼ inch. As best shown in FIGS. 6 and 7, in the preferred embodiments, the lateral side edges of the envelope are sealed together, such as, e.g., by being glued and pressed. As a result, the lateral side edges of the envelope, including along lateral sides of the flap portion shown in FIGS. 6 and 7 include these sealed lateral side edge portions. As a result, these lateral side edge portions can interfere with tearing or opening of the pouch. Accordingly, in the preferred embodiments, the notches 706 preferably are provided to facilitate opening of the pouch despite the sealed lateral side edges. Accordingly, in some preferred embodiments, the notch 706 is configured to extend a sufficient distance across the width of the lateral side edge to a) facilitate initiating of tearing and b) to avoid having to tear through a large extent of the lateral side edge portion. In some illustrative examples, the notch extends at least ¼ way across a width of the lateral side edge (e.g., edge 402), or in some preferred embodiments at least ⅓ way across a width of the lateral side edge, or in some preferred embodiments at least ½ way across a width of the lateral side edge, or in some preferred embodiments almost entirely or entirely across the lateral side edge portion.

In the preferred embodiments, the notch 706 is located within or adjacent the region 702. In addition, in some preferred embodiments, the region 702 include some weakening mechanism to facilitate lateral tearing of the flap from the location of the notch 706.

Figure 10:
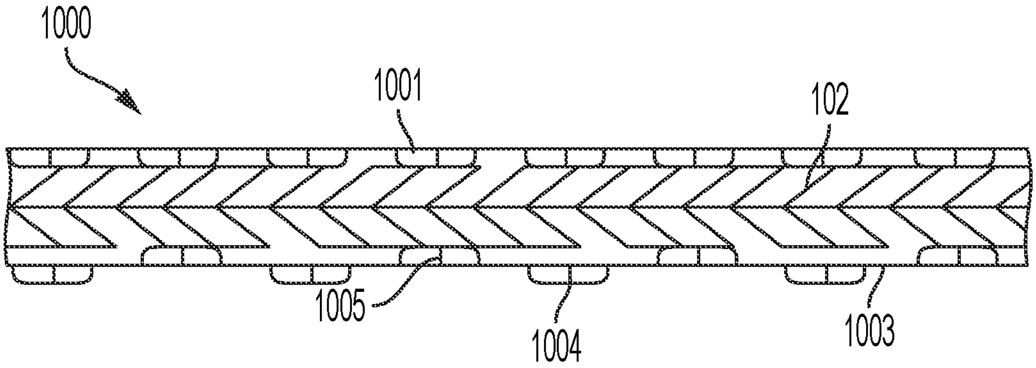
FIG. 10 is a side view of a single sided outer embossed layer of Kraft, a double layer of expanded paper and an inner layer of raised and recessed embossed paper.

With reference to FIG. 10, FIG. 10 shows other illustrative embodiments of a composite material for forming an envelope. As explained above, in various embodiments, inner and outer layers of a composite material for forming an envelope can include a variety of different embossment structures. In the illustrative example shown in FIG. 10, the outer layer 1001 is provided with a pattern or array of downwardly extending embossments. As indicated above, in some preferred embodiments, these downwardly facing embossments help to achieve a substantially even outer surface that can, e.g., facilitate placement or adhesion of a label (e.g., a shipping label) to an exterior of the envelope. Notably, this embodiment is similar to the embodiment described above with respect to FIG. 11D.

Additionally, in FIG. 10 the inner layer 1003 in this embodiment can include a plurality of upwardly facing embossments 1005 and downwardly facing embossments 1004. Notably, this embodiment is similar to the embodiment described above with respect to FIG. 11C. Among other things, this embodiment can help to increase strength and rigidity and can also help to reduce or inhibit friction applied to items as they are inserted into or remove from the pouch (as described above). Additionally, this inner layer 1003, thus, provides a layer with two-sided embossments. Among other things, this provides a thick embossed layer made from a thin, flat, paper sheet, and, therefore, also advantageously provides additional cushioning.

Figure 12:
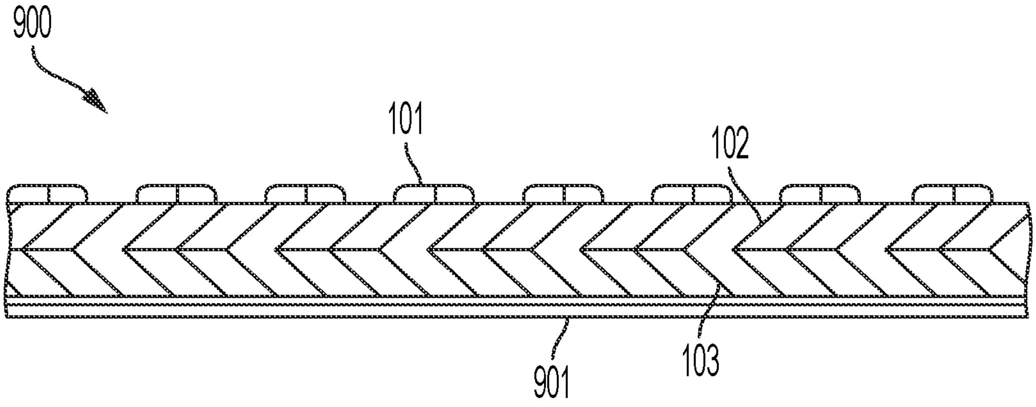
FIG. 12 is a side view of a single sided embossed layer, a layer of flat Kraft paper and a double layer of expanded paper between the embossed and flat layers.

With reference to FIG. 12, FIG. 12 illustrates another illustrative embodiment of a composite material 900 for forming an envelope. In this illustrative embodiment, the outer layer includes a pattern of upwardly extending embossments 101. Moreover, in this embodiment the inner layer 901 is a smooth non-embossed layer. Among other things, providing a non-embossed or smooth inner layer can facilitate in some circumstances with insertion and removal of items to or from the pouch of the envelope.

Figure 13:
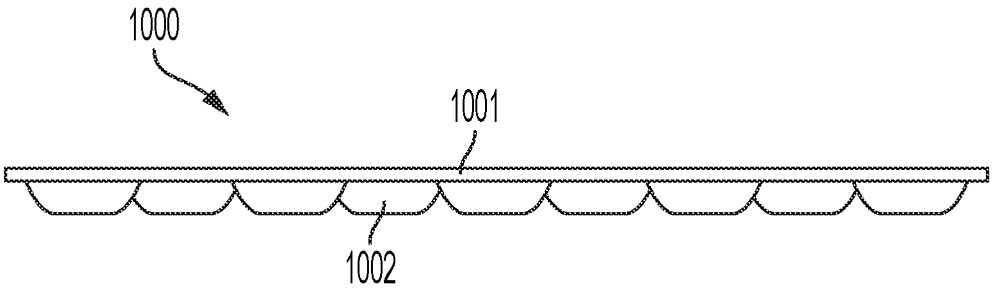
FIG. 13 is a side view of an embossed sheet.
Figure 14:
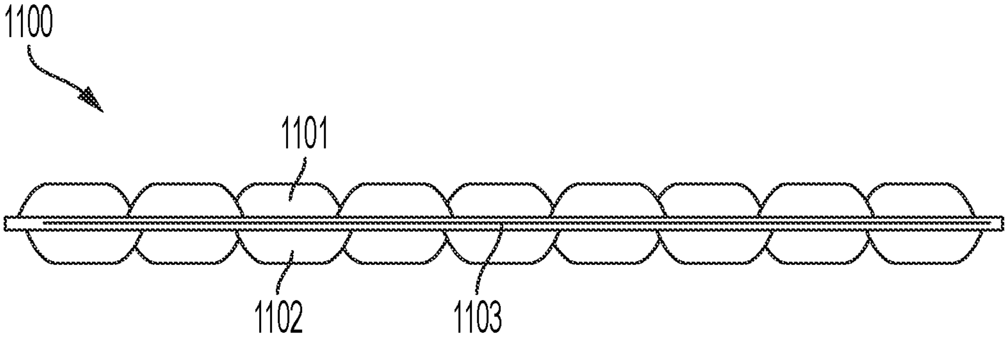
FIG. 14 is a side view of a two sided embossed paper as a cushioning inner layer.
Figure 15:
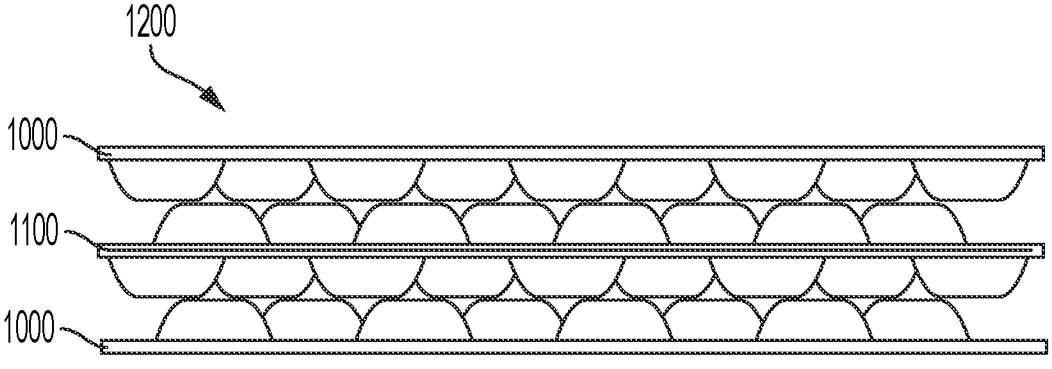
FIG. 15 is a side view of the double sided embossed layer of FIG. 14 in combination with an inner and outer layer of single sided embossed Kraft paper.

With reference to FIGS. 13-15, these figures illustrate another illustrative embodiment of a composite material 1200 (shown in FIG. 15) for forming an envelope according to some illustrative embodiments. In the illustrative embodiments shown in these figures, rather than employing an expandable slit sheet material (such as, e.g., instead of using one or more layers of expandable slit sheet material, such as, e.g., layers 102 and/or 103 as shown in FIG. 1) that is placed between outer layers, the embodiment shown in FIGS. 13-15 employ a novel embossed cushioning layer between two outer layers. Although a specific arrangement of embossed layers is shown in FIG. 15, with an outer layer 1000 having downwardly extending embossments, and inner layer 1000 having upwardly extending embossments, and a middle layer with embossments extending both upwardly and downwardly (such as, e.g., to act as a cushioning layer), it should be appreciated that the outer layer 1000 and the inner layer 1000 of this embodiment can be modified similar to other embodiments described herein. Similarly, the inner layer 1100 can be modified to include other embossment patterns according to other embodiments described herein.

In this illustrative embodiment, FIG. 13 shows an illustrative embossed paper sheet 1001 having a pattern of embossments 1002 (such as, e.g., an array of circular, polygonal and/or other shaped embossments), extending therefrom in a single direction. As shown in FIG. 15, in this illustrative embodiment, the layer 1000 can be employed to form both the outer layer and the inner layer. By way of example, in some preferred embodiments, a similar layer 1000 can be arranged as an outer layer with the embossments facing downwardly, and a similar layer 1000 can be arranged as an inner layer with the embossments facing upwardly. As illustrated in FIG. 15, in the preferred embodiments in which embossments also provide a cushioning function, the embossments of the outer layer 1000 are distributed in such a manner such that when the layer 1000 is employed as an outer layer with downwardly facing embossments, the peaks of at least some of the embossments will contact the peak of at least some of the upwardly extending embossments of the middle layer such as to maximize thickness. Similarly, the embossments of the outer layer 1000 are distributed in such a manner such that when the layer 1000 is employed as an inner layer with upwardly facing embossments, the peaks of at least some of the embossments will contact the peak of at least some of the downwardly extending embossments of the middle layer such as to maximize thickness.

As shown in FIG. 14, in the preferred embodiments, at least one layer is employed that an undulating two-sided pattern layer 1100 which increases the final thickness of the embossed sheet.

In various embodiments described herein, the embossments can have depths of varying degrees depending on circumstance. In some embodiments, embossments can vary in overall thickness between about 0.01 and 0.19 inches. Among other potential advantages, the embossments can provide flexibility for ease of loading the items into an envelope for shipping and the varying thicknesses of cushioning layers provide additional cushioning protection.

In various other embodiments of the invention, other types of paper cushioning materials can be employed in combination with the outer embossed paper. Although these paper cushioning materials may provide less cushioning than a slit sheet layer, some embodiments can still employ such other paper cushioning materials. For example, such other embodiments can be desirable if a thinner product is desired and/or if less cushioning is required. The resultant thinner envelope reduces the cost for shipping by being able to place more envelopes within the same size container. The thinner composite design can provide an anti-tear design where no cushioning in required. These environmentally friendly, all-paper envelopes and pads, can replace plastic envelopes that by way of comparison provide little or no cushioning. Below are examples of other paper cushioning materials that can be employed in some illustrative examples.

Figure 16:
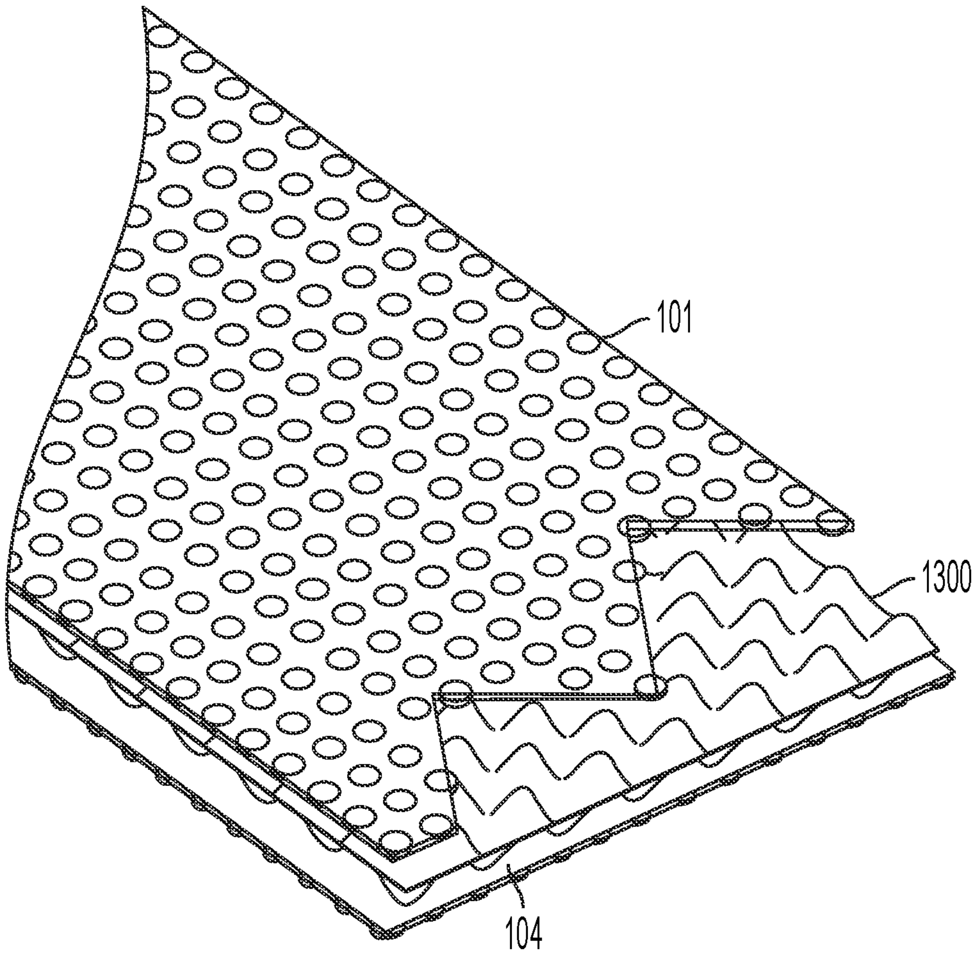
FIG. 16 is a perspective view of the combination of FIG. 15.

With respect to FIG. 16, FIG. 16 shows an embodiment that includes an outer layer 101 having an array of downwardly facing circular embossments, and an inner layer 104 that also includes an array of downwardly facing embossments. In this illustrative embodiment, an intermediate paper layer 1300 can be provided that includes an undulating sheet of paper. In this manner, the interior paper can operate to provide an cushioning quality similar to that employed in other embodiments described above.

Figure 17:
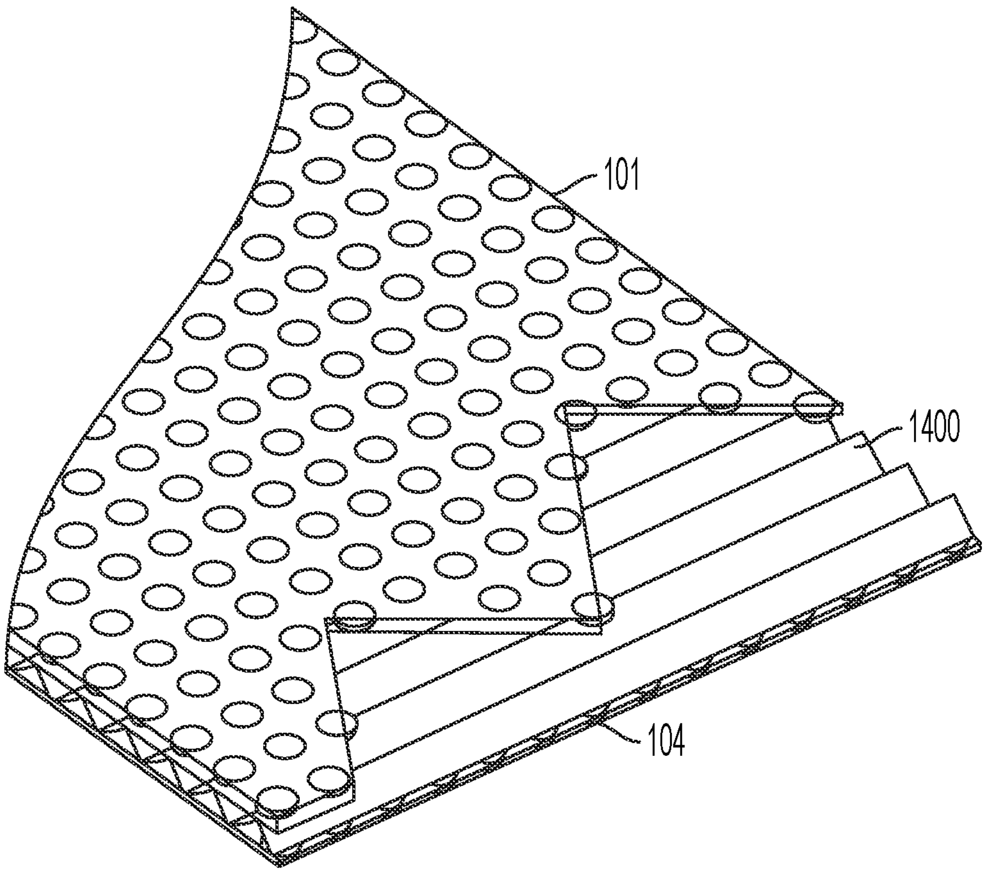
FIG. 17 is a perspective view of a fan fold cushioning layer in combination with embossed layers.

With respect to FIG. 17, FIG. 17 shows an embodiment that includes an outer layer 101 similar to that shown in FIG. 16, as well as an inner layer 104 that is similar to the inner layer 104 shown in FIG. 16. However, the embodiment shown in FIG. 17 employs an intermediate paper layer 1400 that is a pleated layer. In various embodiments, the cushioning that is provided by such a pleated paper varies based on the thickness of the pleated layer, as well as the pleat leg length and heights of the pleats, and the angles of the pleats. In some implementations, this can provide less flexibility where thinner items are to be packed and are not fragile. As shown in FIG. 17, the pleated layer 1400 is tall with an apex angle of approximately 90 degrees. In various embodiments, the pleat height can be reduced by increasing the apex angle in the range of 105-165 degrees thus increasing cushioning and flexibility, as desired. In embodiments employing a composite material similar to that of this embodiment, an envelope could be configured that is somewhat flexible in the long direction and firmer in the direction of the envelope opening. In some illustrative embodiments, the pleated embodiment diverges from the prior art of pleated paper packaging found in U.S. Pat. No. 6,871,480, and U.S. Publication Nos. 2014/016666A1 and 2009/0233023A1, which are all incorporated herein by references as if recited in full.

U.S. Pat. No. 6,871,480 teaches the use of tissue paper adhered to the apices of the pleated sheet with a steep angle for stiffness as a wrapping product that is significantly taller to create a cushioning barrier. On the other hand, in some preferred embodiments of the present invention, wider pleat angles than taught in U.S. Pat. No. 6,871,480 are preferably employ, and preferably it is laminated only around the edges to the embossed paper.

Figure 18:
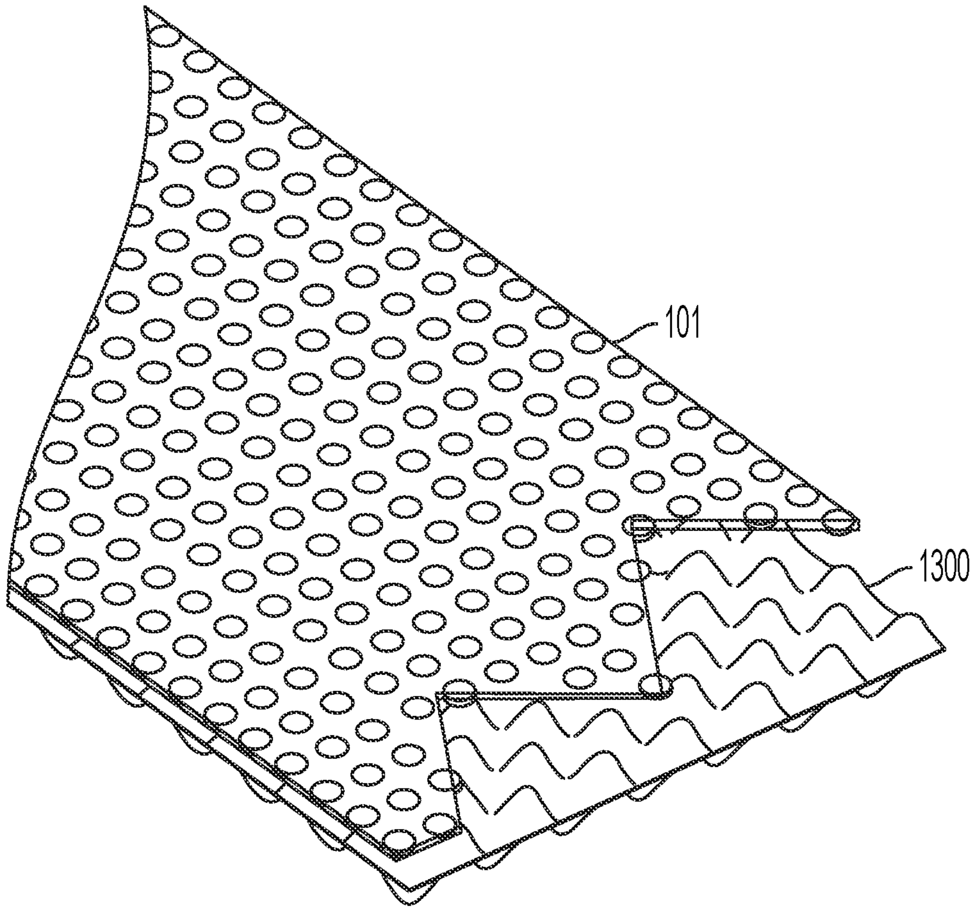
FIG. 18 is a perspective view of an undulating two-sided pattern in combination with an embossed layer.

With respect to FIG. 18, FIG. 18 shows an embodiment that is generally similar to that shown in FIG. 16, but without the inner layer 104. In particular, the embodiment shown in FIG. 18 includes an outer layer 101 having an array of downwardly facing circular embossments and an intermediate paper layer 1300 that includes an undulating sheet of paper similar to that shown in FIG. 16. In some embodiments, an inner layer can be provided of any particular type as described in the present application. In some other embodiments, a similar combination of the outer layer 101 and intermediate layer 1300 shown in FIG. 18 can be placed facing upwardly beneath the layers shown in FIG. 18 to create a composite material according to some other embodiments that includes two intermediate undulating paper layers.

II. Systems and Methods for Making Envelopes and the Like According to Illustrative Embodiments of the Invention The preferred embodiments of the present invention relate to systems and methods of making (e.g., manufacturing) envelopes and the like according to embodiments of the present invention. For example, the preferred embodiments can be used to manufacture envelopes and the like of the type set forth in the preceding Section I. As expressed above, in some embodiments, envelopes can be created of any of the types as described in the preceding section and/or in other portions of this application. In some preferred embodiments, envelopes are created employing one or more layer of expandable slit sheet paper that is sandwiched between inner and outer layers. In some embodiments, the inner and outer layers do not include embossments. In some embodiments, one or more of the inner and outer layers include embossments. In some embodiments, the envelopes employ a single layer of expandable slit sheet paper. In some embodiments, the envelopes employ two or more layers of expandable slit sheet paper.

With reference to FIGS. 19-22, various exemplary methods and techniques for manufacturing some illustrative envelopes according to various embodiments of the invention are depicted in these figures.

In some of the preferred embodiments, the envelopes are preferably manufactured by conveying rolls of material so as to create a composite of aligned layers that are conveyed parallel to and alongside one another, such as, for example, as shown in FIG. 3, in which the composite of aligned layers is shown at 302. In some examples, various embodiments described herein can include conveying devices similar to that shown in FIG. 3 to convey an elongated composite of aligned layers, and, such layers can then be processed to create a plurality of envelopes, such as, e.g., by connecting together portions of the layers (such as, e.g., at edge regions 402, 203). In some preferred embodiments, a plurality of composite materials (similar to 400 shown in FIG. 4, for example) for forming envelopes are formed in an end-to-end relationship, such as, e.g., shown in FIG. 19. Then, after formation, the formed composite materials can be cut from the conveyed end-to-end conveyed materials, to as to form separated individual composite materials similar to 400 shown in FIG. 4, for example. Then, the composite materials can be folded over and glued to form enclosed envelopes, such as shown in FIGS. 5-6, for example.

Figure 19:
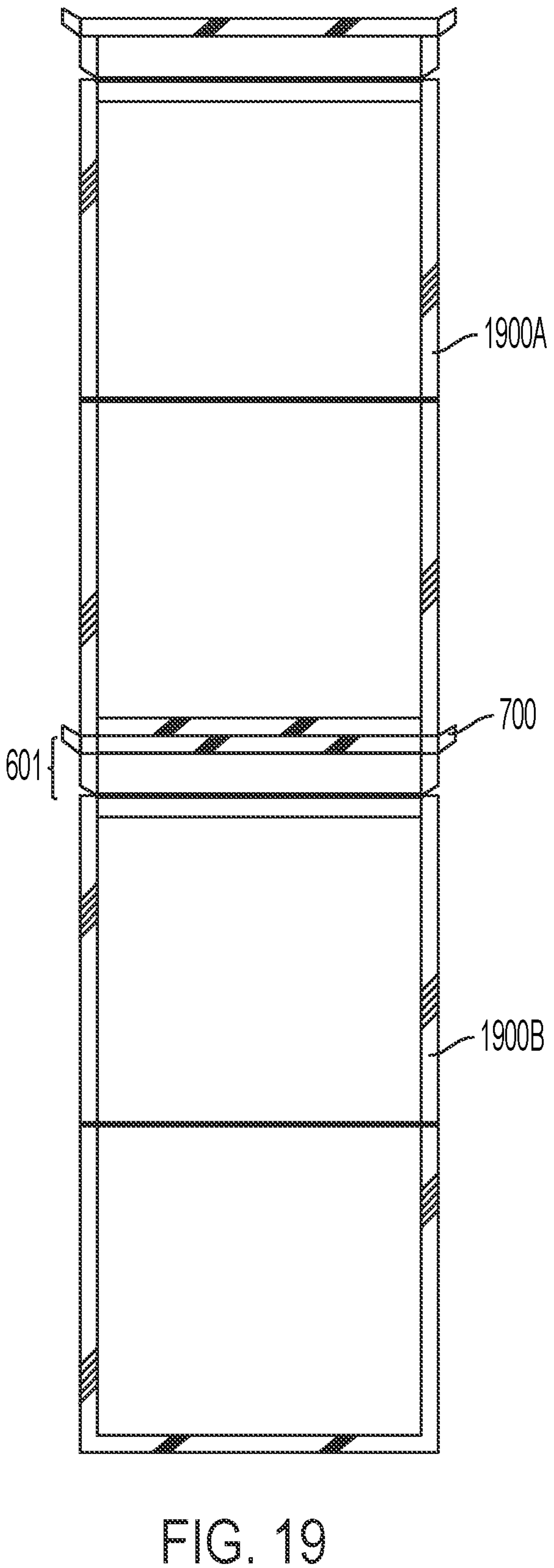
FIG. 19 is a plan view of two consecutive envelope pads that have been crushed in fold areas and die-cut in envelope end crush areas while, simultaneously being maintained under tension in the manufacturing direction in the side-crushing areas.

As shown in FIG. 19, in some preferred embodiments, the conveyed composite of aligned layers includes a plurality of composite materials (corresponding to a plurality envelopes) connected together in an end-to-end manner. For example, FIG. 19 shows two composite material portions 1900A and 1900B connected together in a repeated pattern, wherein, the composite materials shown in FIG. 19 are configured such as to be used form envelopes of the type shown in FIG. 7.

As illustrated in FIG. 19, in this illustrated embodiment, the region 700 formed at the bottom end of composite material portion 1900A (which is later folded over to form an outer edge of the mouth of a pouch as shown in FIG. 7) is in a state in which it is connected to a distal end of a flap portion 601 of the composite material portion 1900B.

In this illustrated example, the portions 1900A and 1900B are also depicted with release liners 701 attached to the portions 1900A and 1900B. Although in some embodiments, adhesive 502 can be placed at region 705 and the release liner 701 can be placed over the adhesive prior to separation of portions 1900A and 1900B, in some alternative embodiments, such adhesive 502 and release liners 701 could be added to individual portions 1900A and 1900B after separation.

In some illustrative embodiments, the flap portion 601 is approximately 1.5" long (i.e., in a lengthwise direction of the portions 1900A/B) and the edge region 700 is approximately 0.5" long (i.e., in a lengthwise direction of the portions 1900A/B).

In some preferred embodiments, in order to a) adhere together layers of composite materials, b) crush the expanded slit sheet paper within the combined layers of composite materials (or to crush other cushioning papers, such as, e.g., pleated papers, embossed papers, or the like, that are within the combined layers of composite materials in some embodiments), and c) separate the composite material portions 1900A/B, various conveying rollers are employed.

Figure 20:
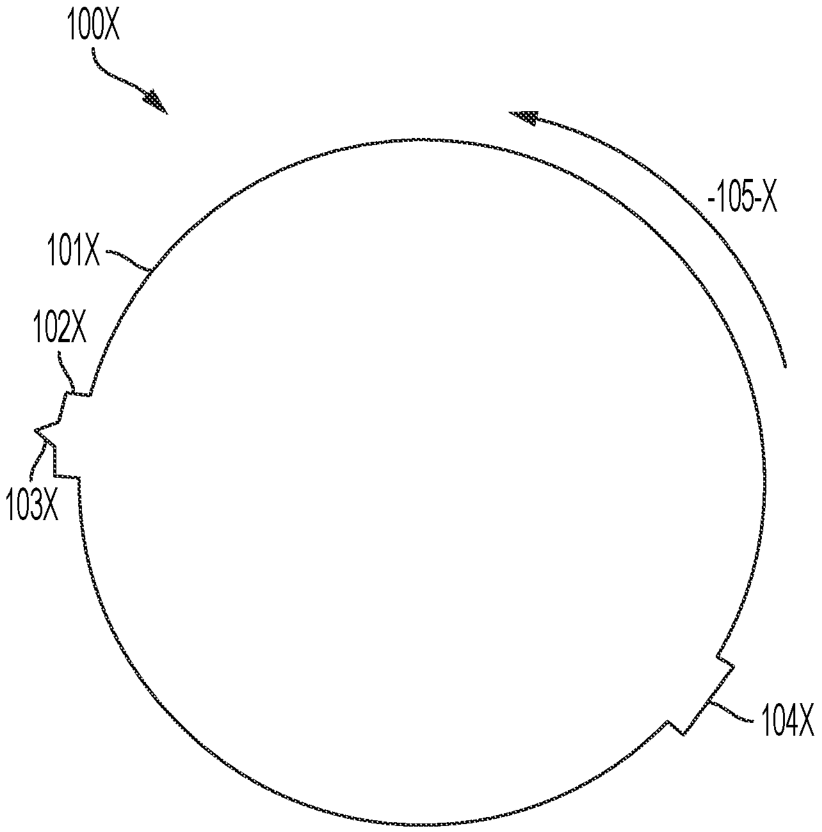
FIG. 20 is a side view of the upper rotary tool that provides the crush and cut for making the padded envelope.
Figure 21:
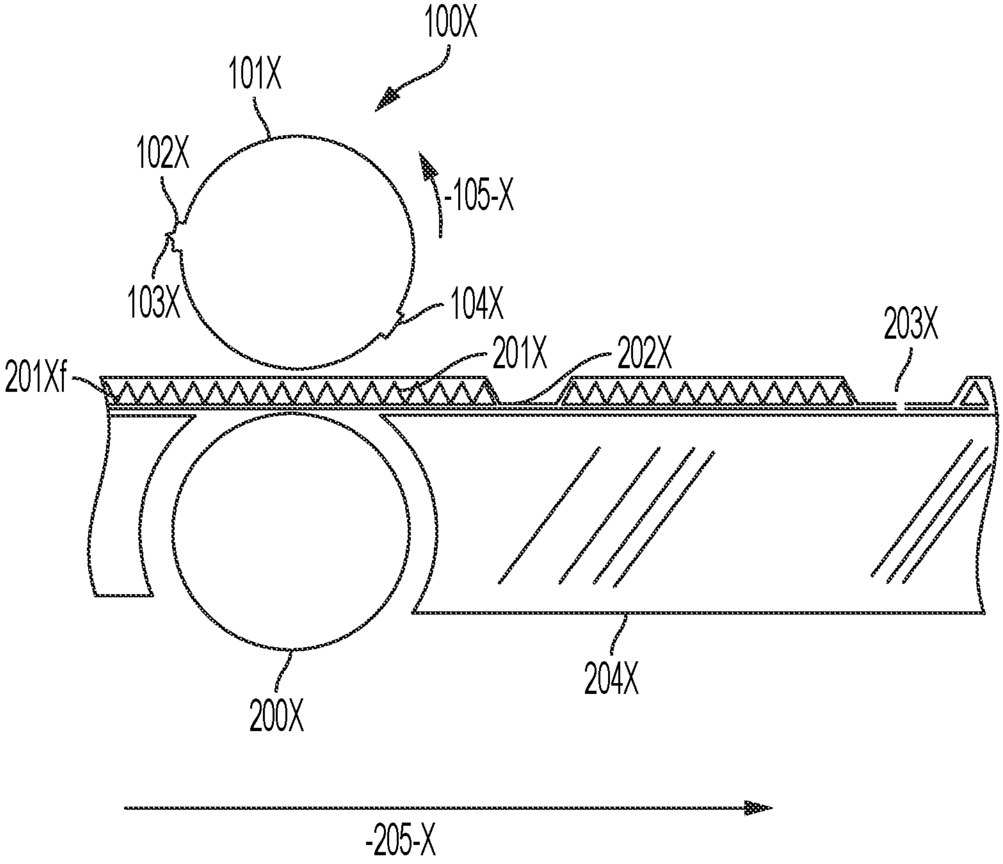
FIG. 21 is a side view of the die cut crush rotary system.

For example, FIG. 20 shows an illustrative conveying roller 100X that can be employed in some embodiments. In this illustrative example, the conveying roller is rotated in a direction counterclockwise as shown by the arrow 105X in FIG. 20. As shown in FIG. 21, the roller 100X cooperates with an opposing roller 200X and together rotate as the composite material layers are conveyed in the direction of the arrow 205X between the rollers 100X/200X via the conveyor system. In the preferred embodiments, the roller 100X rotates in the direction of the arrow 105X at a same rate of the movement in the direction 205X.

In some of the most preferred embodiments, the roller 100X operates as a die cutting-crushing rotary tool where 101X is the outer circumference of the tool and is specifically sized to have a circumference that is the same as the total length of the envelope pad being made.

As shown in FIGS. 20 and 21, the roller 100X includes a depending pressure member 104 which is configured to cause the composite materials to become crushed in a region 202X as shown in FIG. 21 (e.g., by being pressed between the rolls 100X and 200X when the portion 104X is adjacent the roll 200X). In addition, the roller 100X also includes a depending pressure member 102X that includes a cutting member 103X (e.g., a cutting blade or the like) which is configured to cause the composite materials to become crushed in a region 203X and also cut or separated in the region 203X (e.g., by being pressed between the rolls 100X and 200X when the portion 102X is adjacent the roll 200X, and by being cut by the cutting member 103X).

Figure 22:
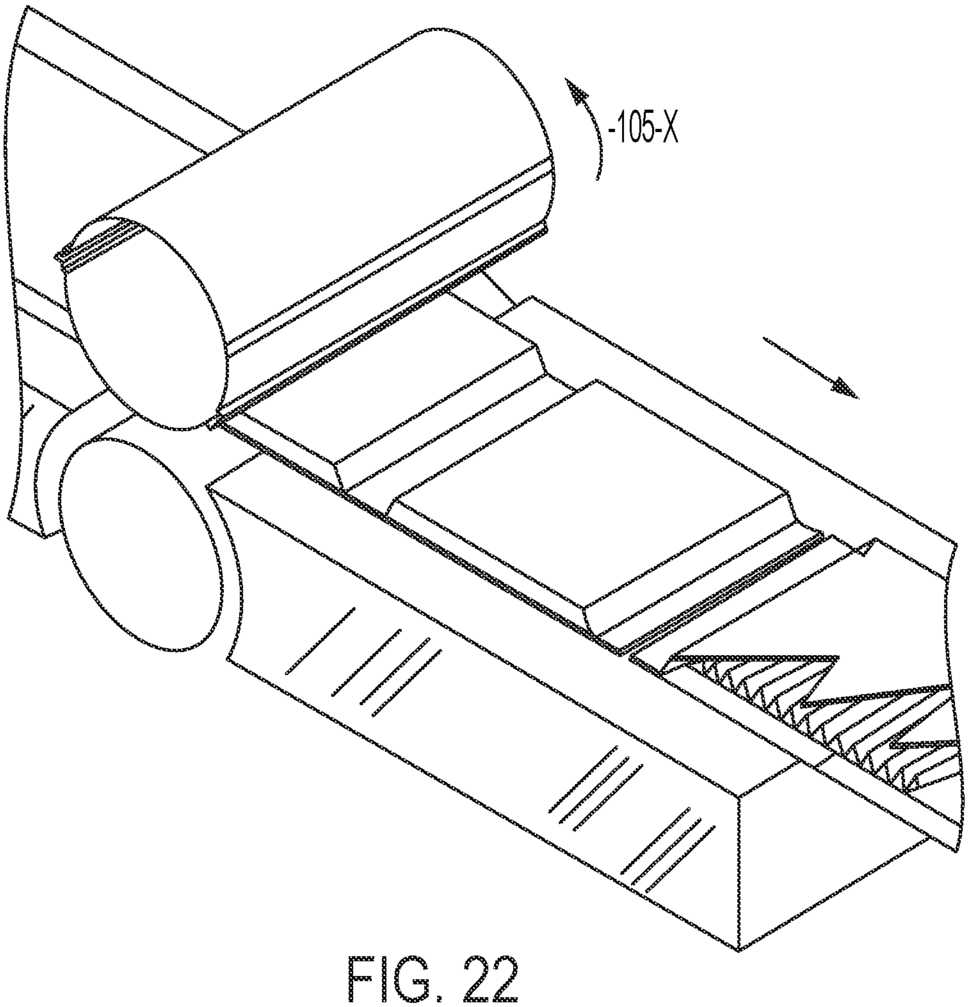
FIG. 22 is a perspective view of the rotary padded envelope pad making section.

For reference, FIG. 22 shows a perspective view of the system shown in FIG. 21. Although FIGS. 21 and 22 schematically show at 201X an expanded paper that appears as a pleated paper, in the preferred embodiments, the element 201X is an expanded slit sheet paper in accordance with the most preferred embodiments of the invention. However, as should be appreciated based on this disclosure, in some less preferred embodiments, a pleated paper could be employed similar to the embodiment shown in FIG. 17 or any other cushioning layer described in other embodiments herein could be employed as an interior cushioning layer 201X of FIG. 21.

With reference to FIGS. 20-22, it is noted that these figures are schematic representations and some of the sizes or the like of the components are not to scale for the formation of some of the embodiments of the invention.

With reference to FIG. 21, in some preferred embodiments, the crushed region 202X which can be formed by the member 104X can be employed to create a narrow crushed region to facilitate folding to create an envelope pouch in some preferred embodiments. For example, this can be employed along the fold line 501 in the embodiment shown in FIG. 5 or to create a narrow crushed region at a location of the fold 709 shown in the embodiment of FIG. 7. In this manner, the composite material can be more readily folded over the fold line 501 or at the fold 709. Although FIG. 21 schematically shows a wide crushed portion, in some preferred embodiments, the width of the crushed region in a lengthwise direction (e.g., in the machine direction) is preferably less than ½ inch, or, in some embodiments, less than ⅓ inch, or, in some embodiments, less than ¼ inch, or, in some embodiments about ⅛ inch or even less.

In some preferred embodiments, prior to reaching the rollers 100X and 200X, the composite materials pass a device that applies glue at regions to be glued during pressing of the rollers 100X and 200X. For example, prior to pressing to create the crushed region 202X, in the preferred embodiments, a narrow strip of glue is already applied by the glue device. In the preferred embodiments, the narrow strip of glue has a width in the length direction that is the same or less than the width of the crushed region in the lengthwise direction as discussed above.

With reference to FIG. 21, in some embodiments the region 203X represents a region in between adjacent portions for creating separate envelopes, such as, e.g., between adjacent portions 1900A and 1900B shown in the embodiment of FIG. 19. In addition, the crushed portion shown to the right of the cut in the region 203 in FIG. 21 (which cut having been made by the cutter) can correspond to, e.g., the portion 700 in the embodiment shown in FIG. 19 (as one illustrative example), while the crushed portion shown to the left of the cut in the region 203X in FIG. 21 can correspond to, e.g., the flap portion 601 shown in FIG. 19 (as one illustrative example).

As such, it should be appreciated that in some illustrative embodiments, the rollers 100X and 200X can be used to join together the layers by forming widthwise crushed and glued portions and separating the joined composite material portions for forming of individual separate envelopes.

Although not illustrated in FIGS. 20-22, in the preferred embodiments, after the layers are conveyed into the combining area 302 shown in FIG. 3 and before the layers are conveyed to the rollers 100X and 200X, the composite layers are preferably directed to a glue device that applies glue to appropriate locations in between the composite layers at appropriate locations along the layers. In some embodiments, the glue device includes one or more glue dispensing nozzles that are computer controlled to dispense glue at precise locations between the layers. In some examples, the glue device can, for example, apply glue to one layer, such as, e.g., a bottom layer at a location in between the composite layers. Then, later, upon application of pressure (such as, e.g., between the rollers 100X and 200X) the applied glue can permeate and adhere between all of the layers in some embodiments.

Additionally, although also not shown in the figures, concurrently with application of the glue by the glue device or after application of the glue but prior to conveyance to the rollers 100X and 200X, in some preferred embodiments, the lateral side edges of the composite layers are preferably adhered together by applying pressure rollers along both lateral side edges of the composite layers, such as to form, for example, connected regions 402 shown in the illustrative example of FIG. 4. In order to adhere the lateral side edges, it should be appreciated that the glue device should also preferably apply glue at appropriate lateral side edges to enable formation of the edge regions 402 or the like.

In this manner, prior to connecting together of the composite layers cross-wise across a width of the layers (i.e., transverse to the machine direction), the composite layers are preferably initially attached along their lateral edges to form a generally tubular configuration prior to passing between the rollers 100 and 200.

In the schematic representations shown in FIGS. 21 and 22, the lateral side edges of the composite layers are not illustrated as adhered together. However, in the preferred embodiments, as discussed above, the lateral side edges are adhered prior to passing through the rollers 100X and 200X.

Although FIG. 19 shows notch regions already formed along the flap region 601, in the preferred embodiments, notch regions (such as, e.g., notches 706 shown in FIG. 7) are concurrently formed by the rollers 100X and 200X, in such a manner that in addition to incorporating a cutting element 103X to separate adjacent portions, the roller 100X can include additional cutting elements to form similar notches 706.

Additionally, although not depicted in FIGS. 20-22, in addition to a cutting element 103X the member 102X can also include a pressing element that does not cut through the composite material, but that creates a score line extending between the notches 706 in order to facilitate tearing for opening of the pouch after being sealed closed.

Accordingly, in the illustrated embodiments, attached to the outer circumference of the roller 100X is crush area member 102X in combination with cutting element 103X and score line crushing area member 104 that creates a fold region for the pouch area of the envelope as the roller 100X rotates in direction of arrow 105X. The die cutting-crushing areas 102X and 103X make contact with the envelope pad layers are which are crushed and cut at 203X. Continuing the rotation crush only area 104X had just crushed in area 202X and the repeat of the crushing would make an additional crush cut 203X to continuously make envelope pads.

Figure 40:
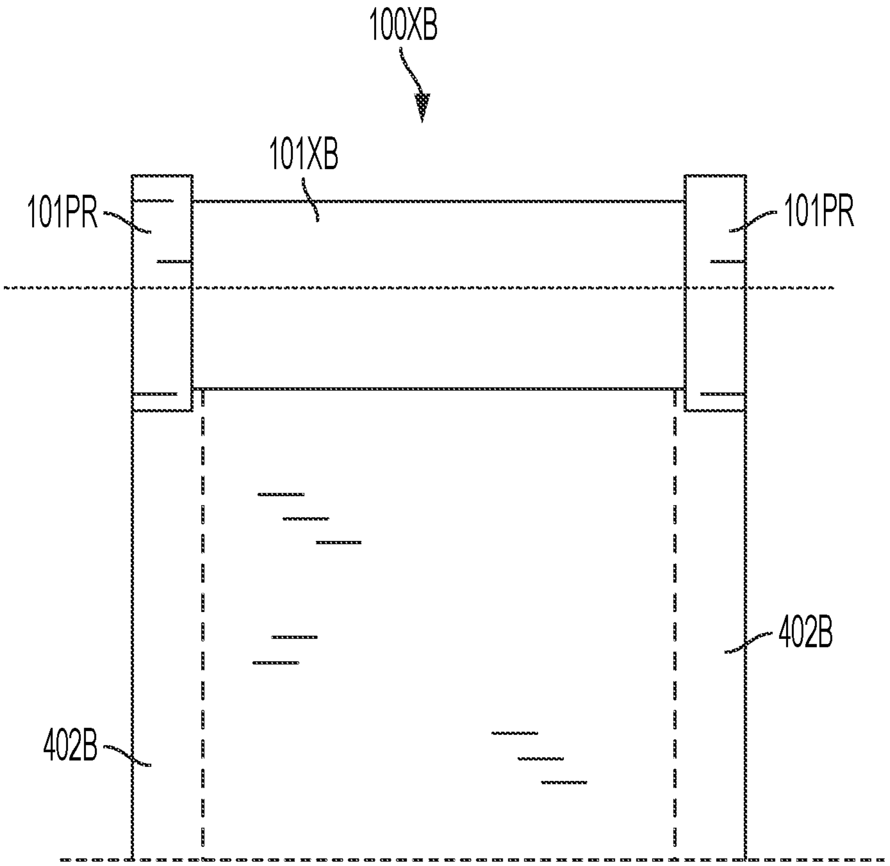
FIGS. 40-42 illustrate further embodiments that are similar to the embodiments shown in FIGS. 20-22.
Figure 41:
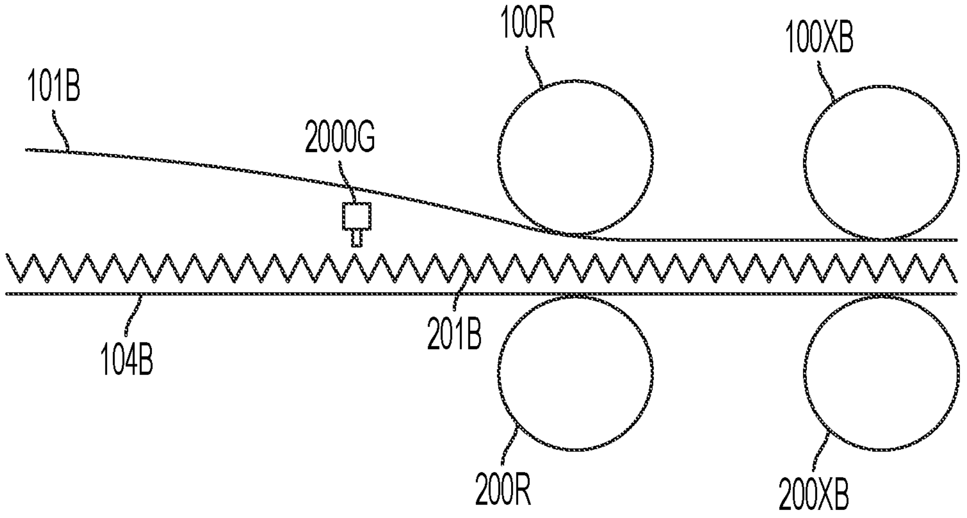
Figure 42:
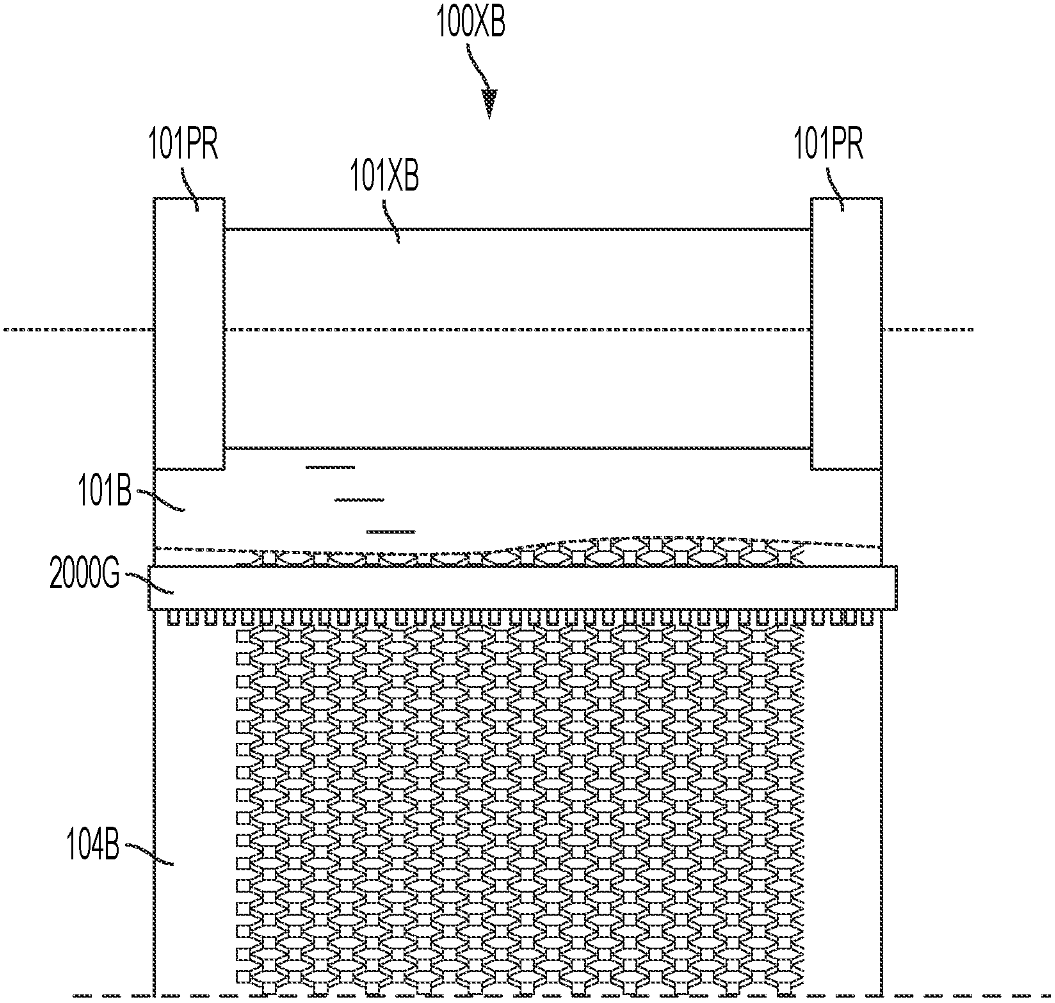

With reference to FIGS. 40-42, these figures show further embodiments that are similar to the embodiments shown in FIGS. 20-22.

In the embodiment shown in FIG. 40, a roller 100XB is provided that is employed within the same context of the embodiment shown in FIGS. 20-22, with the roller 100XB including lateral side portions 101PR that are arranged to press on the lateral side regions 402B, which correspond, for example, to side regions 402 shown in the embodiment of FIG. 4.

Although not shown in FIGS. 40-42, the roller 100XB also preferably includes similar portions 102X, 103X, and 104X as shown and described in relation to FIGS. 20-22 herein-above.

With reference to FIG. 41, FIG. 41 is a schematic side view of the roller 100XB shown in FIG. 40, in conjunction with a roller 200XB, which is similar to the roller 200X described herein-above with respect to FIGS. 20-22. Towards that end, the rollers 100XB and 200XB shown in FIG. 41 preferably operate similarly to the rollers 100X and 200X shown in FIGS. 20-22.

In the illustrative embodiment shown in FIG. 41, an additional roller pair 100R and 200R is also provided. Towards that end, in some alternative embodiments, one or more additional roller pair(s) can be employed. In the preferred embodiments, the additional roller pair(s) 100R and 200R can be similar to the roller pairs 100X and 200X or 100XB and 200XB, except without mechanisms to transversely cut the material (e.g., without member 103X shown in FIG. 20). In some embodiments, the additional roller pair(s) also do not include mechanisms to crush the expanded paper transversely to the direction of movement (e.g., without members 102X and/or 104X). However, in some embodiments, the additional roller pair(s) can include mechanisms to crush the expanded paper transversely to the directly of movement (such as to, e.g., facilitate formation of the envelopes).

In the preferred embodiments, the additional roller(s) 100R include similar lateral side portions 101PR that are arranged to press on the lateral side regions 402B similar to that of the roller 100XB. Towards that end, although FIG. 41 schematically shows the expanded slit sheet paper 201B extending between roller pairs 100R/200R and 100XB/200XB, with a depicted separation between the rollers 100R/200R and 100XB/200XB and a depicted separation between the top and bottom sheets 101B and 1048 and expansion of the sheet 201B (for illustrative purposes), it should be appreciated that during operation, the rollers 100R/200R and rollers 100XB/200XB would be brought into a pressing configuration to effect pressing of the layers of sheets and also crushing and gluing according to embodiments described herein.

As shown in FIG. 41, in some preferred embodiments, an expanded sheet 201 (e.g., an expanded slit sheet) is fed in between two opposing sheets 101B and 104B, similarly to the feeding of sheets from the system shown in FIG. 3, except that, in some preferred embodiments, a single expanded slit sheet is fed as shown in FIG. 41. In some preferred embodiments, the expansion device that is employed to expand the expandable sheet is modified from that shown in FIG. 3 to include one or more of the embodiments expansion systems described in Section III hereinbelow and shown in FIGS. 23-39.

As shown in FIG. 3, in the preferred embodiments, the expanded sheet is fed between two sheets of paper (e.g., a top sheet 101B and a bottom sheet 104B in the embodiment shown in FIG. 41). In various embodiments, these sheets can employ any of the papers described in embodiments herein. Similarly, in various embodiments, the expanded sheet 201B shown in FIG. 43 can employ any of the expandable sheets described herein. In some most preferred embodiments, the expandable sheet is an expandable slit sheet paper made with extensible paper according to any of the various embodiments described herein.

As shown in FIG. 41, in the preferred embodiments, prior to feeding in between the rollers 100XB and 200XB, a gluer 2000G is employed that applies glue at a location in between the sheets 101B and 1048. In the preferred embodiments, the glue is applied at a location such that upon an application of a compression force from above the top surface of the top sheet 101B and from below the bottom surface of the bottom sheet 1048 the applied glue spreads and contacts all of the sheets 101B, 1048 and 201B such as to bind the sheets together.

In the preferred embodiments, the system is configured such as to compress the expanded slit sheet paper while pressing between the top sheet 101B and the bottom sheet 104B in a manner to effect bonding of the layers with glue that is applied by the gluer 2000G.

With reference to FIG. 42, this figure shows a schematic side view from the left side of FIG. 41 (without any additional roller pair(s)), and with the top sheet 101B shown cut away to allow viewing of the interior region between the top sheet 101B and the bottom sheet 104B. As shown, the gluer 2000G preferably extends laterally across the width of the conveyed paper in a direction transverse to the direction of movement of the paper (e.g., in a direction substantially parallel to an axis of the roller 100XB). In the preferred embodiments, the gluer includes an array of nozzles (as shown) that extend downward over the expanded sheet 201B and over the bottom sheet 1048.

As shown in FIG. 42, in the preferred embodiments, the lateral side portions 101PR cooperate with the lower roller 200XB shown in FIG. 41 in order to press on the lateral side regions 402B. By way of example, the lateral side regions 402B can correspond to side regions 402 shown in the embodiment of FIG. 4. As shown in FIG. 42, the lateral side portions 101PR are located laterally to the sides of the expanded slit sheet paper 201B such that the lateral side portions 101PR do not press on the expanded slit sheet paper. Accordingly, the lateral side portions 101PR are configured to seal the lateral sides of the envelop without pressing against, crushing or creating a seal with the expanded slit sheet paper 201B. In the illustrated embodiment, the lateral side portions 101PR cause the top sheet 101B to seal directly to the bottom sheet along the lateral edges corresponding to the width of the lateral side portions 101PR.

Accordingly, in operation, the lateral side portions 101PR of the roller XB can continuously press and seal the lateral side edges between the top sheet 101B and the bottom sheet 1048, and the gluer 2000G can include nozzles that are located to dispense glue within these corresponding lateral side regions on a continuous basis such that the lateral side edges between the top sheet 101B and the bottom sheet 104B are continuously adhered together (e.g., by being continuously glued and pressed).

As also shown in FIG. 42, the central surface area 101XB of the roller 100XB is preferably recessed from the lateral side edge portions 101PR. That is, the lateral side edge portions 101PR preferably have a larger radius than the radius of the central surface area 101XB (notably, in the preferred embodiments, the lateral side edge portions 101PR and the central portion corresponding to the central surface area 101XB are circular or substantially circular to facilitate rotational movement; however, various embodiments could include other configurations, but, preferably, as long as rotational movement and pressure is appropriately applied). In some preferred embodiments, the central surface area 101XB does not crush and/or press on the expanded slit sheet paper. In some embodiments, the central surface area 101XB can apply a slight amount of pressure to help maintain the position of the expanded slit sheet paper without crushing the expanded slit sheet paper.

Furthermore, although the embodiments shown in FIGS. 20-22 and 40-42 include opposing rollers (e.g., 100X/200X, 100R/200R and/or 100XB/200XB), in some embodiments the opposing members do not both need to be the same. For example, in some embodiments, the lower rollers 200X, 200R and/or 200XB in the illustrated embodiments could be replaced by conveying belts or other moving members.

In the preferred embodiments, the gluer 2000G is configured to periodically dispense glue laterally widthwise across the top surface of the expanded slit sheet paper, such as to place a thin line of glue or thin row of glue spots that extends laterally across the width of the conveyed paper, which thin lines glue or thin rows of glue spots are specifically located so as to correspond with the locations of the crush regions 202X and 203X shown in, e.g., FIG. 21 and to align with the members 104X and 102X in order to create such crush regions 202X and 203X. Therefore, in some preferred embodiments, the gluer 2000G is configured to cause glue to periodically be dispensed within a central region between the lateral side edges (as described in this paragraph), and to be continuously dispensed within lateral side regions (as described above). Towards this end, in the preferred embodiments, a control system can be employed to control the dispensing and timing. Moreover, in some embodiments separate gluers can be used to dispense glue at the lateral side edges and within the central region. Although one gluer 2000G is illustrated, in various embodiments, a plurality of different gluers can be employed. Additionally, although FIGS. 41 and 42 show a single gluer that is aligned at the same transverse location along the conveyed sheets, in some embodiments, one or more gluer can be employed that applies glue at a plurality of locations or positions within a moving or conveying direction of the sheets.

In addition, although the embodiment shown in FIGS. 40 to 42 show a gluer 2000G positioned to dispense glue at a position above the top surface of the expanded slit sheet paper 201B, in other embodiments, the gluer 2000G or, alternatively, one or more other gluers, can be located to dispense glue at other locations. For example, in some embodiments, the gluer 2000G can be arranged beneath the expanded slit sheet paper 201B such as to dispense glue upon an upper surface of the bottom sheet 104B.

According to some of the preferred embodiments, in the formation of a padded envelope, such as, e.g., like that of FIGS. 4-6, the lateral side regions of the padded envelope (e.g., as shown at 402 in FIG. 4) are preferably crushed.

According to some preferred embodiments of the present invention, the systems and methods for making such an envelope are specially configured to maintain the expanded slit sheet paper in a reliable manner during the manufacture of the envelope. For example, in some embodiments, the mechanism maintains a desirable tension and expansion of the expandable slit sheet paper. For example, in some embodiments, the systems and methods provide novel and advantageous holding of the layers of the envelope during manufacture in a manner to maintain the expansion state of the expandable slit sheet paper. For example, in some preferred embodiments, novel and advantageous mechanisms are provided that hold front and/or back areas of the expanded slit sheet material.

For example, during the expansion of and after the expansion of expandable slit sheet material, novel mechanisms can be employed to hold the expandable slit sheet material, such as, e.g., mechanisms to facilitate expansion and/or holding of expansion of expandable slit sheet material. For example, Section III of this application set forth illustrative mechanisms to, e.g., hold expandable slit sheet material to facilitate expansion.) Additionally, Section II and other portions of this application set for illustrative mechanisms to, e.g., hold expandable slit sheet material during gluing and/or cutting steps in the formation of, e.g., envelopes.

In some preferred embodiments, as shown in, e.g., FIGS. 40-42, during the conveying of layered sheets, side areas are held and conveyed simultaneously with the expanded slit sheet paper in a manner to consistently maintain the tension of the expanded slit sheet paper.

In some preferred embodiments, as shown in, e.g., FIGS. 20-22 and 40-42, the front end of the envelop is pressed-and-glued and cut in a synchronous forward motion by, for example, employing a rotary pressing and cutting die, such that the envelop is consistently driven and held at the distal end along with the forward movement of the layers forming the envelop, in a manner to similarly consistently maintain the tension of the expanded slit sheet paper.

Moreover, in preferred embodiments, the expanded slit sheet material is not adhered along lateral sides, but rather, highly advantageously, only to front and back regions in the conveying direction of the layers. Among other things, this helps to maintain a consistent state of expansion through the expanded slit sheet. Additionally, this also advantageously allows for a smaller use of adhesive and enables the creation of a superior and much more sustainable padded envelope.

In this condition, during the conveying of the layers (such as, e.g., conveying of the top sheet 101B, the expanded slit sheet 201B and the bottom sheet 104B as shown in FIGS. 41 and 42), the expanded slit sheet 201B is in an expanded state between the outer sheets without support along the lateral sides. Furthermore, if the conveyance of the layers of sheets is stopped, the expansion state of the expanded slit sheet 201B can be affected. For example, this could lead to slacking of the expanded slit sheet and retraction from the expanded state.

Moreover, expansion of expandable slit sheet paper can have subtle variations due to paper qualities. In some instances, for example, wrinkling and/or inconsistencies in expansion across the expanded slit sheet paper can occur. With the present systems described in this application, such as, e.g., in Sections II and III of this application, expandable slit sheet paper can be very smoothly and reliably expanded.

Thus, in the preferred embodiments, as the layers are conveyed to the cutter member 103X of the roller 100X or 100XB, the forward conveyance of the layers of sheets is preferably maintained without stopping of the conveyance and/or without discontinuities in conveyance that can impact the expansion characteristics of the expanded sheet.

Additionally, in the preferred embodiments, the system components for gluing and cutting (such as, e.g., embodiments shown in FIGS. 20-22 and 40-42) is preferably configured to continuously pull from a leading end of the expanded slit sheet paper 201B in order to continuously maintain tension of the expanded slit sheet paper. That is, the system is preferably configured to continuously grasp the leading edge of the expanded slit sheet paper 201B so as to maintain expansion, even during and after cutting and separation of the individual envelopes.

Towards that end, in preferred embodiments, the systems is preferably configured to include roller pairs that continuously pull the layers of sheets along the lateral sides of the envelopes being created without releasing of the envelopes during operation. For example, as shown in the embodiments of FIGS. 40-42, in some preferred embodiments, the roller 100XB includes lateral side regions 101PR that are configured to continuously press the layers of sheets along the lateral sides of the envelopes being created. In the preferred embodiments, the rotation of the lateral side regions 101PR not only creates a downward pressing force on the layers, but in the preferred embodiments, the lateral side regions 101PR also have a sufficient frictional quality (for example, can include a roughed surface, a rubber surface and/or other quality to impart friction against the pressed layers) such as to pull the layers forward in the conveyance direction. As shown in FIG. 41, in some embodiments, one or more additional roller pair(s) 100R/200R can be employed, which additional roller pairs 100R/200R are preferably configured to include similar lateral side regions 101PR such as to press on the lateral side edges of the conveyed layered sheets. In the preferred embodiments, the one or more additional roller pair(s) 100R/200R similarly do not crush or otherwise press on or interfere with the expansion of the expanded slit sheet paper 201B (i.e., similarly to the roller 100XB). Although the embodiment shown in FIG. 41 depicts one additional roller pair 100R/200R located upstream of the conveyance direction to the roller 100XB, in some alternative embodiments the additional roller pair 100R/200R could be located downstream in the conveyance direction from the roller 100XB. Moreover, in some embodiments, additional roller pairs could be located both upstream and downstream of the roller XB. Moreover, in some embodiments, the roller 100XB can be similar to the roller 100X shown in FIGS. 20-22, and separately rotated additional roller pairs 100R/200R can be provided that are axially aligned with or otherwise overlapping in a transverse direction with the roller 100X, wherein the additional roller pairs 100R/200R can include separate roller pairs at each lateral side of the conveyed sheet, such that the roller 100XB can carry out pressing and cutting functions transversely across the conveyed layered sheets while the additional roller pairs 100R/200R carry out continuous pulling of the conveyed layered sheets.

Therefore, in the preferred embodiments, the lateral side edges of the layered sheets are continuously pressed and pulled by lateral side pulling roller members, such as, e.g., the lateral side regions 101PR, as described above. Although, in the preferred embodiments, the expanded slit sheet paper 201B is not fixed along these lateral side regions, in the preferred embodiments, the system is configured to carry out the transverse gluing and cutting in a manner to consistently maintain the expansion state of the expanded slit sheet paper 201B. Notably, in the preferred embodiments, the roller 100X or 100XB advantageously includes laterally extending pressing members 102X and 103X that laterally press the layered sheets (as discussed above) in a manner to crush the expanded slit sheet paper between the top and bottom layers at locations in which glue has been applied (e.g., with the gluer 2000G). Moreover, in the preferred embodiments, the pressing action is carried out in a manner to effect such pressing action while concurrently maintaining the forward conveyance of the layers of conveyed sheets.

Thus, although the expanded slit sheet paper 201B is not fixed along the lateral side edges in the preferred embodiments, because the system continuously fixes the lateral side edges between the top and bottom sheets 101B and 104B, once the system crushes and glues the layers or sheets laterally across the conveyed sheets (e.g., at locations 202X shown in FIG. 21), the expanded slit sheet paper is, thus, firmly maintained in an expanded state between the top and bottom layers 101B and 104B, by being fixed at the distal or front end of the expanded slit sheet paper 201B in the conveying direction due to the transverse crushing and gluing, while concurrently having that transversely crushed region (e.g., region 202X shown in FIG. 21) extending and being supported at lateral side edges that are pressed and glued (e.g., employing lateral side regions 101PR that press the layered sheets after the application of glue from the gluer 2000G as discussed above).

Furthermore, in the preferred embodiments, the cutting element 103X is arranged such as not to cut the layered sheets until the pressing member 102X has already pressed the layered sheets together and effected crushing of the expanded slit sheet paper and pressing of the layers in such a manner to cause the distal end of the expanded slit sheet paper 201B to be adhered laterally to the top and bottom sheets 101B and 104B. Thus, in the preferred embodiments, when the cutting element 103X severs the expanded slit sheet paper 201B, the paper will not retract from an expanded state, but, rather, will maintain a consistent and desirable state of expansion.

Additionally, in the preferred embodiments, the cutting member 103X is also arranged to carry out the cutting during the time period within which the pressing member 102X is pressing the layered sheets. Accordingly, in some preferred embodiments, upon cutting and separating of the layers of sheets in the conveyance direction to separate individual envelopes, the pressing member 102X is still applying pressure for a short time period such as to create a more gradual release after cutting.

Additionally, in the preferred embodiments, the pressing and cutting is carried out, as described herein-above, continuously as the conveyed sheets are conveyed at a substantially consistent rate, whereby advantageously maintaining a desirable expansion state and quality of expansion of the expanded slit sheet material.

As described herein, in the preferred embodiments, the pressing and cutting is carried out by employing a rotary cutting and pressing member. Moreover, as described herein, in the preferred embodiments, the rotary cutting and pressing member is circular or substantially circular. However, in alternative embodiments, the rotary cutting and pressing member could include non-circular configurations (e.g., elliptical or other non-circular configurations) that are rotated in a manner to effect pressure, while concurrently rotating to accommodate continuous forward conveyance. Although the conveyance speed is preferably constant or preferably substantially constant (e.g., with a variation of conveyance speed during the entire process of receiving and cutting an envelope (i.e., during each repeated cutting cycle) having conveyance speeds that are substantially the same during each entire cycle, or, in some embodiments, that do not vary more than 5% during the entire cycle, or, in some embodiments, that do not vary more than 10% during the entire cycle, or, in some embodiments, that do not vary more than 15% during the entire cycle, or, in some embodiments, that do not vary more than 20% during the entire cycle, or, in some embodiments, that do not vary more than 25% during the entire cycle, or, in some embodiments, that do not vary more than 30% during the entire cycle, or, in some embodiments, that do not vary more than 40% during the entire cycle, or, in some embodiments, that do not vary more than 50% during the entire cycle.

Additionally, while the conveyance speed is preferably substantially the same during operation, such as, e.g., throughout each entire cycle or receiving, cutting and separating respective envelopes, as discussed above, in some embodiments, even if a portion of the entire cycle is rendered discontinuous, in some preferred implementations, the process related to the transverse cutting and pressing-crushing of the layered sheets is preferably carried out during conveyance of the layers. Moreover, in some preferred embodiments, the conveyance of the layers leading to the systems for transverse cutting and pressure-crushing and during such transverse cutting and pressure-crushing (such as, e.g., described in Section II of this application) are carried out at a substantially continuous rate. For example, in some embodiments, the conveyance of the layers immediately prior to and during such transverse cutting and pressure-crushing is preferably constant or preferably substantially constant (e.g., with a variation of conveyance speed during that portion of the process having conveyance speeds that are substantially the same, or, in some embodiments, that do not vary more than 5%, or, in some embodiments, that do not vary more than 10%, or, in some embodiments, that do not vary more than 15%, or, in some embodiments, that do not vary more than 20%, or, in some embodiments, that do not vary more than 25%, or, in some embodiments, that do not vary more than 30%, or, in some embodiments, that do not vary more than 40%, or, in some embodiments, that do not vary more than 50%.

Although preferred embodiments employ a rotated roller 100X/100XB or other rotated member as described above, in some, less preferred embodiments, a reciprocated pressing member could be employed. However, in such less preferred embodiments, the reciprocated pressing member is preferably arranged to move along the conveyance direction during pressing and cutting (e.g., by including a mechanism to reciprocate the pressing element not only vertically to and from a pressing and/or cutting position, but also a mechanism to move the reciprocated pressing member along the conveyance direction while in a pressing and/or cutting position and to return the reciprocated pressing element afterwards to an appropriate position to press and cut the next portion of the layered sheets during operation.

In the preferred embodiments, after the individual portions are separated and cut by the roller 100X/100XB, the final envelop can be created by conveyance of the individual portions to a folder and gluer mechanism that folds the individual portions and glues the individual portions into the configuration of an envelope (e.g., such as, e.g., similar to that shown in FIG. 6).

In the preferred embodiments, the configuration of the instant design produces a padded envelope where the mouth opening of the padded envelope is in the width of the machine (e.g., transverse to the conveyance direction). In contrast, prior art envelope manufacturing processes have the mouth of the envelope formed parallel to the conveyance direction (i.e., transverse to the direction of manufacture). The prior art to making envelopes does not have to contend with a simultaneous stretching the slit paper and, therefore, manufacture in the width direction so that more envelopes can be made per minute. In addition, the laminating is done with heat for plastic bubble and, therefore, is instantaneous unlike the requirement for drying of a paper cold glue or a cooling of a paper hot melt glue.

Moreover, it is typical that the length of the envelope is wider that the mouth or envelope width. By way of example, if the bubble padded envelope is 10" wide by 20" long then, each guillotine cut happens every 10" versus every 20" and therefore doubles the padded envelope making speed.

One problem with the guillotine making system if sought to be employed in the context of an expandable slit sheet paper as in the present invention is that it separates the leading envelope from the prior envelope and places a higher burden on maintaining the stretch of the slit sheet material in a smaller number of glued square inch area of the immediate envelope.

The previously filed art of the present inventor discusses the limitations of outer paper thickness to overcome wrinkling of as the slit sheet tries to retract. In the case of the instant art, aspects of this discussion relates more specifically to the manufacturing process where the glue is in the process of drying and or cooling and is therefore, more vulnerable from distortion and delamination from the retracting slit sheet material. To overcome this, in the preferred embodiments, a rotary method has been found by the present inventor to be the best way to maintain the maximum amount of paper adhesive combination. On the other hand, if processes of the present invention were replaced by a simple guillotine cutting element, then the web could slacken during the cutting process thus producing wrinkling and delamination.

There is an additional advantage for the rotary method providing substantial benefits in the context of the present invention related to expanding slit sheet material. The expanded slit sheet is most conveniently stretched in the direction of manufacture. Since most padded envelopes are longer than they are wide, manufacturing in the width direction would cause either one of two scenarios:

The first, is the expanding the slit sheet in the direction of manufacture and would in many instances require multiple webs of material being stretched which, would require more than one slit sheet die cutter and the handling and exact position of the multiple side-by-side webs required. The maximum available width of a die cutting machine is, e.g., 30" which makes a stretched width of, e.g., 23.5". The envelope still requires folding for the pouch and the fold over seal of, e.g., about 1.5" making the usable pouch area about, e.g., 11". However, in preferred applications, many envelopes are longer that 11" for the pouch area. Again, the solution would be multiple die cutters to manage the full length required and the complications of placing them side by side.

The second is by expanding in the transverse direction of manufacture which would require one web but, would require a holding mechanism to maintain stretch while gluing the multiple layers in a step-by-step basis rather than a continuous manufacturing process.

Either approach creates a further issue of cost of machinery. In the preferred embodiments, the present machine is small in footprint and can be placed close to markets that would be too small for width direction equipment.

The conclusion, it is not obvious for one skilled in the art to manufacture a slit sheet padded envelope to use the rotary method to eliminate multiple steps and or wrinkling and delamination.

a. Additional Aspects of Some Preferred Embodiments

As discussed herein-above, in some of the preferred embodiments, an embossed paper is employed which provides a flexibility and a slight cushioning protection not found in flat sheet paper.

In some preferred embodiments, the expanded slit material is not adhered to the sides (e.g., not adhered to regions 402 shown in FIG. 4, regions 705 shown in FIG. 7, etc.), but, advantageously, only or substantially only to the front and back areas. Among other things, this advantageously provides for much smaller use of adhesive and produces a superior and much more sustainable padded envelope.

In some preferred embodiments, the present invention employs expanded slit sheet material in combination with top and bottom exterior layers of paper to produce a padded envelope with cushioning properties. To provide this on a continuous basis with consistent optimal stretching of the slit sheet material a rotary method of die cutting and crushing is preferred.

In some preferred embodiments, a padded envelope is provided in which the mouth opening of the padded envelope is across the width of the machine. On the other hand, in existing systems, manufacture a mouth is transverse to the direction of the preferred embodiments herein. In existing systems for making envelopes, there is no concern to deal with a simultaneous stretching of a slit paper (since such paper has not previously been employed), and, therefore, existing systems orient envelopes such that more envelopes can be made per minute. In addition, for existing systems, laminating is done with heat for plastic bubble and, therefore, is instantaneous unlike the requirement for drying of a paper cold glue or a cooling of a paper hot melt glue. It is typical that the length of the envelope is wider that the mouth or envelope width. By way of example, if the bubble padded envelope is 10" wide by 20" long then, each guillotine cut happens every 10" versus every 20" and therefore doubles the padded envelope making speed.

An issue with a guillotine making system is that it separates the leading envelope from the prior envelope and places a higher burden on maintaining the stretch of the slit sheet material in a smaller number of glued square inch area of the immediate envelope.

During the manufacturing process where the glue is in the process of drying and/or cooling, it is, therefore, more vulnerable from distortion and delamination from the retracting slit sheet material. To overcome this, the rotary method is the best way to maintain the maximum amount of paper adhesive combination. If the instant process used a guillotine, then the web would slacken during the cutting process, thus, producing wrinkling and delamination.

There is an additional reason for the rotary method required for slit sheet material. The expanded slit sheet is most conveniently stretched in the direction of manufacture. Since most padded envelopes are longer than they are wide, manufacturing in the width direction would cause either one of two scenarios:

The first, is the expanding the slit sheet in the direction of manufacture and would in many instances require multiple webs of material being stretched which, would require more than one slit sheet die cutter and the handling and exact position of the multiple side-by-side webs required. The maximum available width of a die cutting machine is 30" which makes the stretched width of 23.5". The envelope still requires folding for the pouch and the fold over seal of about 1.5" making the usable pouch area 11". Many envelopes are longer that 11" for the pouch area. Again, the solution would be multiple die cutters to manage the full length required and the complications of placing them side by side.

The second is by expanding in the transverse direction of manufacture which would require one web but, would require a holding mechanism to maintain stretch while gluing the multiple layers in a step-by-step basis rather than a continuous manufacturing process.

Either approach creates a further issue of cost of machinery. On the other hand, the present machine is small in footprint and can be placed close to markets that would be too small for width direction equipment.

In some preferred embodiments, in order to be able to adhere a label to an outer surface (such as, e.g., a shipping label), an envelope outer layer is embossed very lightly, and preferably with narrow embossments, and with embossments that do not protrude outwardly. And, at the same time, an envelope inner layer can preferably be embossed more heavily (e.g., on an inside surface of the envelope).

Customers often consider the weight of the envelope to be an important aspect as, e.g., customers desire to save money on postage. Paper having outer layer—expanded layer—inner layer weights that are each below, e.g., 50 pounds or each below 45 pounds, or, e.g., about 43-43-43 pounds, or, e.g., about 40-40-40 pounds as envelope weights, can employ aspects of preferred embodiments described herein and employ embossing (e.g., an inner embossing) along with an extensible slit sheet paper to avoid wrinkling. The use of an inner embossing allows items to be loaded easily and adds more resilience.

In some preferred embodiments, paper cushioning alternatives and/or expanded slit sheets are sealed to at least one of the inner or outer layers of indented paper, Kraft/rip proof, standard Kraft, or other non-slit sheet material. The sealing can be at or proximate to the end regions 403 as shown in FIG. 4 or can be at or proximate to side regions 402 as shown in FIG. 4, or to both side and end regions. While the sealing can be to one side region and one end region, preferably, the sealing is to opposing side and/or end regions.

While some of the examples relate to the use of two layers of expanded slit sheets, in some preferred embodiments, a single layer preferably can be used. Further, in some embodiments, even more than two layers of expanded slit sheets can be employed. Thus, at least one layer is employed in the envelope and multiple layers can be employed, as for example, two layers, three layers, four layers, or greater than four layers where enhanced cushioning is desired.

In some preferred embodiments, the latter numbers of layers of expanded slit sheets refer to numbers of layers of expanded paper between the inner most and outer most layers. Accordingly, when the structure as illustrated in embodiments described above are doubled over, the total number of layers of expanded slit sheets in the envelope is doubled while the number of layers of expanded slit sheet layers between the inner most layer and outer most layer is unchanged.

In the most preferred embodiments, the various envelopes of the embodiments of the present invention can be recycled by consumers along with newspapers, magazines, and corrugated containers, etc. There are three categories of paper that can be used as feedstocks for making recycled paper: mill broke, pre-consumer waste, and post-consumer waste. Mill broke is paper trimmings and other paper scrap from the manufacture of paper, and is recycled in a paper mill. Pre-consumer waste is a material which left the paper mill but was discarded before it was ready for consumer use. Post-consumer waste is material discarded after consumer use, such as old corrugated containers (OCC), old magazines, and newspapers. Paper suitable for recycling is called "scrap paper," often used to produce molded pulp packaging.

By way of contrast, air bubble wrapping sheets and Tyvek® envelopes can be recycled, but it should not be added to a consumer's recycling container. Instead, bubble wrap, Tyvek, and plastic bags should be recycled at special collection points. This guidance applies not only to bubble wrap, but also to completely plastic bubble mailers and to air pillows. Air bubble mailers with paper outsides, however, cannot be recycled as-is. If it is feasible to disassemble them into their separate material parts, one could then recycle the paper along with other paper recyclables, and then take the bubble wrap to a drop-off location along with other plastic films. Information about recycling of plastics can be found at "How2Recycle": http://www.how2recycle.info/sdo.

b. Illustrative Examples of Embodiments of Envelopes that can be Created in Some Illustrative Implementations of the Invention Example A Envelope for use within a container:

layer 1 is indented;

layer 2 is expanded slit sheet (uniformly opening);

layer 3 is expanded slit sheet, (uniformly opening) crossed-pattern with respect to layer 2;

layer 4 is indented.

Example B

Envelope for use within a container:

layer 1 is Kraft paper;

layer 2 is expanded randomly opening slit sheet;

layer 3 is expanded randomly opening slit sheet;

layer 4 is Kraft paper

Example C

Mailing envelope for mailing via UPS, FedEx, USPS, etc.:

layer 1 (outer layer) is Kraft/rip proof;

layer 2 is expanded uniformly opening slit sheet;

layer 3 is expanded uniformly opening slit sheet, and crossed-patterned with respect to layer 2;

layer 4 is indented.

Example D

Mailing envelope for mailing via UPS, FedEx, USPS, etc.:

layer 1 (outer layer) is Kraft/rip proof;

layer 2 is expanded randomly opening slit sheet;

layer 3 is expanded randomly opening slit sheet;

layer 4 is indented.

Example E

Mailing envelope for mailing via UPS, FedEx, USPS, etc.:

layer 1 (outer layer) is Indented;

layer 2 is expanded randomly opening slit sheet;

layer 3 is expanded randomly opening slit sheet layer 4 is indented.

Example F

Mailing envelope for mailing via UPS, FedEx, USPS, etc.:

layer 1 (outer layer) is 50 #Kraft;

layer 2 is expanded randomly opening slit sheet;

layer 3 is expanded randomly opening slit sheet layer 4 is a 30 #Kraft.

Example G

Mailing envelope for mailing via UPS, FedEx, USPS, etc.:

layer 1 (outer layer) is Indented;

layer 2 is expanded randomly opening slit sheet;

layer 3 is expanded randomly opening slit sheet;

layer 4 is a 30 #Kraft.

Example H

Mailing envelope for mailing via UPS, FedEx, USPS, etc.;

layer 1 (outer layer) is downward facing indented;

layer 2 is double facing indented.

III. Illustrative Expansion System and Method Features for Making Envelopes and Protective Products in Some Embodiments In some preferred embodiments, the systems and methods set forth in the preceding Section II entitled "Systems and Methods for Making Envelopes and the Like According to Illustrative Embodiments of the Invention" can be employed in the context of further systems and methods as set forth in the present Section III. Among other things, the combination of the systems and methods within this Section III can be highly advantageous in combination with the systems and methods set forth in the preceding Section II.

Figure 23:
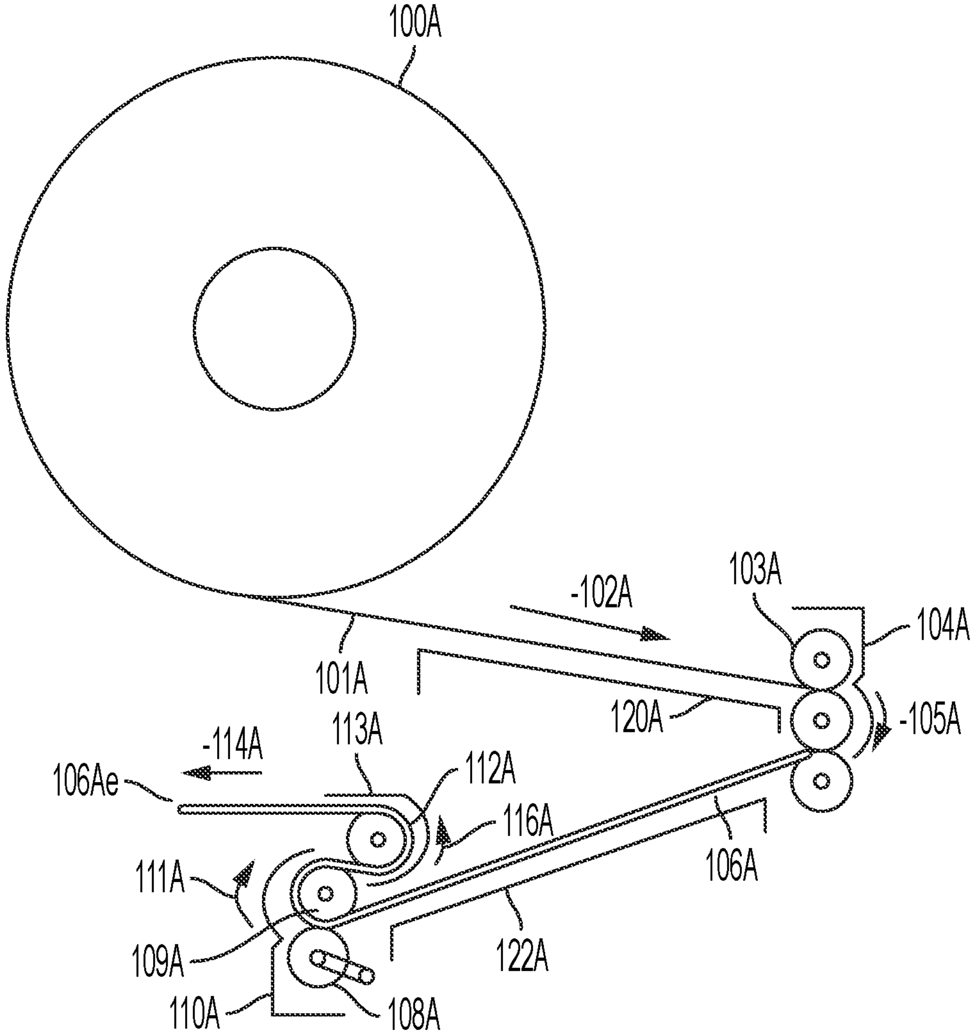
FIG. 23 is a side view of an illustrative embodiment of an expansion system that can be employed in some embodiments and includes expansion rollers configured to create an "S" pattern, with the expansion rollers in a loading configuration.

By way of example, in some embodiments the distal end 106Ae of the expanded sheet 106A shown in FIG. 23 can feed in an expanded state to front end 201Xf of the expanded slit sheet paper shown in FIG. 21.

In relation to systems and methods within this Section III, in some preferred embodiments, expansion rollers (e.g., hook rollers) work in conjunction with feeding rollers (e.g., a pair of rubber type pinch rollers) that operate preferably at a slower speed (e.g., about a 67 percent slower speed) than the expansion rollers (e.g., hook rollers). This speed differential causes the slit sheet to expand. Although the speed differential of 67 percent is employed in some illustrative embodiments, it should be appreciated that the speed differential can vary based on the degree of expandability of the expandable slit sheet paper. Accordingly, other embodiments can have different differential is speeds based on circumstances. By way of example, in some embodiments the differential can include the pinch rollers operating, e.g., between about 25 to 100 percent slower than the speed of the hook rollers (i.e., expansion rollers). However, as long as the expansion rollers (e.g., hook rollers) operate at a higher rate than the feeding rollers (e.g., pinch rollers) leading thereto, such as to effect expansion of the expandable slit sheet material, the speed differential can be appropriate under the circumstances.

The expansion process is a self-feeding mechanism whereby the material exits the expansion rollers (e.g., hook rollers) expanded on a continuous basis. Among other things, the use of a larger distance between the expansion rollers (e.g., hook rollers) than the thickness of the slit sheet expanded eliminates crushing while expanding and feeding the slit material outward.

In some preferred embodiments, a new technology is provided that creates a tension between the rollers by forcing the paper to travel around a first hook roller and then, a short distance away, around a second hook roller. In preferred embodiments, a sharp "S" shaped turn maintains enough tension on both sides of the expanded slit sheet so that the expanded slit sheet does not slip backward towards the feeding rollers (e.g., rubber pinch rollers) which would cause the sheet to revert to becoming partly or fully unstretched and thus unexpanded.

In some embodiments, the non-crushing expansion roller (e.g., hook roller) system can be used for a plurality of purposes. For example, a first advantageous use is with an automatic machine at a packing station similar to that found in the background art (see U.S. Pat. No. 5,688,578 incorporated herein by reference in its entirety). Another exemplary use is in the manufacture of envelopes, and, most desirably, envelopes as described in provisional applications Nos. 62/712,867 and 62/714,739, filed on Jul. 31, 2018 and Aug. 5, 2018, respectively, and incorporated herein by reference as if recited in full, as well as described in co-pending U.S. application Ser. No. 16/531,017 filed on Aug. 3, 2019, the entire disclosure of which is also incorporated herein by reference.

In some contexts, if the expansion rollers (e.g., hook rollers) are too far apart as to not create a tight S turn that is sufficient enough to maintain tension, then the expanded slit sheet could fall back (i.e., slip) when the paper is not being used to wrap material. If the paper does fall back, then the loading hook loader 108, as shown in FIG. 1, would have to be reengaged to reload the paper. To inhibit this slippage of the expanded slit sheet, the hook rollers are separated at the thickness or slightly greater than that of the expanded sheet. In that manner, the hook rollers do not compress or pinch the expanded slit sheet paper, but are close enough to inhibit slippage.

In some exemplary embodiments, a thickness of the expanded sheet is about 3/16"; in these exemplary embodiments, a preferable distance between the rollers would be at or about 3/16" to 1/4", or, in some other embodiments, up to about 1/2". In some less preferred embodiments with an expanded sheet having a thickness of about 3/16", the distance between the rollers can be greater, such as, e.g., up to about 2/3", or, even up to about 3/4" or even more. Although some embodiments of expanded slit sheet has a thickness of about 3/16" as noted above, it should be appreciated that other embodiments can have different thicknesses of the expanded slit sheet paper when in an expanded state. For example, in some examples, the thickness in the expanded state can be about 1/16"; or, in some examples, this thickness can be about 2/16"; or, in some examples, this thickness can be about 4/16"; or, in some examples, this thickness can be about 5/16"; or, in some examples, this thickness can be about 6/16"; or, in some examples, this thickness can be about 7/16"; or, in some embodiments, this thickness can be about 8/16"; or in some embodiments the thickness can be even greater. In such other embodiments, the distance between the rollers is preferably within a range proportional to the examples set forth above with respect to the 3/16" thickness examples.

In some embodiments, the distance between the adjacent rollers is the same as or, alternatively, approximately the same as the thickness of the expanded slit sheet material. In some other embodiments, the distance between the adjacent rollers is up to about 20% greater than the thickness of the expanded slit sheet material. In some other embodiments, the distance between the adjacent rollers is up to about 40% greater than the thickness of the expanded slit sheet material. In some other embodiments, the distance between the adjacent rollers is up to about 60% greater than the thickness of the expanded slit sheet material. In some other embodiments, the distance between the adjacent rollers is up to about 80% greater than the thickness of the expanded slit sheet material. In some other embodiments, the distance between the adjacent rollers is up to about 100% greater than the thickness of the expanded slit sheet material (i.e., up to about twice as large). In some other embodiments, the distance between the adjacent rollers is up to about 120% greater than the thickness of the expanded slit sheet material. In some other embodiments, the distance between the adjacent rollers is up to about 140% greater than the thickness of the expanded slit sheet material. In some other embodiments, the distance between the adjacent rollers is up to about 160% greater than the thickness of the expanded slit sheet material. In some other embodiments, the distance between the adjacent rollers is up to about 180% greater than the thickness of the expanded slit sheet material. In some other embodiments, the distance between the adjacent rollers is up to about 200% greater than the thickness of the expanded slit sheet material (i.e., up to about three times as large). In some other embodiments, the distance between the adjacent rollers is even greater, such as, e.g., up to about 300% or more.

In some preferred embodiments, the shape of the S turn would be such that the expanded sheet leaving the first roll would be perpendicular or slightly less than perpendicular providing an acute angle towards the next roller. The purpose is two-fold. The more acute the angle, the more the paper has to involve the radius of the roller prior to exiting.

FIG. 23 shows the slit paper flow from roller 109A to roller 112A provides less than 270 degrees of arcuate contact with the circumference of the roller 109A and then less than 180 degrees of contact with roller 112A. Since alternate sides of the slit sheet are engaged by rollers 109A and 112A, the ability for the hooks to maintain a positive non-slipping contact with the expanded sheet is optimized while maintaining the spacing required for ease of machinery design and construction.

It should also be noted that for the purposes of the drawings the exact tolerances, such as dimensions and clearances, of the paper guides are not illustrated in the drawings. The guides, as shown in FIG. 23 (104A, 110A, 113A, 120A, and 122A), would be much closer to the rollers than shown in the drawings so that the paper does not escape away from the intended direction in which it must go.

In the case of a continuous pulling of the expanded sheet, as found when making envelopes, then the critical placement of the hooks is less critical and would be spaced further apart and perpendicular for the purposes of easier paper loading. The use of the paper guides may or may not be necessary or preferable if other equipment interferes with the easy access to the non-crushing hooks system. In the most preferable design, the tolerances could be made the same as what was just described for the equipment used at the packing station.

Nevertheless, the concept of maintaining friction between two hook rollers based on their proximity and the resultant changing paper directions that create the S turns is very advantageous and enables providing the best cushioning available from expanded slit sheet material, equivalent to the manual system created by the inventor described in U.S. patent application Ser. No. 15/820,514 incorporated herein by reference, as if recited in full. Manual pulling of the expanded sheet eliminates the need for pre-expansion and eliminates the hook rollers and, therefore, avoids any crushing, creating a non-crushed expanded slit material that maximizes the value of its cushioning properties.

Paper guides and an additional hook roller facilitate an easy loading method for guiding the paper through the pinch roller and through to the S curve hook automatically to the rollers. When the paper has been loaded properly and is stretching and feeding consistently, the third hook roller 108 of FIG. 23 disengages.

Figure 24:
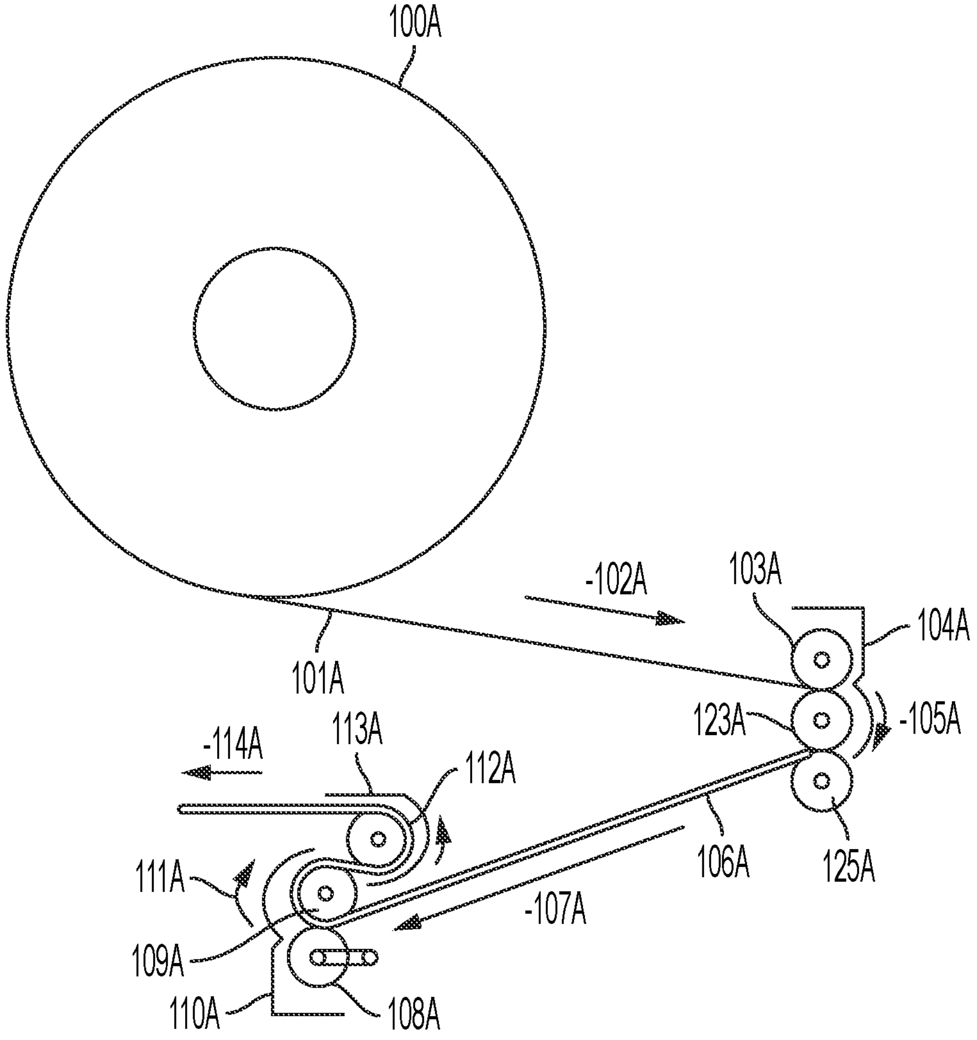
FIG. 24 is a side view of the embodiment shown in FIG. 23 in an operating configuration.

FIG. 23 is a side view of the slit paper system being loaded that starts with the paper roll 100A being unwound manually in a continuous sheet 101A and guided by paper guide 120A in the direction 102A to pressure rollers 103A, and as shown in FIG. 24, rollers 123A and 125A. Pressure rollers then pull the slit sheet and paper guide 104A directs it to the lower roller portion of the pressure rollers in the direction of arrow 105A. The slit paper 102A continues along paper guide 122A unexpanded but, will immediately start expanding when it passes through the expansion rollers (i.e., hook rollers) 109A and the loading hook roller 108A. When this expansion occurs, the slit paper becomes thicker and becomes an expanded slit sheet 106A (i.e., is expanded to an expanded state having an increased thickness). As the expanded paper passes through hook roller 109A and loading hook roller 108A it is directed with paper guide 110A around hook roller 109A to hook roller 112A in the direction of arrow 111A. Paper guide 113A guides the paper around roller 112A in the direction of arrow 116A and exits in the direction of arrow 114A.

FIG. 24 is a side view of the hook rollers where hook loading roller 108A has been rotated downward to eliminate the crushing effect.

Figure 25:
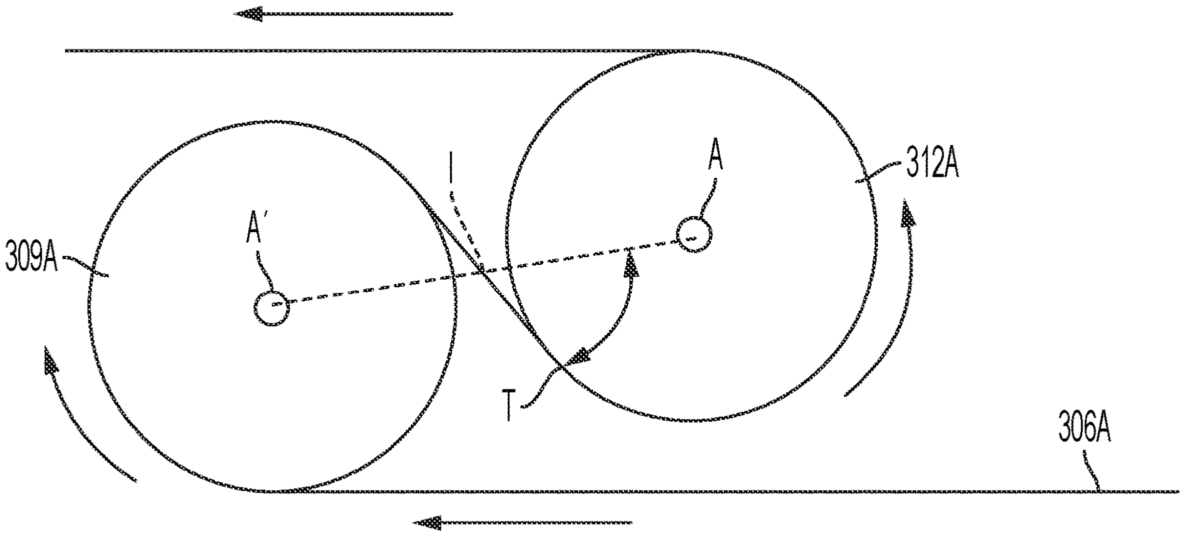
FIG. 25 is a side view of "S" pattern slit paper flow around a pair of expansion rollers (e.g., hook rollers) in another embodiment.
Figure 26:
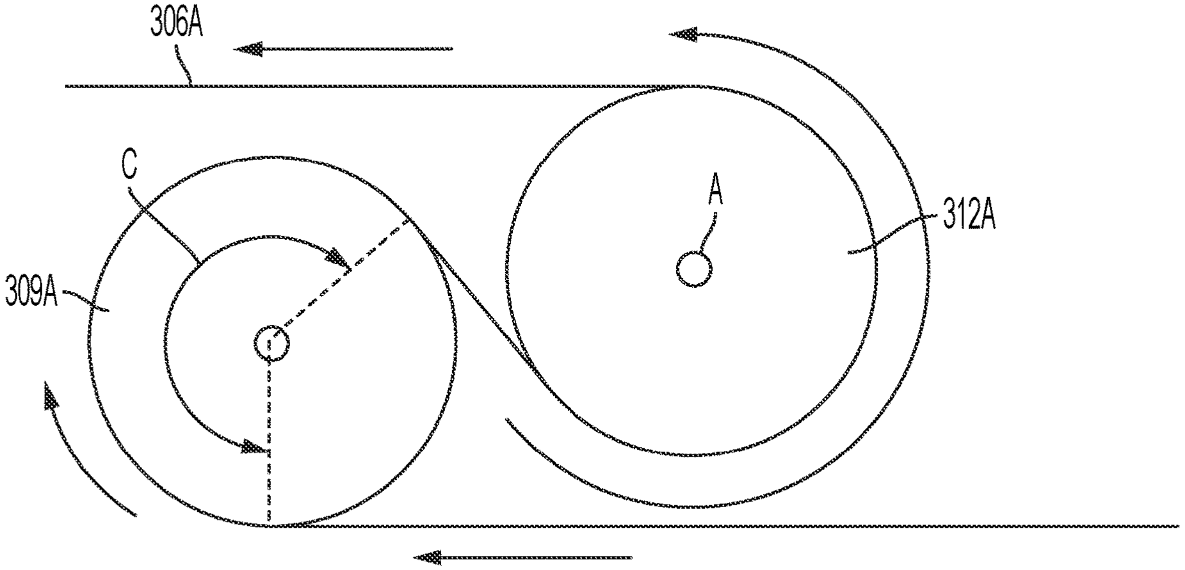
FIG. 26 is a side view of "S" pattern slit paper flow around the pair of expansion rollers (e.g., hook rollers) of FIG. 25.

In FIGS. 25 and 26, the S shaped path that the slit paper takes between the rollers 309A and 312A can be described from a variety of perspectives. Looking from the perspective of angles formed by the axis of rollers 309A and 312A, the intersection of the path of the slit paper with a line between the axis of each roller, and the tangent point at which the paper leaves a roller, is an acute angle. The relative positions of the two rollers and their proximity has a bearing on the acute angle that is formed. For example, the closer the proximity of the two rollers, the greater the acute angle.

Looking further to FIG. 25, the line between the axis A of roller 312A and the axis A' of roller 309A intersects with the slit paper at point I. The angle (<) A-I-T, where T is the tangent point of contact between the paper and the circumference of the roller 312A is an acute angle. In the expansion system of FIG. 25, the slit paper tangentially contacts hook roller 309A, interacts with the hook components of the hook roller 309A, and is delivered tangentially to the point of tangent contact with hook roller 312A. It should be noted that while contact with a roller is at a tangent point, the hooks of a hook roller can cause the slit paper to separate from the hooks at a point slightly beyond the point of tangency, depending upon the speed at which the paper is traveling and the tension on the slit paper. Accordingly, the term "tangent point" as employed herein, is inclusive of the slight deviation from a tangent.

With reference to FIG. 26, the slit paper 306A wraps around each of the rollers 309A and 312A following an S shaped path as indicated by the arrows shown in FIG. 25 and FIG. 26. The tendency of the expanded slit sheet to slip backward towards the rubber pinch rollers 103A as shown in FIG. 24, which can cause the sheet to revert to becoming partly or fully unstretched and, thus, unexpanded, is in an inverse ratio to the degree of contact between the slit paper 306A and the hook surface of the rollers 309A and 312A. Thus, where the contact region between the slit paper 306A and the hooks of the rollers is up to about ⅔ (around 235°) backward slip prevention is optimized. It is noted that a contact arc that is preferably less than 270 degrees is required for ease of machinery design and construction, and, accordingly, a lesser arcuate contact region is provided (e.g., lesser than 270 degrees).

The contact region advantageously is greater than ¼ of the circumference (i.e., 90°), and preferably greater than ½ of the circumference (i.e., 180°), and, most preferably, up to about 250°, which produces contact of the paper with about 70% of the hook surface of the rollers.

Furthermore, contact of the slit sheet with the hooks of each roller is preferably advantageously in the range from 90° to less than 270°. More preferably, contact of the slit sheet with the hooks of each roller is in the range from 180° to 235° which produces contact of the paper in the range from about 50% to 65% of the hook surface of the rollers. As shown in in the embodiment of FIG. 26, the arc C shows that the slit paper contacts more than 50% of the circumference of the hook roller 309A. Notably, although the degree of contact of the paper with the hook surfaces of the rollers 309A and 312A can be different from one another, advantageously, the degree of contact can be optimized for each roller in the preferred embodiments.

Figure 27:
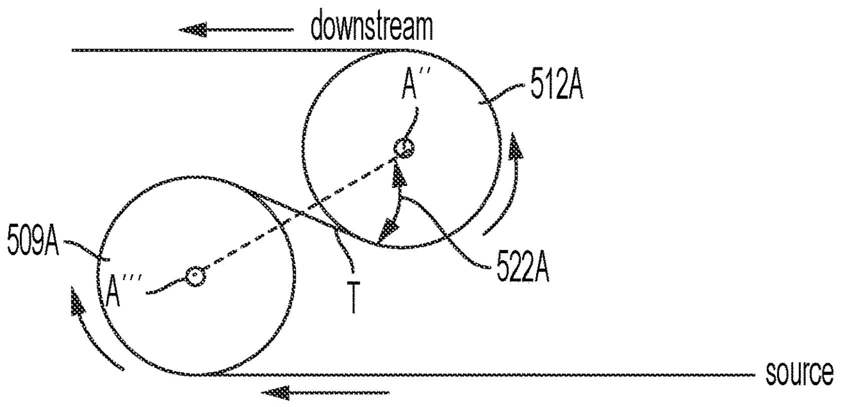
FIG. 27 is a side view of further "S" pattern slit paper flow around a pair of expansion rollers (e.g., hook rollers) in another embodiment.
Figure 28:
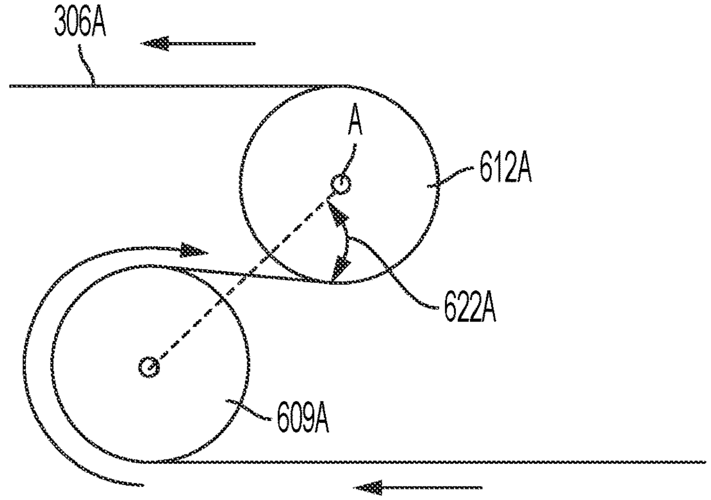
FIG. 28 is a side view of still another "S" pattern slit paper flow around a pair of expansion rollers (e.g., hook rollers) in another embodiment.
Figure 29:
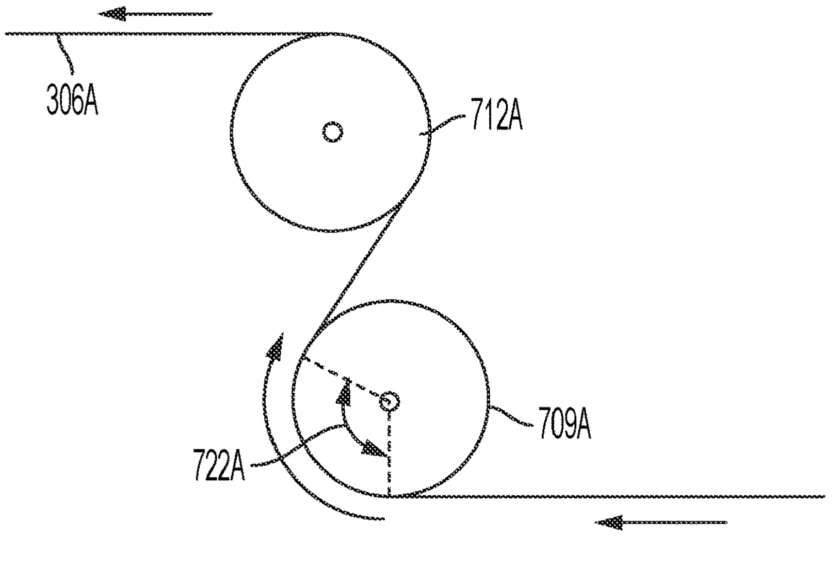
FIG. 29 is a side view of an alternate "S" pattern slit paper flow around a pair of expansion rollers (e.g., hook rollers) in another embodiment.

FIGS. 27, 28, and 29 show illustrative changes of degree of contact between the slit paper and the roller based upon the relative positions of the two hook rollers 509A and 512A. As shown in FIG. 27, a line between axis A" and axis A"' intersects with the expanded paper flowing from roller 509A to roller 512A to form an acute angle 522A.

In FIG. 28, the acute angle 622A is narrower than the acute angle 522A of FIG. 5. As shown in FIGS. 27 and 28, as the relative positions of rollers 509A and 512A are changed to the relative positions of rollers 609A and 612A, the degree of arcuate contact between the slit paper 306A and the rollers decreases.

FIG. 29 shows an alternate "S" path flow pattern in which the slit paper 306A contacts the roller 709A along an arc 722A that is smaller than the arcuate contact regions illustrated in FIG. 27 and FIG. 28. As shown in FIGS. 28 and 29, as the relative positions of rollers 609A and 612A are changed to the relative positions of rollers 709A and 712A, the degree of arcuate contact between the slit paper 306A and the rollers become further decreased.

Figure 30:
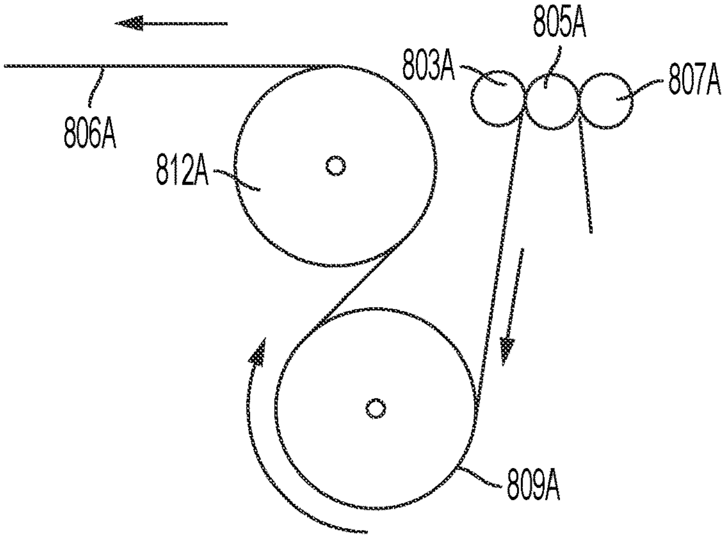
FIG. 30 is a side view of "S" pattern slit paper flow in another embodiment.

FIG. 30 shows a further embodiment in which the degree of arcuate contact between the slit paper 806A and the rollers 809A and 812A based upon the tangent points of contact of the slit paper with each of the two hook rollers 809A and 812A is adjusted. As with embodiments discussed above, to impart expansion of the expandable slit sheet, the nip rollers 803A, 805A, and 807A rotate at a slower speed than the hook rollers 809A and 812A, thus causing the slit paper 806A to expand and form three dimensional hexagonal cells.

Figure 31:
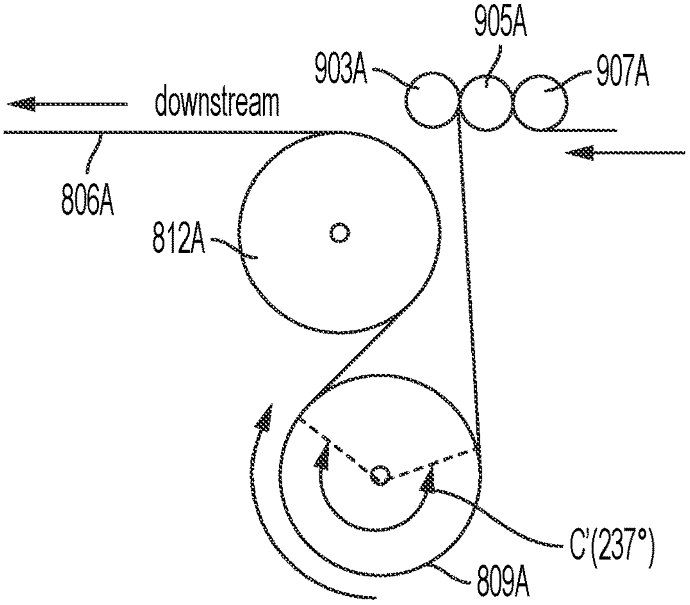
FIG. 31 is a side view of another "S" pattern slit paper flow in another embodiment.

FIG. 31 shows a further embodiment in which the degree of arcuate contact between the slit paper 806A and the rollers 809A and 812A based upon the tangent points of contact of the slit paper with each of the two hook rollers 809A and 812A is even further adjusted. As with embodiments discussed above, the nip rollers 903A, 905A, and 907A rotate at a slower speed than the hook rollers 809A and 812A, thus causing the slit paper 806A to expand and form three dimensional hexagonal cells. A shown in FIG. 31, the position of nip rollers 903A, 905A, and 907A relative to the hook roller 809A produces a contact arc C' that is greater than the contact arc between slit paper 806A and hook roller 809A.

Figure 32:
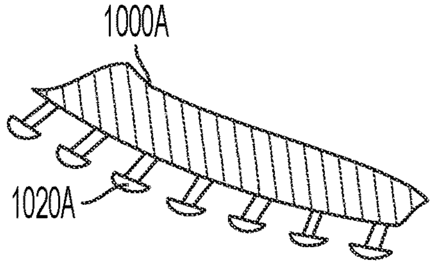
FIG. 32 is a fragmentary view of an illustrative expansion roller (e.g., hook roller) having a plurality of hooks with mushroom shaped hook ends.

For illustrative purposes, FIG. 32 shows a partial view of a portion of an expansion roller (e.g., hook roller) 1000A according to some illustrative and non-limiting embodiments. In this illustrative embodiment, the hook roller 1000A includes a multitude of hooks 1020A distributed around the peripheral surface of the roller. Towards that end, in the preferred embodiments, it should be appreciated that the hook rollers should have a length sufficient to extend across entirely or substantially entirely the entire width of the expandable slit sheet paper passing thereby, with a corresponding entire periphery or substantially the entire periphery of the hook roller having a multitude of hooks extending therefrom in order to be engageable with corresponding slits within the expandable slit sheet paper around the entire periphery of the hook roller, and across the entire width of the expandable slit sheet paper. In the illustrative example shown in FIG. 32, the hooks 1020A each include a base portion that extends downward to a cylindrical core of the hook roller 100A and a widened catching head portion. In some embodiments, the hooks 1020A can be randomly distributed on the entire periphery of the hook roller, while in other embodiments, the hooks 1020A can be arranged in an array of hooks 1020A extending around the entire periphery of the hook roller. In some embodiments, the hooks 1020A are sized such that a plurality of hooks 1020A are capable of engaging with a respective slit of the expandable slit sheet paper. Similarly, in some preferred embodiments, the hooks 1020A are distributed closely adjacent one another such that a plurality of hooks 1020A are capable of engaging with a respective slit of the expandable slit sheet paper. Although FIG. 32 shows an illustrative design of the hook rollers and hooks according to some illustrative embodiments, it should be appreciated that various other embodiments can include other hook configurations as discussed herein. Moreover, in the preferred embodiments, the hooks 1020A are flexible, such that the hooks 1020A are capable of flexibly entering the slits of the expandable slit sheet paper and/or flexible exiting the slits of the expandable slit sheet paper. In some preferred embodiments, the base portions of the hooks 1020A (which can be, e.g., substantially cylindrically shaped or otherwise shaped shaft portions) can be flexible such as to allow the hooks 1020A to flexibly be received and/or removed from the respective slits of the expandable slit sheet paper.

Figure 35:
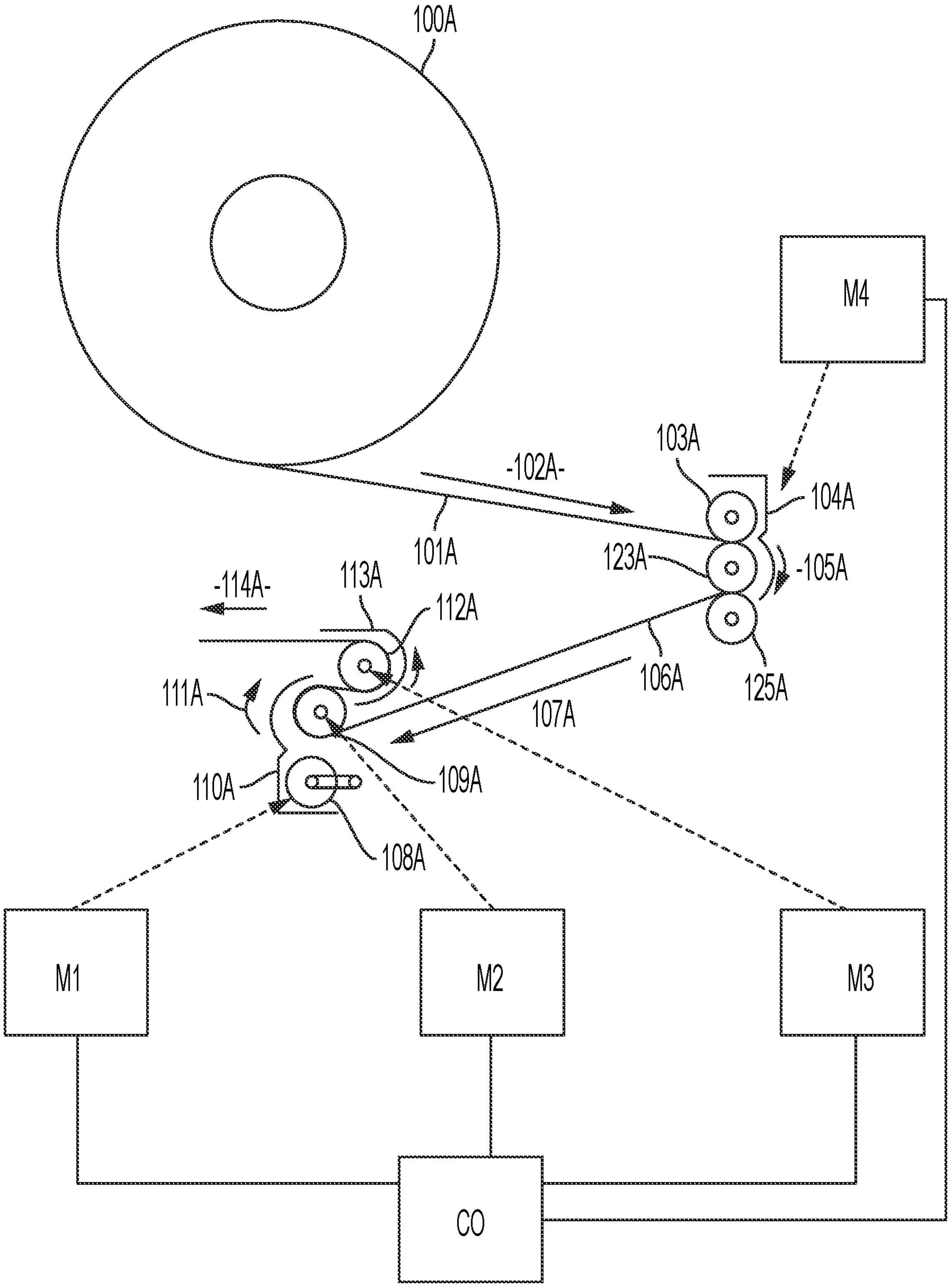
FIG. 35 is a side view similar to that shown in FIG. 23 with illustrative control elements added according to some illustrative embodiments.

FIG. 35 is similar to FIG. 23, but includes illustrative control elements according to some illustrative and non-limiting embodiments of the invention. Towards this end, FIG. 35 illustrates that in some embodiments of the invention one or more motor or drive mechanism M (four motors or drive mechanisms M1, M2, M3 and M4 being shown in the illustrative and non-limiting example) is/are employed for imparting rotation to the respective rollers. By way of example, in this illustrative example shown in FIG. 35, a motor or drive M1 is connected to rotationally drive the roller 108, a motor or drive M2 is connected to rotationally drive the roller 109, and a motor or drive M3 is connected to rotationally drive the roller 112. Moreover, as also shown in FIG. 35 a motor or drive M4 is connected to rotationally drive the rollers 102, 123, and/or 125.

As also depicted in FIG. 35, in some illustrative preferred embodiments, a controller CO is also provided that provides control of the motor(s) or drive(s) (e.g., motors or drives M1 to M4 in the illustrative example) in order to control the operation of the system and methods of the preferred embodiments. In some illustrative embodiments, the controller CO can include at least one computer that is programmed to control the operation of the motor(s). By way of example, the at least one computer can include a keyboard and display for user entry of inputs (e.g., to control timing, rotational speeds, etc.), along with memory, a processor and digital data store, and appropriate programming for carrying out functions of the preferred embodiments. Additionally, the at least one computer can also include input and output mechanisms for receiving and sending signals, such as, e.g., to monitor operation of the motor(s), and to send control signals to control the speed and timing of the motors. Moreover, the controller CO can also be adapted to control operation of other elements, such as, e.g., by way of example, to control the reciprocation movement of the roller 108 between the positions shown in FIG. 23 and FIG. 24. Towards that end, in some illustrative examples, this reciprocation can be imparted by mounting the reciprocated roller 108A on a reciprocatable arm that can be pivotally moved via a solenoid member that is controlled by way of the controller CO. In various embodiments described herein, such as, e.g., within Section II of this application, in which a controller is employed, the controller can include aspects similar to the controller described above. Moreover, in systems of the present invention that include multiple system components described herein, such as, e.g., with respect to systems and methods within Sections II and III of this application, the same controller or control system can be employed for controlling all of the systems components and processes.

It should be appreciated that FIG. 35 shows an illustrative and non-limiting example and that the systems and methods of the present invention can be implemented with a variety of other structures. By way of example, although a plurality of illustrative motors or drives M1-M4 are depicted, it should be appreciated that in various embodiments, a single motor or drive can be employed to rotate a plurality of rollers, including rollers that are rotated at different rates. By way of example, various conveyor belts, pulleys, gears and the like can be employed in order to drive a plurality of rollers via a single motor or drive, including independent driving and driving at different rates of rotation.

Thus, while the preferred embodiments provide a structure that enables automated or machine controlled expansion of expandable slit sheet material, it should be appreciated that such automated or machine controlled expansion of expandable slit sheet material can employ a wide variety of drive mechanisms and mechanisms to control rotation and movement of rollers, etc., in accordance with the preferred embodiments of the invention.

Although some preferred embodiments employ two expansion rollers that form an S-curve as shown, e.g., in the embodiments of FIGS. 23-31, in some other embodiments, additional expansion rollers (e.g., hook rollers) can be employed. For example, in some other embodiments, three (3) expansion rollers can be employed, or, alternatively, four (4) expansion rollers can be employed, or, even more in some embodiments. Regardless of the number of expansion rollers, in the preferred embodiments, all of the adjacent expansion rollers are separated in a manner to avoid compression or crushing of the expanded slit sheet paper as discussed above. Moreover, regardless of the number of expansion rollers, in the preferred embodiments, the expansion rollers create the above-described S-curve between two adjacent ones of the expansion rollers. For example, in some preferred embodiments, the first and second expansion rollers (i.e., the most upstream expansion rollers) are preferably arranged and configured as shown and described in relation to embodiments discussed above.

Figure 36:
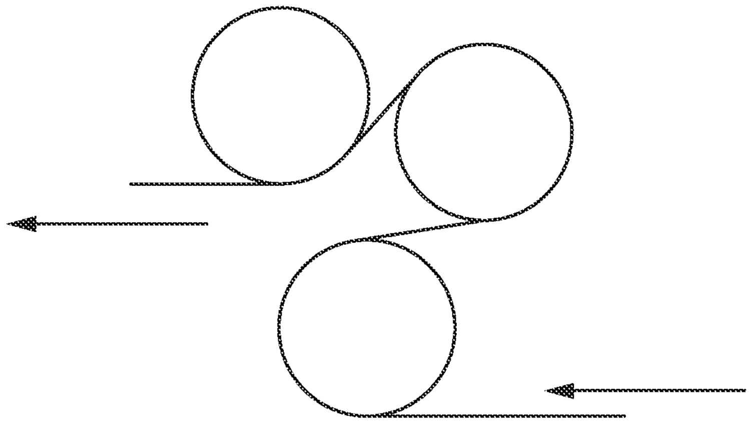
FIG. 36 and FIG. 37 are illustrative side views of other illustrative embodiments employing three and four expansion rollers, respectively, according to some other illustrative embodiments.
Figure 37:
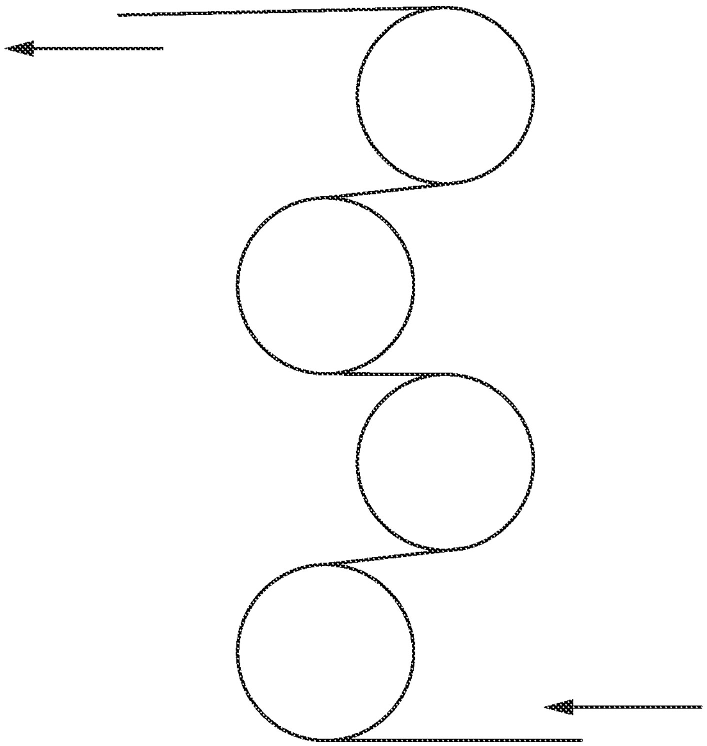

For illustrative purposes, FIG. 36 shows an illustrative arrangement employing three (3) expansion rollers according to some illustrative embodiments, and FIG. 37 shows another illustrative arrangement employing four (4) expansion rollers according to some other illustrative embodiments.

In some of the more preferred embodiments, the expansion rollers preferably each include hooks distributed on their peripheries. For example, in the embodiments shown in FIGS. 23 and 24, the rollers 109A and 112A preferably both include hooks distributed on their peripheries. In addition, in the embodiments shown in FIGS. 25 and 26, the rollers 309A and 312A preferably both include hooks distributed on their peripheries. In addition, in the embodiment shown in FIG. 5, the rollers 509A and 512A preferably both include hooks distributed on their peripheries. In addition, in the embodiment shown in FIG. 28, the rollers 609A and 612A preferably both include hooks distributed on their peripheries. In addition, in the embodiment shown in FIG. 29, the rollers 709A and 712A preferably both include hooks distributed on their peripheries. In addition, in the embodiments shown in FIGS. 30 and 31, the rollers 809A and 812A preferably both include hooks distributed on their peripheries.

However, although the expansion rollers preferably each include hooks distributed on their peripheries, in some embodiments one or more of the expansion rollers can include hooks distributed around their peripheries (i.e., as long as at least one of the expansion rollers includes such hooks distributed on its periphery), while other(s) of the expansion rollers can omit such hooks. For example, in some illustrative embodiments, rather than employing such hooks, such other(s) of the expansion rollers can include a rubber, foam or other higher friction surface without employing such hooks.

However, in some of the more preferred embodiments, if any of the expansion rollers do not include hooks distributed on their peripheries, at least a first roller (i.e., a most upstream of the expansion rollers) would include such hooks. Notably, this can be particularly important in the context of a device in which the expanded sheet that is fed downstream from the expansion rollers is first cut, such as, e.g., with a die cutter. Among other things, this is helpful for ensuring that the expandable slit sheet material is expanded more evenly. In the event that such hooks are distributed on the second expansion roller downstream but not on the first expansion roller downstream, this could potentially lead to chaotic opening of the cells that can cause a rippling effect across the web of expanded slit sheet paper.

In some embodiments, in order to most appropriately expand the material all of the expansion rollers include hooks distributed on their periphery. Among other things, in this context, it is helpful to avoid slippage of the expanded slit sheet material. In such embodiments, it is also helpful to include three expansion rollers (rather than two in many of the illustrated embodiments shown herein) to help further reduce potential for slippage. In addition, in this context, it is also helpful to minimize the distance between the expansion rollers to further minimize potential slippage. If there is slippage, then the slit sheet material slips backwards (i.e., upstream) away from the stage downstream of the expansion rollers. On the other hand, in the case of an automated downstream system, such as, e.g., in the case of an automated envelope manufacturing system, the expanded slit sheet material leaving downstream from the expansion rollers can be handled in a manner that is not readily slipped. For example, in preferred embodiments, the expanded slit sheet material is fed downstream to a gluing device that continuously pulls the expanded material. Accordingly, in that context, there is a reduced risk of slippage. Accordingly, in the context of an automated downstream system, such as, e.g., in the context of an automated envelope manufacturing system, then some of the expansion rollers can omit hooks around their peripheries without significant risk of slippage issues described above.

In the context of manufacturing of an envelope, in some examples, a single expansion roller can include hooks distributed around the periphery in a manner to sufficiently apply a uniform stretch—i.e., because the expanded slit sheet paper is held by downstream equipment during the manufacturing of the envelope process. In some preferred embodiments, when manufacturing an envelope, the hook material on the expansion rollers helps maintain the width of the expanded slit material, which is helpful for downstream fabrication of the envelope in some embodiments. For example, in some embodiments, in a downstream step from the expansion rollers, the expanded slit sheet material is glued along the sides of the expanded slit sheet material, and the hooks help to ensure that the expanded slit sheet web is not varying in width an extent that could, thus, lead to incomplete gluing of the sides.

In some embodiments, the expandable slit sheet paper is initially in an unslit state. For example, the unslit paper can be fed initially to a first roller that is essentially a die cutter that cuts the slits into the paper. In some embodiments, the die cutter has foam wrapped around it, so that the slit paper is held firmly and evenly upon exiting the die cutter. After being fed from the die cutter, in the preferred embodiments, the first expansion roller is preferably wrapped or surrounded by a material having a distribution of hooks (e.g., which roller operates at a faster rate to stretch and expand the expandable slit sheet paper).

Accordingly, as discussed above, in many preferred embodiments of the invention, all of the expansion rollers (e.g., hook rollers), such as, e.g., all of the expansion rollers (e.g., hook rollers) shown in FIGS. 23-31 and even FIGS. 36-37 can be formed as hook rollers with hooks distributed around peripheries thereof in some preferred implementations of each of the embodiments. However, in some other implementations of those embodiments shown in FIGS. 23-31 and FIGS. 36-37, one or more of the expansion rollers can be implemented without hooks distributed there-around, as discussed above.

Figure 38:
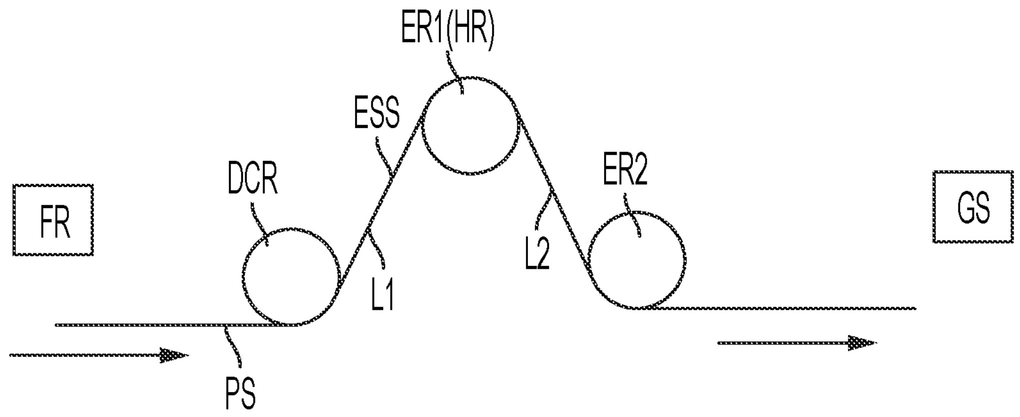
FIG. 38 shows the expandable slit sheet being conveyed further downstream to a first expansion conveyor according to some embodiments.
Figure 39:
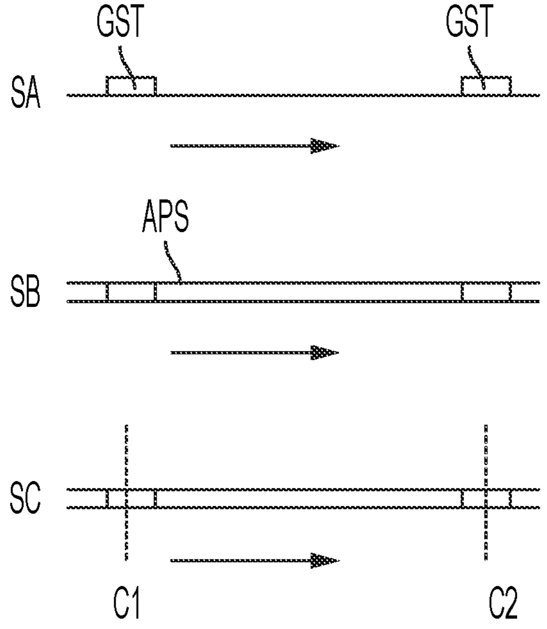
FIG. 39 illustrates a plurality of sub-steps of a processing step according to some embodiments.

FIGS. 38 and 39 show an illustrative embodiment of the invention in the context of an envelope manufacturing process. In this illustrative embodiment, a paper sheet PS is feed from an upstream process step FR. In some illustrative examples, the upstream process step FR includes delivery of the paper sheet PS from a feed roll, wherein the feed roll includes a paper web wound around a core, which is feed in a downstream direction. In some embodiments, the paper web has a width of about 8" to 24", or, in some embodiments, about 12" to 18", or, in some embodiments about 14" to 16".

In the illustrated embodiment, the paper sheet PS web is fed to a die cutting roller DCR that is configured to cut a slit pattern in the paper sheet PS, such that the paper sheet PS is formed into an expandable slit sheet ESS. Although not shown, in some illustrative embodiments, the die cutting roller can include another cooperative roller that together cut the paper sheet PS (such as, e.g., employing peripheral blades on one of the cooperative roller or the die cutting roller that cut slits as the paper sheet is conveyed past the die cutting roller. This structure can be similar to that of the background art for formation of slit patterns of expandable slit sheet material. In the preferred embodiment, as discussed above, the die cutting roller DCR rotates at a rate that conveys the paper sheet PS at a first reduced speed.

As shown in FIG. 38, the expandable slit sheet ESS is conveyed further downstream to a first expansion conveyor ER1. As also described with respect to embodiments discussed above, in the preferred embodiments, the first expansion conveyor ER1 preferably rotates at a rate that conveys the expandable slit sheet ESS at a rate that is faster than the reduced speed such as to fully expand the expandable slit sheet ESS in the spanning distance L1 of the expandable slit sheet ESS between the die cutting roller DCR and the first expansion roller ER1. In some illustrative embodiments, the distance L1 is sufficient to enable the expandable slit sheet ESS to fully expand; for example, in some embodiments, the distance is more than about 4", while in some other embodiments, the distance is more than about 6", while in some other embodiments, the distance is more than about 8", while in some other embodiments, the distance is more than about 10", while in some other embodiments, the distance is more than about 12".

As shown in FIG. 38, in the preferred embodiments, the first expansion roller E1 is formed as a hook roller HR having a multitude of hooks around the periphery thereof, as discussed herein above with respect to the various embodiments discussed above. In this embodiment shown in FIG. 38, the expandable slit sheet ESS is conveyed around the hook roller HR (i.e., ER1) and then is directed towards a second expansion roller ER2. Although many of the preferred embodiments involve providing of a cooperating pair of expansion rollers in somewhat close proximity to one another, in this illustrative embodiment shown in FIGS. 38 and 39, the second expansion roller ER2 is further displaced downstream from the first expansion roller ER1. For example, in some embodiments, the spanning distance L2 of the expanded expandable slit sheet ESS can be the same as any of the values listed above for the spanning distance L1 (note: although in some embodiments, the distances L1 and L2 can be approximately equal—such as, e.g., shown in the illustration of FIG. 15, the values of L1 and L2 can be any appropriate value described herein and do not have to be similar). Notably, in the preferred embodiments, the distance L2 is not critical, but, rather, a more important factor in relation to the spanning distance L2 is the angle of departure of the expandable slit sheet ESS from the first expansion roll ER1 (HR). Notably, an advantageous factor with respect to the embodiment shown in FIG. 38 is the degree of the arc of contact between the expandable slit sheet ESS and the hook roller HR (i.e., ER1).

Notably, in the preferred embodiments, the degree of the arc of contact between the expandable slit sheet ESS and the hook roller HR is preferably an arc of at least 40 degrees. In some other embodiments, the arc of contact is at least 60 degrees. In some other embodiments, the arc of contact is at least 80 degrees. In some other embodiments, the arc of contact is at least 100 degrees. In some other embodiments, the arc of contact is at least 120 degrees. In some other embodiments, the arc of contact is at least 140 degrees. In some other embodiments, the arc of contact is at least 180 degrees, or even more in other embodiments (similar to that described above). However, in some preferred embodiments, the arc of contact is between about 60 to 120 degrees.

In the embodiment shown in FIG. 38, the second expansion roller ER2 can be a roller that does not have hooks distributed around a periphery thereof. Of course, in some embodiments, the roller ER2 can be a similar hook roller with hooks there-around. But, in some embodiments, it is not necessary. For example, in some embodiments, the expanded slit sheet ESS is feed further downstream to a downstream process step GS. In some embodiments, the downstream process step GS includes a gluing step. In some preferred embodiments, this further processing step involves further conveyor(s) and/or other mechanism that grasp the expanded slit sheet ESS, whereby the need for hooks on the second expansion roller ER2 are not necessary in some embodiments.

With reference to FIG. 39, in some embodiments, the processing step GS can include a plurality of sub-steps SA, SB and SC. In the sub-step SA, transverse glue strips GST are applied to the expanded slit sheet ESS as the sheet moves in a direction of the arrow show (i.e., in a machine direction). Then, as shown in sub-step SB, another paper sheet APS is aligned along the expanded slit sheet ESS and glued thereto. Then, as shown in sub-step SC, the combined sheets can be cut along the dashed lines extending transversely across the web through the glue strip locations at C1 and C2, such as to separate the combined sheets into individual components (e.g., envelope parts). It should be appreciated that these steps are not the entire steps of fabrication of an envelope, but rather steps within the process of fabrication of an envelope, including fabrication of a portion of a wall of the envelope. In some embodiments, further process steps can be carried out, such as, e.g., steps as described in U.S. application Ser. No. 16/531,017, filed Aug. 3, 2019, entitled Protective Products, Such as Envelopes, Having a Unique Combination of Interior Padding of Expanded Slit Sheet Paper and Exterior Lining of Embossed Paper, of the present inventor, such as, e.g., to create envelopes of the type disclosed in the Ser. No. 16/531,017 application, the entire disclosure of which is incorporated herein by reference as though recited herein in full. According to other embodiments, aspects or process steps for manufacturing envelopes as set forth in one or more of the following U.S. Patents and Patent Publications can be implemented, the entire disclosures of which prior patents are all incorporated herein by reference as though recited herein in full: 1) U.S. Patent No. 851,934 entitled Manufacture of Envelopes, 2) U.S. Pat. No. 4,205,504 entitled Method and Device for Making Envelopes from a Continuous Web and Including Stuffing and Sealing of those Envelopes, 3) U.S. Pat. No. 3,069,982 entitled Manufacture of Quick-Opening Envelopes or Bags, 4) U.S. Pat. No. 4,091,596 entitled Method of and Apparatus for Manufacturing Envelopes, 5) U.S. Patent Publication No. 2002/001452 entitled Method for Manufacturing Mailing-Ready Printed Products and Envelopes for Use with Such Method, and 6) U.S. Patent Publication No. 2017/0107017 entitled Expandable Web Material for Envelope Construction.

BROAD SCOPE OF THE INVENTION

The use of individual numerical values is stated as approximations as though the values were preceded by the word “about”, “substantially”, or “approximately.” Similarly, the numerical values in the various ranges specified in this application, unless expressly indicated otherwise, are stated as approximations as though the minimum and maximum values within the stated ranges were both preceded by the word “about”, “substantially”, or “approximately.” In this manner, variations above and below the stated ranges can be used to achieve substantially the same results as values within the ranges. As used herein, the terms “about”, “substantially”, and “approximately” when referring to a numerical value shall have their plain and ordinary meanings to a person of ordinary skill in the art to which the disclosed subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words “about”, “substantially”, or “approximately” will serve to broaden a particular numerical value or range. Thus, as a general matter, “about”, “substantially”, or “approximately” broaden the numerical value. Also, the disclosure of ranges is intended as a continuous range including every value between the minimum and maximum values plus the broadening of the range afforded by the use of the term “about”, “substantially”, or “approximately”. Thus, recitation of ranges of values herein are merely intended to serve as a shorthand method of referring individually to each separate value falling within the range, unless otherwise indicated herein, and each separate value is incorporated into the specification as if it were individually recited herein. To the extent that determining a given amount of variation of some the factors such as the criticality of the slit patterns, paper width differential pre- and post-expansion, paper weights and type, as well as other considerations known to those of skill in the art to which the disclosed subject matter is most closely related or the art relevant to the range or element at issue will have on the performance of the claimed subject matter, is not considered to be within the ability of one of ordinary skill in the art, or is not explicitly stated in the claims, then the terms “about”, “substantially”, and “approximately” should be understood to mean the numerical value, plus or minus 15%.

It is to be understood that any ranges, ratios and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

What is claimed is:

1. A method for making a padded envelope, comprising:
- conveying a first sheet of paper in a conveying direction;
- conveying an expanded sheet of paper in an expanded state in said conveying direction with one side of said expanded sheet of paper facing said first sheet of paper;
- conveying a second sheet of paper in said conveying direction with an opposite side of said expanded sheet of paper in said expanded state facing said second sheet of paper;
- while continuing conveying movement during said conveying of said first sheet of paper, said expanded sheet of paper in said expanded state and said second sheet of paper in said conveying direction, pressing together a region of said first sheet of paper, said expanded sheet of paper and said second sheet of paper which region extends along a direction transverse to the conveying direction and causing said expanded sheet of paper to collapse within said region and said first sheet of paper, said expanded sheet of paper and said second sheet of paper to adhere together within said region; and
- while continuing conveying movement during conveying of said first sheet of paper, said expanded sheet of paper and said second sheet of paper in said conveying direction, cutting along said region that is pressed together during said pressing together such as to sever said first sheet of paper, said expanded sheet of paper and said second sheet of paper.

2. The method of claim 1, wherein said expanded sheet of paper in an expanded state includes a sheet of paper in which the plane of the paper varies positionally in a direction of the thickness of the expanded sheet of paper.

3. The method of claim 2, wherein said expanded sheet of paper includes at least one of an expanded slit sheet paper, a folded paper sheet, an embossed paper sheet, an undulating paper sheet.

4. A method for making a padded envelope, comprising:
- conveying a first sheet of paper in a conveying direction;
- expanding an expandable sheet of slit sheet paper into an expanded state and conveying the expandable sheet of slit sheet paper in the expanded state in said conveying direction with one side of said expandable slit sheet paper facing said first sheet of paper;
- conveying a second sheet of paper in said conveying direction with an opposite side of said expandable slit sheet paper in the expanded state facing said second sheet of paper;
- while continuing conveying movement during said conveying of said first sheet of paper, said expandable sheet of slit sheet paper in said expanded state and said second sheet of paper in said conveying direction, pressing together a region of said first sheet of paper, said expandable sheet of slit sheet paper and said second sheet of paper which region extends along a direction transverse to the conveying direction and causing said expandable sheet of paper to collapse within said region and said first sheet of paper, said expandable sheet of slit sheet paper and said second sheet of paper to adhere together within said region; and
- while continuing conveying movement during conveying of said first sheet of paper, said expandable sheet of slit sheet paper and said second sheet of paper in said conveying direction, cutting along said region that is pressed together during said pressing together such as to sever said first sheet of paper, said expandable sheet of slit sheet paper and said second sheet of paper.

5. The method of claim 4, wherein said causing said first sheet of paper, said expandable sheet of paper and said second sheet of paper to adhere together includes applying an adhesive within said region that is pressed together during said pressing together.

6. The method of claim 4, further including while continuing conveying movement during conveying of said expandable sheet of slit sheet paper continuously maintaining the expandable sheet of slit sheet paper in an expanded state by pulling on a distal end of the expandable sheet of slit sheet paper without applying a pulling force on lateral sides of the expandable sheet of slit sheet paper.

7. The method of claim 4, further including performing said pressing together employing at least one rotated member that includes at least one pressing element around a periphery thereof that is caused to press against said region that is pressed together during said pressing together upon reaching a rotational pressing position.

8. The method of claim 7, wherein said at least one rotated member includes a rotated roller than is rotated such as to effect said pressing along with an opposing moving member.

9. The method of claim 8, wherein said opposing moving member is a second roller that opposes said rotated roller.

10. The method of claim 8, wherein said opposing moving member is a conveyor member that opposes said rotated roller.

11. The method of claim 4, wherein said expanding said expandable sheet of slit sheet paper into said expanded state includes:

at least one expansion roller that is configured to engage slits of the expandable slit sheet paper to expand the expandable slit sheet paper.

12. The method of claim 11, wherein said at least one expansion roller that is configured to engage slits of the expandable slit sheet paper includes at least one expansion roller having a plurality of hooks distributed around a periphery thereof which are configured to engage slits of the expandable slit sheet paper.

13. The method of claim 11, wherein said at least one expansion roller that is configured to engage slits of the expandable slit sheet paper includes two adjacent expansion rollers that are separated from one another in the longitudinal feeding direction of the expandable slit sheet material by a distance greater than a thickness of said expandable slit sheet material in a fully expanded state, such that the said two adjacent expansion rollers do not concurrently press against opposite sides of the expanded slit sheet material at a same longitudinal position of the expanded slit sheet material so that said two adjacent expansion rollers avoid damaging the expanded slit sheet material.

14. The method of claim 4, wherein said expandable sheet of slit sheet paper is the only layer of expandable slit sheet paper in between said first sheet of paper and said second sheet of paper.

15. The method of claim 4, wherein said expandable sheet of slit sheet paper is the only layer of expandable slit sheet paper in between said first sheet of paper and said second sheet of paper and wherein said expandable sheet of slit sheet paper directly contacts a side of said first sheet of paper and directly contacts a side of said second sheet of paper.

16. The method of claim 4, wherein further including at least one additional expandable sheet of slit sheet paper in an expanded state that is conveyed along with said expandable sheet of slit sheet paper in between said first sheet of paper and said second sheet of paper.

17. The method of claim 4, wherein the extendable paper is an extensible paper having an extensibility, as measured in a pre-slit configuration, of 3 to 20% in the cross direction.

18. The method of claim 4, wherein the extendable paper is an extensible paper having an extensibility, as measured in a pre-slit configuration, of 4 to 20% in the cross direction.

19. The method of claim 4, wherein the extendable paper is an extensible paper having an extensibility, as measured in a pre-slit configuration, of 5 to 20% in the cross direction.

20. The method of claim 4, wherein the extendable paper is an extensible paper having an extensibility, as measured in a pre-slit configuration, of 6 to 20% in the cross direction.

21. The method of claim 4, wherein the extendable paper is an extensible paper having an extensibility, as measured in a pre-slit configuration, of 7 to 20% in the cross direction.

22. The method of claim 4, wherein the extendable paper is an extensible paper having an extensibility, as measured in a pre-slit configuration, of 8 to 20% in the cross direction.

23. The method of claim 4, wherein said expandable slit sheet paper is adhered together with said first sheet of paper and said second sheet only at two opposite ends of said expandable slit sheet paper in an expansion direction of the expandable slit sheet paper.

24. The method of claim 4, wherein said expandable slit sheet paper is unattached to said first sheet of paper and said second sheet of paper along lateral sides of said expandable slit sheet paper.

25. The method of claim 24, wherein said expandable slit sheet paper is fixed with respect to said first sheet of paper and said second sheet only at two opposite ends of said expandable slit sheet paper in an expansion direction of the expandable slit sheet paper.

26. The method of claim 4, further including performing said cutting along said region that is pressed together during said pressing together concurrently when performing said pressing together of said region.

27. The method of claim 26, further including performing said cutting along said region that is pressed together during said pressing together concurrently when performing said pressing together of said region using a pressure member having a cutting blade.

28. The method of claim 27, further including providing said pressure member on a rotated roller.

29. The method of claim 4, wherein the extendable paper is an extensible paper having an extensibility, as measured in a pre-slit configuration, of 4 to about 9% in the machine direction.

30. A system for making a padded envelope, comprising:

means for conveying a first sheet of paper in a conveying direction;

means for conveying an expanded sheet of paper in an expanded state in said conveying direction with one side of said expanded sheet of paper facing said first sheet of paper;

means for conveying a second sheet of paper in said conveying direction with an opposite side of said expanded sheet of paper in said expanded state facing said second sheet of paper;

means for while continuing conveying movement during said conveying of said first sheet of paper, said expanded sheet of paper in said expanded state and said second sheet of paper in said conveying direction, pressing together a region of said first sheet of paper, said expanded sheet of paper and said second sheet of paper which region extends along a direction transverse to the conveying direction and causing said expanded sheet of paper to collapse within said region and said first sheet of paper, said expanded sheet of paper and said second sheet of paper to adhere together within said region; and means for while continuing conveying movement during conveying of said first sheet of paper, said expanded sheet of paper and said second sheet of paper in said conveying direction, cutting along said region that is pressed together during said pressing together such as to sever said first sheet of paper, said expanded sheet of paper and said second sheet of paper.

31. The system of claim 30, wherein said expanded sheet of paper in an expanded state includes a sheet of paper in which the plane of the paper varies positionally in a direction of the thickness of the expanded sheet of paper.

32. The system of claim 31, wherein said expanded sheet of paper includes at least one of an expanded slit sheet paper, a folded paper sheet, an embossed paper sheet, an undulating paper sheet.

33. A system for making a padded envelope, comprising:

means for conveying a first sheet of paper in a conveying direction;

means for expanding an expandable sheet of slit sheet paper into an expanded state and conveying the expandable sheet of slit sheet paper in the expanded state in said conveying direction with one side of said expandable slit sheet paper facing said first sheet of paper;

means for conveying a second sheet of paper in said conveying direction with an opposite side of said expandable slit sheet paper in the expanded state facing said second sheet of paper;

means for while continuing conveying movement during said conveying of said first sheet of paper, said expandable sheet of slit sheet paper in said expanded state and said second sheet of paper in said conveying direction, pressing together a region of said first sheet of paper, said expandable sheet of slit sheet paper and said second sheet of paper which region extends along a direction transverse to the conveying direction and causing said expandable sheet of paper to collapse within said region and said first sheet of paper, said expandable sheet of slit sheet paper and said second sheet of paper to adhere together within said region; and means for while continuing conveying movement during conveying of said first sheet of paper, said expandable sheet of slit sheet paper and said second sheet of paper in said conveying direction, cutting along said region that is pressed together during said pressing together such as to sever said first sheet of paper, said expandable sheet of slit sheet paper and said second sheet of paper.

34. The system of claim 33, wherein said causing said first sheet of paper, said expandable sheet of paper and said second sheet of paper to adhere together includes applying an adhesive within said region that is pressed together during said pressing together.

35. The system of claim 33, further including while continuing conveying movement during conveying of said expandable sheet of slit sheet paper continuously maintaining the expandable sheet of slit sheet paper in an expanded state by pulling on a distal end of the expandable sheet of slit sheet paper without applying a pulling force on lateral sides of the expandable sheet of slit sheet paper.

36. The system of claim 33, further including performing said pressing together employing at least one rotated member that includes at least one pressing element around a periphery thereof that is caused to press against said region that is pressed together during said pressing together upon reaching a rotational pressing position.

37. The system of claim 36, wherein said at least one rotated member includes a rotated roller than is rotated such as to effect said pressing along with an opposing moving member.

38. The system of claim 37, wherein said opposing moving member is a second roller that opposes said rotated roller.

39. The system of claim 37, wherein said opposing moving member is a conveyor member that opposes said rotated roller.

40. The system of claim 33, wherein said expanding said expandable sheet of slit sheet paper into said expanded state includes:

at least one expansion roller that is configured to engage slits of the expandable slit sheet paper to expand the expandable slit sheet paper.

41. The system of claim 40, wherein said at least one expansion roller that is configured to engage slits of the expandable slit sheet paper includes at least one expansion roller having a plurality of hooks distributed around a periphery thereof which are configured to engage slits of the expandable slit sheet paper.

42. The system of claim 40, wherein said at least one expansion roller that is configured to engage slits of the expandable slit sheet paper includes two adjacent expansion rollers that are separated from one another in the longitudinal feeding direction of the expandable slit sheet material by a distance greater than a thickness of said expandable slit sheet material in a fully expanded state, such that the said two adjacent expansion rollers do not concurrently press against opposite sides of the expanded slit sheet material at a same longitudinal position of the expanded slit sheet material so that said two adjacent expansion rollers avoid damaging the expanded slit sheet material.

43. The system of claim 33, wherein said expandable sheet of slit sheet paper is the only layer of expandable slit sheet paper in between said first sheet of paper and said second sheet of paper.

44. The system of claim 33, wherein said expandable sheet of slit sheet paper is the only layer of expandable slit sheet paper in between said first sheet of paper and said second sheet of paper and wherein said expandable sheet of slit sheet paper directly contacts a side of said first sheet of paper and directly contacts a side of said second sheet of paper.

45. The system of claim 33, wherein further including at least one additional expandable sheet of slit sheet paper in an expanded state that is conveyed along with said expandable sheet of slit sheet paper in between said first sheet of paper and said second sheet of paper.

46. The system of claim 33, wherein the extendable paper is an extensible paper having an extensibility, as measured in a pre-slit configuration, of 3 to 20% in the machine direction.

47. The system of claim 33, wherein the extendable paper is an extensible paper having an extensibility, as measured in a pre-slit configuration, of 4 to 20% in the machine direction.

48. The system of claim 33, wherein the extendable paper is an extensible paper having an extensibility, as measured in a pre-slit configuration, of 5 to 20% in the machine direction.

49. The system of claim 33, wherein the extendable paper is an extensible paper having an extensibility, as measured in a pre-slit configuration, of 6 to 20% in the machine direction.

50. The system of claim 33, wherein the extendable paper is an extensible paper having an extensibility, as measured in a pre-slit configuration, of 7 to 20% in the machine direction.

51. The system of claim 33, wherein the extendable paper is an extensible paper having an extensibility, as measured in a pre-slit configuration, of 8 to 20% in the machine direction.

52. The system of claim 33, wherein the extendable paper is an extensible paper having an extensibility, as measured in a pre-slit configuration, of 4 to about 9% in the machine direction.

* * * * *